US012502756B2

(12) United States Patent
Garber et al.

(10) Patent No.: US 12,502,756 B2
(45) **Date of Patent: *Dec. 23, 2025**

(54) HIGH INERTIA DRIVER SYSTEM

(71) Applicant: Black & Decker Inc., New Britain, CT (US)

(72) Inventors: Stuart E. Garber, Towson, MD (US); Paul G. Gross, White Marsh, MD (US); Marco A. Mattucci, Baltimore, MD (US)

(73) Assignee: Black & Decker Inc., New Britain, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/295,969

(22) Filed: Oct. 17, 2016

(65) Prior Publication Data

US 2017/0066116 A1 Mar. 9, 2017

Related U.S. Application Data

(63) Continuation of application No. 14/498,475, filed on Sep. 26, 2014, now Pat. No. 10,434,634, and a (Continued)

(51) Int. Cl.
*B25C 1/06* (2006.01)

(52) U.S. Cl.
CPC .................................... *B25C 1/06* (2013.01)

(58) Field of Classification Search
CPC ..... B25B 21/02; B25B 13/06; B25B 23/0035; B25C 1/06; B25C 5/15; B25C 1/00
(Continued)

(56) References Cited

U.S. PATENT DOCUMENTS

| | | | | |
|---|---|---|---|---|
| 618,085 | A | 1/1899 | Grandy | |
| 1,727,383 | A * | 9/1929 | Simonides | B27C 1/10 310/67 R |

(Continued)

FOREIGN PATENT DOCUMENTS

| | | | |
|---|---|---|---|
| CA | 2524765 | A1 | 4/2006 |
| CN | 1846947 | A | 10/2006 |

(Continued)

OTHER PUBLICATIONS

Extended European Search Report, Application No. 13170119.5-1701 / 2669059, EPO (dated Apr. 29, 2016).

(Continued)

*Primary Examiner* — Robert F Long
(74) *Attorney, Agent, or Firm* — Wright IP & International Law; Eric G. Wright

(57) ABSTRACT

A high inertia driver system for a fastening tool having an electric motor that drives a flywheel to contact a driver blade to drive a fastener into a workpiece. The high inertia driver system also has a return system which prevents the unintentional driving of a second fastener. The return system uses a return spring that controls the recoil energy of the driver blade after driving a fastener into a workpiece. The system achieves a long operational life for the fastening tool by increasing the number of return cycles of the driver blade free of a return spring failure.

20 Claims, 47 Drawing Sheets

Related U.S. Application Data continuation-in-part of application No. 14/444,982, filed on Jul. 28, 2014, now Pat. No. 10,022,848.

(60) Provisional application No. 62/244,143, filed on Oct. 20, 2015, provisional application No. 61/961,247, filed on Oct. 9, 2013.

(58) Field of Classification Search
USPC ....................... 173/1, 2, 176, 179, 183, 217; 227/119–133
See application file for complete search history.

(56) References Cited

U.S. PATENT DOCUMENTS 2,106,034 A * 1/1938 Mall ....................... E01B 31/17 451/347
2,398,544 A 4/1946 Lockhart
2,417,490 A * 3/1947 James ...................... B21J 15/36 72/466.4
2,519,617 A 8/1950 Wember
2,522,931 A 9/1950 Curtiss
2,569,221 A 9/1951 Batten
2,580,631 A * 1/1952 Whitledge ................ F16D 7/04 173/93.5
2,630,784 A * 3/1953 Wallerstein, Jr. .... B25D 17/043 267/137
2,646,729 A * 7/1953 Godenir .................. E01C 19/34 404/133.05
2,733,440 A 2/1956 Jenny et al.
2,768,244 A * 10/1956 Tiger ..................... G11B 15/32 360/90
3,086,207 A 4/1963 Lingle et al.
3,099,837 A 8/1963 Heilman et al.
3,180,435 A * 4/1965 McHenry ............ B25B 23/0035 173/131
3,193,049 A 7/1965 Wollek
3,205,721 A * 9/1965 Speer ..................... B23D 51/16 30/392
3,205,972 A 9/1965 Stricker et al.
3,228,422 A 1/1966 Bade
3,302,047 A 1/1967 Short
3,386,527 A 6/1968 Daubert et al.
3,498,517 A 3/1970 Novak
3,524,576 A 8/1970 Bader, I
3,563,438 A 2/1971 Doyle et al.
3,584,776 A 6/1971 Bolte
3,622,062 A 11/1971 Goode, Jr. et al.
3,653,299 A 4/1972 Howard
3,708,095 A 1/1973 Briggs, Jr.
3,711,008 A 1/1973 Clifford et al.
3,713,573 A 1/1973 Fehrs
3,812,726 A * 5/1974 Bell ...................... G01P 15/135 200/503
3,829,722 A 8/1974 Rosenthal, Jr. et al.
3,858,780 A 1/1975 Perkins et al.
3,858,781 A 1/1975 Obergfell et al.
3,908,884 A 9/1975 Schrepferman
4,042,036 A 8/1977 Smith et al.
4,053,094 A 10/1977 Males
4,107,591 A 8/1978 Herr et al.
4,107,604 A 8/1978 Bernier
4,121,745 A 10/1978 Smith et al.
4,129,240 A * 12/1978 Geist ......................... B25C 1/06 227/131
4,166,507 A * 9/1979 Bouyoucos .............. B25D 9/12 173/105
4,189,080 A 2/1980 Smith et al.
4,197,974 A 4/1980 Morton et al.
4,204,622 A * 5/1980 Smith ..................... B25C 1/003 173/1
4,253,598 A 3/1981 Haytayan
4,319,705 A 3/1982 Geist et al.
4,323,127 A * 4/1982 Cunningham ............ B25C 1/06 124/78
4,346,205 A 8/1982 Hiles
4,404,894 A 9/1983 Oesterle
4,423,970 A * 1/1984 Potter ........................ B41J 1/54 400/141.1
4,463,888 A 8/1984 Geist et al.
4,519,535 A * 5/1985 Crutcher ................... B25C 1/06 227/120
4,544,090 A 10/1985 Warman et al.
4,558,747 A * 12/1985 Cunningham ............ B25C 1/06 173/121
4,562,589 A 12/1985 Warnaka et al.
4,597,517 A 7/1986 Wagdy
4,601,408 A 7/1986 Billing et al.
4,624,401 A 11/1986 Gassner et al.
4,688,710 A 8/1987 Massari, Jr. et al.
4,784,308 A 11/1988 Novak et al.
4,825,596 A * 5/1989 Kinner .................... B24B 49/16 451/63
4,829,248 A 5/1989 Loubier
4,832,245 A 5/1989 Terayama et al.
4,854,492 A * 8/1989 Houck ...................... B25C 1/06 227/131
4,858,812 A 8/1989 Fealey
4,897,914 A 2/1990 Loubier
4,909,419 A 3/1990 Yamada et al.
4,928,868 A 5/1990 Kerrigan
4,964,558 A 10/1990 Crutcher et al.
4,966,041 A 10/1990 Miyazaki
4,981,373 A 1/1991 Bando
4,981,737 A 1/1991 Rico
5,069,379 A 12/1991 Kerrigan
5,083,694 A 1/1992 Lemos
5,098,004 A 3/1992 Kerrigan
5,131,579 A 7/1992 Okushima et al.
5,135,152 A 8/1992 Uno et al.
5,197,647 A 3/1993 Howell
5,216,823 A 6/1993 Ripley
5,231,750 A 8/1993 Fealey
5,263,842 A 11/1993 Fealey
5,266,917 A 11/1993 Bleeke et al.
5,297,713 A 3/1994 Perra et al.
5,363,569 A 11/1994 Kadakia
5,433,367 A 7/1995 Liu
5,436,516 A * 7/1995 Yamazaki ........... F16C 32/0438 310/156.32
5,443,196 A * 8/1995 Burlington ............... H02K 7/02 310/68 E
5,493,216 A 2/1996 Asa
5,511,715 A * 4/1996 Crutcher ................... B25C 1/06 227/131
5,603,595 A * 2/1997 Nygren, Jr. ............ B64G 1/222 411/6
5,605,268 A 2/1997 Hayashi et al.
5,624,150 A * 4/1997 Venier .................... B62D 21/09 16/384
5,647,525 A 7/1997 Ishizawa
5,669,542 A 9/1997 White
5,683,024 A 11/1997 Eminger et al.
5,723,923 A 3/1998 Clagett
5,813,588 A 9/1998 Lin
5,829,660 A 11/1998 White
5,848,655 A * 12/1998 Cooper ................... B25B 21/02 173/183
5,865,360 A 2/1999 White
5,873,509 A 2/1999 Liao
5,911,351 A 6/1999 White
5,924,621 A 7/1999 Hung
6,006,975 A 12/1999 Ishizawa
6,012,622 A 1/2000 Weinger et al.
6,036,072 A 3/2000 Lee
6,053,389 A 4/2000 Chu et al.
6,123,241 A 9/2000 Walter et al.
6,131,787 A 10/2000 Curtis
6,192,769 B1 2/2001 Stark et al.
6,196,332 B1 3/2001 Albert et al.
6,199,739 B1 3/2001 Mukoyama et al.

(56) References Cited

U.S. PATENT DOCUMENTS

| | | | | |
|---|---|---|---|---|
| 6,213,371 | B1 | 4/2001 | Cabrera | |
| 6,237,747 | B1 | 5/2001 | Gantner et al. | |
| 6,274,953 | B1 | 8/2001 | Hwang et al. | |
| 6,290,115 | B1 | 9/2001 | Chen | |
| 6,296,167 | B1 | 10/2001 | Jen | |
| 6,422,447 | B1 | 7/2002 | White et al. | |
| 6,425,306 | B1 | 7/2002 | Habermehl | |
| 6,431,430 | B1 | 8/2002 | Jalbert et al. | |
| 6,464,306 | B2 | 10/2002 | Shaw et al. | |
| 6,499,642 | B1 | 12/2002 | Amada | |
| 6,499,643 | B1 | 12/2002 | Hewitt | |
| 6,604,666 | B1 | 8/2003 | Pedicini et al. | |
| 6,641,022 | B2 | 11/2003 | Hamano et al. | |
| 6,679,413 | B2 | 1/2004 | Miller et al. | |
| 6,705,503 | B1 | 3/2004 | Pedicini et al. | |
| 6,739,490 | B1 | 5/2004 | Shkolnikov et al. | |
| 6,755,807 | B2 | 6/2004 | Risk, Jr. et al. | |
| 6,772,931 | B2 | 8/2004 | Miller et al. | |
| 6,796,476 | B2 | 9/2004 | Birk et al. | |
| 6,824,533 | B2 | 11/2004 | Risk, Jr. et al. | |
| 6,828,020 | B2 | 12/2004 | Fisher et al. | |
| 6,880,739 | B1 | 4/2005 | Zhu | |
| 6,892,921 | B2 | 5/2005 | Beville | |
| 6,894,595 | B2 | 5/2005 | Howell | |
| 6,938,812 | B2 | 9/2005 | Miller et al. | |
| 6,971,567 | B1 | 12/2005 | Cannaliato et al. | |
| 7,091,635 | B1 | 8/2006 | Gilliland et al. | |
| 7,137,541 | B2 | 11/2006 | Baskar et al. | |
| 7,138,595 | B2 | 11/2006 | Berry et al. | |
| 7,162,804 | B2 | 1/2007 | Matsuura | |
| 7,165,305 | B2 | 1/2007 | Kenney et al. | |
| 7,204,403 | B2 | 4/2007 | Kenney et al. | |
| 7,213,732 | B2 | 5/2007 | Schell et al. | |
| 7,213,733 | B1 | 5/2007 | Wen | |
| 7,225,961 | B1 | 6/2007 | Lee | |
| 7,243,831 | B2 | 7/2007 | Ishizawa et al. | |
| 7,285,877 | B2 | 10/2007 | Gorti et al. | |
| 7,314,155 | B2 | 1/2008 | Moeller et al. | |
| 7,322,506 | B2 | 1/2008 | Forster | |
| 7,325,712 | B2 | 2/2008 | Schiestl | |
| 7,331,403 | B2 | 2/2008 | Berry et al. | |
| 7,410,085 | B2 | 8/2008 | Wolf et al. | |
| 7,500,589 | B2 | 3/2009 | Wolf et al. | |
| 7,503,401 | B2 | 3/2009 | Gross et al. | |
| 7,513,404 | B2 | 4/2009 | Shkolnikov et al. | |
| 7,520,414 | B2 | 4/2009 | Blessing et al. | |
| 7,532,096 | B2 | 5/2009 | Zindler | |
| 7,537,146 | B2 | 5/2009 | Schiestl | |
| 7,575,142 | B2 | 8/2009 | Liang et al. | |
| 7,594,547 | B2 | 9/2009 | Berry et al. | |
| 7,619,499 | B2 | 11/2009 | Wieler et al. | |
| 7,641,089 | B2 | 1/2010 | Schell et al. | |
| 7,686,199 | B2 | 3/2010 | Gross et al. | |
| 7,694,863 | B2 | 4/2010 | Spasov et al. | |
| 7,699,201 | B2 | 4/2010 | Hagan et al. | |
| 7,726,536 | B2 | 6/2010 | Gross et al. | |
| 7,762,443 | B2 | 7/2010 | Tamura et al. | |
| 7,766,204 | B2 | 8/2010 | Spasov et al. | |
| 7,777,482 | B2 | 8/2010 | Munz et al. | |
| 7,789,169 | B2 | 9/2010 | Berry et al. | |
| 7,793,811 | B1 | 9/2010 | Pedicini et al. | |
| 7,810,688 | B2 | 10/2010 | Wu et al. | |
| 7,861,905 | B2 | 1/2011 | Miescher et al. | |
| 7,870,988 | B2 | 1/2011 | Schiestl et al. | |
| 7,922,059 | B2 | 4/2011 | Schiestl et al. | |
| 7,942,651 | B2 | 5/2011 | Bin-Nun et al. | |
| 7,975,893 | B2 | 7/2011 | Berry et al. | |
| 7,980,439 | B2 | 7/2011 | Akiba et al. | |
| 7,997,467 | B2 | 8/2011 | Hirabayashi et al. | |
| 8,011,549 | B2 | 9/2011 | Berry et al. | |
| 8,047,415 | B2 | 11/2011 | Kunz et al. | |
| 8,079,504 | B1 | 12/2011 | Pedicini et al. | |
| 8,088,406 | B2 | 1/2012 | Potter et al. | |
| 8,096,456 | B2 | 1/2012 | Kunz et al. | |
| 8,123,099 | B2 | 2/2012 | Kenney et al. | |
| 8,132,702 | B2 | 3/2012 | Kunz et al. | |
| 8,210,409 | B2 * | 7/2012 | Hirabayashi | B25C 1/06 227/131 |
| 8,231,039 | B2 | 7/2012 | Buck et al. | |
| 8,302,833 | B2 | 11/2012 | Gross et al. | |
| 8,336,748 | B2 | 12/2012 | Hlinka et al. | |
| RE44,001 | E | 2/2013 | Pedicini et al. | |
| 8,381,960 | B2 | 2/2013 | Bruggmueller et al. | |
| 8,397,967 | B2 | 3/2013 | Calvet et al. | |
| 8,485,407 | B2 | 7/2013 | Liu et al. | |
| 8,523,035 | B2 | 9/2013 | Pedicini et al. | |
| 8,534,527 | B2 * | 9/2013 | Brendel | B25C 5/15 227/132 |
| 8,550,324 | B2 | 10/2013 | Coleman | |
| 8,555,997 | B2 * | 10/2013 | Carrier | B25F 5/00 173/2 |
| 8,602,283 | B2 | 12/2013 | Tamura et al. | |
| 8,746,526 | B2 * | 6/2014 | Hlinka | B25C 1/008 227/8 |
| 8,763,874 | B2 | 7/2014 | McCardle et al. | |
| 9,065,305 | B2 * | 6/2015 | Trinkner | B23K 9/1006 |
| 9,248,539 | B2 * | 2/2016 | Tajima | B23Q 15/08 |
| 9,346,158 | B2 | 5/2016 | Garber et al. | |
| 9,469,021 | B2 | 10/2016 | Gregory et al. | |
| 9,473,053 | B2 | 10/2016 | Lim et al. | |
| 9,498,871 | B2 | 11/2016 | Gregory et al. | |
| 9,566,692 | B2 * | 2/2017 | Seith | B25B 21/02 |
| 9,643,305 | B2 | 5/2017 | Gregory et al. | |
| 9,649,755 | B2 | 5/2017 | Gregory et al. | |
| 9,808,924 | B2 | 11/2017 | Wu | |
| 9,815,160 | B2 * | 11/2017 | Nitsche | B25D 16/006 |
| 9,827,658 | B2 | 11/2017 | Gregory et al. | |
| 10,022,848 | B2 * | 7/2018 | Gross | B25F 5/00 |
| 10,406,662 | B2 * | 9/2019 | Leh | B25B 21/02 |
| 10,414,033 | B2 | 9/2019 | Ekstrom et al. | |
| 10,434,634 | B2 | 10/2019 | Garber | |
| 10,882,166 | B2 * | 1/2021 | Asplund | B25B 21/02 |
| 10,888,981 | B2 | 1/2021 | Gregory et al. | |
| 11,179,836 | B2 | 11/2021 | Gregory et al. | |
| 11,229,995 | B2 | 1/2022 | Gregory et al. | |
| 12,151,348 | B2 | 11/2024 | Gregory et al. | |
| 2002/0007559 | A1 * | 1/2002 | Morabit | A01D 34/416 30/276 |
| 2002/0053587 | A1 | 5/2002 | White et al. | |
| 2002/0060233 | A1 | 5/2002 | Akiba | |
| 2002/0117893 | A1 | 8/2002 | Shaw et al. | |
| 2002/0158103 | A1 | 10/2002 | Driscoll et al. | |
| 2003/0000990 | A1 | 1/2003 | White et al. | |
| 2003/0030682 | A1 | 2/2003 | Kim et al. | |
| 2003/0042285 | A1 | 3/2003 | Wang | |
| 2003/0066858 | A1 | 4/2003 | Holgersson | |
| 2003/0230621 | A1 | 12/2003 | Yamamoto et al. | |
| 2003/0230622 | A1 | 12/2003 | Rotharmel | |
| 2004/0189284 | A1 | 9/2004 | Haubold et al. | |
| 2004/0219322 | A1 | 11/2004 | Fisher et al. | |
| 2004/0232194 | A1 | 11/2004 | Pedicini et al. | |
| 2005/0000998 | A1 | 1/2005 | Grazioli et al. | |
| 2005/0029391 | A1 * | 2/2005 | Cocciadiferro | B65H 19/10 242/597.1 |
| 2005/0050712 | A1 | 3/2005 | Lat et al. | |
| 2005/0217874 | A1 | 10/2005 | Forster et al. | |
| 2005/0217875 | A1 | 10/2005 | Forster et al. | |
| 2005/0218175 | A1 | 10/2005 | Schell et al. | |
| 2005/0218176 | A1 | 10/2005 | Schell et al. | |
| 2005/0218183 | A1 * | 10/2005 | Berry | B25C 1/06 227/130 |
| 2005/0218186 | A1 | 10/2005 | Forster | |
| 2005/0220445 | A1 | 10/2005 | Baskar et al. | |
| 2005/0289264 | A1 | 12/2005 | Illowsky et al. | |
| 2006/0000863 | A1 | 1/2006 | McGee et al. | |
| 2006/0011694 | A1 | 1/2006 | Ishizawa et al. | |
| 2006/0016843 | A1 | 1/2006 | Ishizawa et al. | |
| 2006/0078438 | A1 * | 4/2006 | Wood | F04B 17/03 417/364 |
| 2006/0091179 | A1 | 5/2006 | Moeller et al. | |
| 2006/0155582 | A1 | 7/2006 | Brown | |
| 2006/0161111 | A1 | 7/2006 | Potter et al. | |
| 2006/0169738 | A1 | 8/2006 | Ogawa et al. | |

(56) References Cited

U.S. PATENT DOCUMENTS

2006/0243020 A1 11/2006 Herod
2006/0249554 A1 11/2006 Butzen et al.
2006/0261125 A1* 11/2006 Schiestl .................... B25C 1/06 227/131
2007/0037102 A1 2/2007 Mowry
2007/0075112 A1 4/2007 Porth et al.
2007/0108029 A1 5/2007 Wieler et al.
2007/0210133 A1 9/2007 Oda et al.
2008/0006670 A1 1/2008 Wen
2008/0099526 A1 5/2008 Kenney et al.
2008/0112056 A1 5/2008 Raymond et al.
2008/0223900 A1 9/2008 Tanji
2008/0251567 A1 10/2008 Shkolnikov et al.
2008/0302846 A1 12/2008 Thompson
2008/0308597 A1 12/2008 Wojcicki
2009/0025701 A1 1/2009 Douglas et al.
2009/0030442 A1 1/2009 Potter et al.
2009/0032567 A1 2/2009 Liang et al.
2009/0050667 A1 2/2009 Po
2009/0057365 A1 3/2009 Murayama et al.
2009/0057366 A1 3/2009 Braddock
2009/0095787 A1 4/2009 Liang et al.
2009/0183888 A1 7/2009 Forster et al.
2009/0194573 A1* 8/2009 Liang ........................ B25C 1/06 227/129
2009/0200354 A1 8/2009 Arata et al.
2009/0250500 A1* 10/2009 Brendel .................... B25C 1/06 227/132
2009/0275273 A1 11/2009 Purohit et al.
2009/0294505 A1 12/2009 Kunz et al.
2009/0294508 A1 12/2009 Kunz et al.
2009/0321098 A1* 12/2009 Hull ......................... B23Q 5/06 228/32
2009/0321492 A1 12/2009 Shima et al.
2010/0095645 A1* 4/2010 Tippery ............... A01D 34/305 74/25
2010/0206934 A1 8/2010 Vallon et al.
2010/0213232 A1* 8/2010 Krondorfer ............... B25C 1/06 227/8
2010/0213236 A1* 8/2010 Zhang ....................... B25C 1/06 227/131
2010/0289484 A1 11/2010 Quinn
2011/0062207 A1 3/2011 Hlinka et al.
2011/0132959 A1* 6/2011 Hlinka .................... B25C 1/008 227/8
2011/0139478 A1 6/2011 Brennenstuhl et al.
2011/0180284 A1 7/2011 Carrier et al.
2011/0248062 A1* 10/2011 Fujimoto .................. B25C 1/06 227/8
2011/0259938 A1 10/2011 Chien et al.
2012/0001505 A1 1/2012 Henke et al.
2012/0097729 A1 4/2012 Gross et al.
2012/0124988 A1* 5/2012 Nelson .................. F16H 61/433 60/459
2012/0184192 A1* 7/2012 Kawamata ............ B24B 55/102 451/453
2012/0187178 A1 7/2012 Campbell
2012/0255749 A1* 10/2012 Seith ....................... B25B 13/06 173/1
2013/0021346 A1 1/2013 Terman
2013/0030436 A1* 1/2013 LeCronier ............ A61B 17/725 606/64
2013/0052594 A1 2/2013 Carroll-Yacoby et al.
2013/0186221 A1 7/2013 Weiberle et al.
2013/0192432 A1* 8/2013 Barker .................... B26B 19/36 83/13
2013/0233903 A1 9/2013 Brendel et al.
2013/0320059 A1 12/2013 Gregory et al.
2013/0320060 A1 12/2013 Gregory et al.
2013/0320063 A1 12/2013 Gregory et al.
2013/0320064 A1 12/2013 Gregory et al.
2013/0320066 A1 12/2013 Gregory et al.
2013/0320067 A1 12/2013 Gregory et al.
2013/0320068 A1 12/2013 Gregory et al.
2014/0054350 A1 2/2014 Pedicini
2014/0076952 A1 3/2014 Garber et al.
2014/0100687 A1 4/2014 Ekstrom et al.
2014/0161412 A1 6/2014 Chase et al.
2014/0263424 A1 9/2014 Fortuna
2014/0360744 A1 12/2014 Lawrence
2015/0053736 A1 2/2015 Pomeroy et al.
2015/0096776 A1* 4/2015 Garber ...................... B25C 1/00 173/1
2015/0251240 A1 9/2015 LeMieux
2015/0357061 A1* 12/2015 Ales ....................... G21C 21/02 376/282
2016/0023341 A1* 1/2016 Gross ........................ B25C 1/06 173/117
2016/0023342 A1* 1/2016 Koenig ..................... B25C 1/06 227/147
2017/0028537 A1* 2/2017 McClung .............. B25B 21/026
2017/0066116 A1* 3/2017 Garber ...................... B25C 1/06
2017/0113334 A1* 4/2017 Seith ................... B25B 23/0035
2017/0247060 A1* 8/2017 Jarvis ................... B62D 25/025
2017/0361442 A1 12/2017 Fairbanks et al.
2017/0361443 A1 12/2017 Sareault et al.
2018/0054102 A1* 2/2018 Mizukami .............. H02K 7/086
2018/0071904 A1 3/2018 Gregory et al.
2018/0085904 A1 3/2018 Gregory et al.
2018/0126529 A1* 5/2018 Pomeroy ................. B25C 1/008
2018/0222310 A1* 8/2018 Berlinger, Jr ......... F16H 57/021
2018/0361560 A1* 12/2018 Chen ....................... B25F 5/006
2019/0366527 A1* 12/2019 Akiba ....................... B25C 5/15
2020/0039037 A1* 2/2020 McClung ............ B25B 23/0035
2020/0039044 A1* 2/2020 Akiba ....................... B25C 1/06
2020/0114501 A1* 4/2020 Mashiko ................... B25C 1/06
2020/0306942 A1* 10/2020 Koenig ..................... B25F 5/00 173/124
2021/0107125 A1 4/2021 Gregory et al.
2021/0109134 A1* 4/2021 Suzuki ................... G01R 31/52
2021/0222684 A1* 7/2021 Zhu ..................... F04B 39/0022
2021/0354278 A1* 11/2021 Lai ............................ B25C 1/06
2022/0080571 A1 3/2022 Gregory et al.
2022/0118593 A1 4/2022 Gregory et al.
2022/0173633 A1* 6/2022 Heizmann .............. H02K 7/145
2024/0100669 A1 3/2024 Gregory et al.

FOREIGN PATENT DOCUMENTS

CN 101032813 A 9/2007
CN 102900806 A 1/2013
EP 0230050 A1 7/1987
EP 0387211 A2 9/1990
EP 0663269 A1 7/1995
EP 0927605 A2 7/1999
EP 2002935 A2 12/2008
EP 2127818 A1 * 12/2009 ............... B25C 1/06
EP 2127819 A1 12/2009
EP 2230050 A1 9/2010
EP 2527095 A1 * 11/2012 ............... B25C 1/06
EP 2711135 A2 3/2014
EP 2979821 A1 * 2/2016 ................ B25F 5/00
EP 3181294 A1 * 6/2017 ............... B25C 1/06
GB 1438264 6/1976
JP S6135247 U * 3/1986
JP 4101078 A 4/1992
JP 04331848 A * 11/1992
JP H04331848 A * 11/1992
JP 2007167986 A 7/2007
JP 5620772 B2 11/2014
WO 2004052595 A1 6/2004
WO 2007126735 A2 11/2007

OTHER PUBLICATIONS

Extended European Search Report, Application No. 13170116.1-1019 / 2669058, EPO (dated Mar. 20, 2018).
European Patent Office. Eurpoean Search Report for or EP 13170109.6 (dated Jun. 2, 2016).
Extended European Search Report, Application No. 17161682.4-1019 / 3213873, EPO (dated Jul. 13, 2018).

(56) References Cited

OTHER PUBLICATIONS

Extended European Search Report, EP Application 16194343.6-1701, EPO (dated May 24, 2017).
European Search Report, Application No. 16 194 343.6-1019, EPO (dated Aug. 29, 2018).
Extended European Search Report, Application No. 17161681.6-1019 / 3213872, EPO (dated Aug. 2, 2018).
Extended European Search Report, Application No. 14187710.0-1701, EPO (dated Oct. 15, 2015).
Communication Pursuant To Article 94(3) EPC, Application No. 13 170 106.2-1019, EPO (dated Mar. 26, 2019).
Communication Pursuant To Article 94(3) EPC, Application No. 13 170 108.8-1019, EPO (dated Mar. 13, 2019).
Communication Pursuant To Article 94(3) EPC, Application No. 16 194 343.6-1019, EPO (dated Aug. 29, 2018).
Extended European Search Report, Application No. 13170097.3-1019 / 2716408, EPO (dated Mar. 15, 2018).
Extended European Search Report, Application No. 15827030.6-1019 / 3174667, EPO (dated Mar. 2, 2018).
PCT International Search Report, Application No. PCT/CN2015/076257, ISA (dated Jun. 29, 2016).
Extended European Search Report, Application No. 15 178 620.9-1701, EPO (dated Dec. 1, 2015).
Communication Pursuant To Article 94(3) EPC, EP Application No. 13 170 113.8-1019, EPO (Oct. 25, 2018).
Communication Pursuant To Article 94(3) EPC, EP Application No. 13 170 109.6-1019, EPO (Oct. 25, 2018).
Extended European Search Report, Application No. 13170108.8-1701 / 2669054, EPO (Jun. 22, 2016).
Extended European Search Report, Application No. 13170106.2-1701 / 2669053, EPO (May 20, 2016).

* cited by examiner (Using 16g Springs)

| | Best Case 3.5" Nail in High Speed (13k and 11k respectively) and Deep Setting | | Worst Case 2" Nail in High Speed (13k and 11k respectively) and Shallow Setting | | Dry FireHigh Speed (13k and 11k respectively) | |
|---|---|---|---|---|---|---|
| | Stock Motor | High Inertia Motor | Stock Motor | High Inertia Motor | Stock Motor | High Inertia Motor |
| Mass (kg) | 0.003 | 0.003 | 0.003 | 0.003 | 0.003 | 0.003 |
| Velocity (m/s) | 11.0 | 10.8 | 21.6 | 19.0 | 25.6 | 22.9 |
| KE (J) | 0.172 | 0.165 | 0.662 | 0.512 | 0.930 | 0.744 |

FIG. 28B

HIGH INERTIA DRIVER SYSTEM

CROSS-REFERENCE TO RELATED APPLICATIONS

This patent application claims benefit of the filing date of U.S. provisional patent application No. 62/244,143 entitled "High Inertia Driver System" filed on Oct. 20, 2015. This patent application is a continuation-in-part application of copending U.S. patent application Ser. No. 14/498,475 entitled "Nailer Driver Blade Stop" filed Sep. 26, 2014, which issued as U.S. Pat. No. 10,434,634 B2 on Oct. 8, 2019, which is a nonprovisional patent application of U.S. provisional patent application No. 61/961,247 entitled "Nailer Driver Blade Stop" filed on Oct. 9, 2013, to which benefit of priority is also claimed. This patent application is also a continuation-in-part application of copending U.S. patent application Ser. No. 14/444,982 entitled "Power Tool Drive Mechanism" filed Jul. 28, 2014, which issued as U.S. Pat. No. 10,022,848 B2 on Jul. 17, 2018.

INCORPORATION BY REFERENCE

This patent application incorporates by reference in its entirety U.S. provisional patent application No. 62/244,143 entitled "High Inertia Driver System" filed on Oct. 20, 2015. This patent application incorporates by reference in its entirety copending U.S. patent application Ser. No. 14/498,475 entitled "Nailer Driver Blade Stop" filed Sep. 26, 2014, which issued as U.S. Pat. No. 10,434,634 B2 on Oct. 8, 2019, which is a nonprovisional patent application of US provisional patent application No. 61/961,247 entitled "Nailer Driver Blade Stop" filed on Oct. 9, 2013, which is also incorporated by reference in its entirety herein. This patent application also incorporates by reference in its entirety copending U.S. patent application Ser. No. 14/444,982 entitled "Power Tool Drive Mechanism" filed Jul. 28, 2014, which issued as U.S. Pat. No. 10,022,848 B2 on Jul. 17, 2018.

FIELD OF THE INVENTION

The present invention relates to a drive system for a nailer.

BACKGROUND OF THE INVENTION

Fastening tools, such as nailers, are used in the construction trades. However, many fastening tools which are available do not provide an operator with fastener driving mechanisms which exhibit reliable fastener driving performance. Many available fastening tools do not adequately guard the moving parts of a nailer driving mechanism from damage. These failures are even more pronounced during high energy and/or high-speed driving. Improper driving of fasteners, failure of parts and damage to the tool can occur. Additionally, undesired driver blade recoil and/or undesired driver blade return dynamics can frequently occur and can result in misfires, jams, damage to the tool and loss of work efficiency. This recoil energy in the driver blade can frequently cause an unintentional driving of a second fastener. In the case of a cordless nailer having mechanical return springs, this unintentional driving of a second nail can be very common. Unintentionally driving a second nail can risk damage to the work surface, jams, misfires, or tool failures. Many available fastening tools experience misfire and produce unacceptable rates of damaged fasteners when fired.

Further, many available fastening tools do not adequately guard the moving parts of a nailer driving mechanism from damage.

Additionally, a nailer which uses one or more return springs can experience spring failure which can render a nailer inoperable. A nailer having such a failed spring must be discarded or the failed spring must be replaced and the nailer repaired. Spring failure, tool replacement or repair are inconvenient to an operator and incur unwanted expenses.

In addition to the above, many available cordless nailer designs which do not use a piston cylinder arrangement are only capable of driving finish nails. They are unable to drive fasteners into concrete and/or metal. They are also inadequate to drive fasteners into various types of hard or dense construction materials. There is a strong need for a reliable and an effective fastener driving mechanism.

SUMMARY OF THE INVENTION

A high inertia driver system for a fastening tool is disclosed herein which has an electric motor that drives a flywheel to contact a driver blade to drive a fastener into a workpiece. The high inertia driver system also has a return system which prevents the unintentional driving of a second fastener. The return system can use a return spring and one or more bumpers that control the recoil energy of the driver blade after driving a fastener into a workpiece. The high inertia driver system achieves a long operational life for the fastening tool in part by increasing the number of return cycles of the driver blade free of a return spring failure.

In an embodiment, the fastening tool can also have a cupped flywheel. The cupped flywheel can have a flywheel ring. In an embodiment, at least a portion of the cupped flywheel can be cantilevered over at least a portion of said motor and/or motor housing. The cupped flywheel can have a contact surface. The cupped flywheel can have a geared flywheel ring. In an embodiment, the cupped flywheel can have a mass in a range of from about 28.4 g to about 570 g. In another embodiment, the fastening tool can have a cantilevered flywheel which can have a diameter in a range of from about 0.02 m to about 0.3 m. The cantilevered flywheel can be adapted to rotate at an angular speed of from about 500 rads/s to about 1500 rads/s. The cantilevered flywheel can be adapted to have a flywheel energy in a range of from about 10 J to about 500 J or greater, such as 1500 J.

The cupped flywheel portion can radially surround at least a portion of the motor. The motor which is provided can have an inner rotor or an outer rotor. Additionally, the motor provided can be a brushed motor or a brushless motor.

In an embodiment, a high inertia drive mechanism for a nailer can have an electric motor having a rotor and a rotor shaft coupled to a flywheel. The motor can be adapted to rotate said flywheel. The flywheel can be adapted to impart a force upon a driver blade when a portion of the flywheel is contacted with a portion of a driver blade. When a portion of the flywheel is contacted with a portion of a driver blade, the driver blade can be driven at a speed of 30 m/s or less. The flywheel can have a speed 15000 rpm, or less. In an embodiment, the speed of the driver blade is in a range of 10 m/s to 30 m/s. In an embodiment, the flywheel can have an inertia in a range of 0.10 g*m^2-0.40 g*m^2, when a portion of the flywheel is contacted with a portion of a driver blade. In an embodiment, the pinch force imparted by a portion of the flywheel to a driver blade when in contact with a portion of the driver blade can be in a range of 222 N-2669 N. The mass of the driver blade can be in a range of 80 g to 200 g.

In an embodiment, a nailer can have an electric motor having a rotor having a rotor shaft coupled to a flywheel. The driver blade can be driven when a portion of the flywheel is contacted with a portion of the driver blade. The nailer can have a return system having a spring adapted to be compressed at least in part during a return cycle when said driver blade returns after driving a faster into a workpiece. The return system can achieve 24000 return cycles, 42000 return cycles, 60000 return cycles, 100000 return cycles or greater, without, or free of, a spring failure. In an embodiment, the nailer can have the mass of the driver blade in a range of 50 g to 500 g, or 80 g to 200 g. The flywheel can have an inertia is in a range of 0.10 g*m^2-0.40 g*m^2 when said portion of the flywheel is contacted with said portion of the driver blade. A pinch force can be imparted by the flywheel when in contact with a portion of the driver blade in a range of 222 N to 2669 N. The contact by a portion of the flywheel to a portion of the driver blade can drive the driver blade at a speed in a range of 10 m/s to 30 m/s.

A method of operating a nailer can have the steps of: providing a flywheel; generating an inertia of said flywheel of 0.10 g*m^2, or greater; contacting a portion of the flywheel with a portion of the driver blade, said contacting driving said driver blade; providing a return system having a spring adapted to be compressed at least in part during a return cycle when said driver blade returns after driving a faster into a workpiece; and said return system achieving, or executing, 24000 return cycles, or greater, without a spring failure. In an embodiment, the flywheel can be a cantilevered flywheel. The fastener can be a nail, or other type of fastener.

In an embodiment, the method of operating a nailer can also have the steps of: providing a first operating mode, wherein said driver blade speed is a first speed; and providing a second operating mode, wherein said driver blade speed is a second speed different from said first speed. Optionally, the first operating mode, wherein said driver blade speed can be a first speed in a range of 13000 m/s to 15000 m/s; and the second operating mode, wherein said driver blade speed can be a second speed in a range of 7000 m/s to 12900 m/s.

In an embodiment, the method of operating a nailer can have the step of driving the driver blade at a driver blade speed of 30 m/s or less. In an embodiment, the mass of the driver blade can be 80 g, or greater.

The method of operating a nailer can also have the step of contacting a portion of the flywheel with a portion of the driver blade when the inertia of the flywheel is in a range of 0.10 g*m^2-0.40 g*m^2. In an embodiment, the method of operating a nailer can have the step of contacting a portion of the flywheel with a portion of the driver blade when the flywheel has a speed 15000 rpm or less.

In an embodiment, the method of operating a nailer can have the step of imparting a pinch force of 222 N or greater from a portion of the flywheel to a driver blade, when a portion of the flywheel contacts a portion of the driver blade.

BRIEF DESCRIPTION OF THE DRAWINGS

The present invention in its several aspects and embodiments solves the problems discussed above and significantly advances the technology of fastening tools. The present invention can become more fully understood from the detailed description and the accompanying drawings, wherein:

FIG. 28B is a data table for an exemplary high inertia driver system showing dry fire data.

Herein, like reference numbers in one figure refer to like reference numbers in another figure.

DETAILED DESCRIPTION OF THE INVENTION

Figure 1:
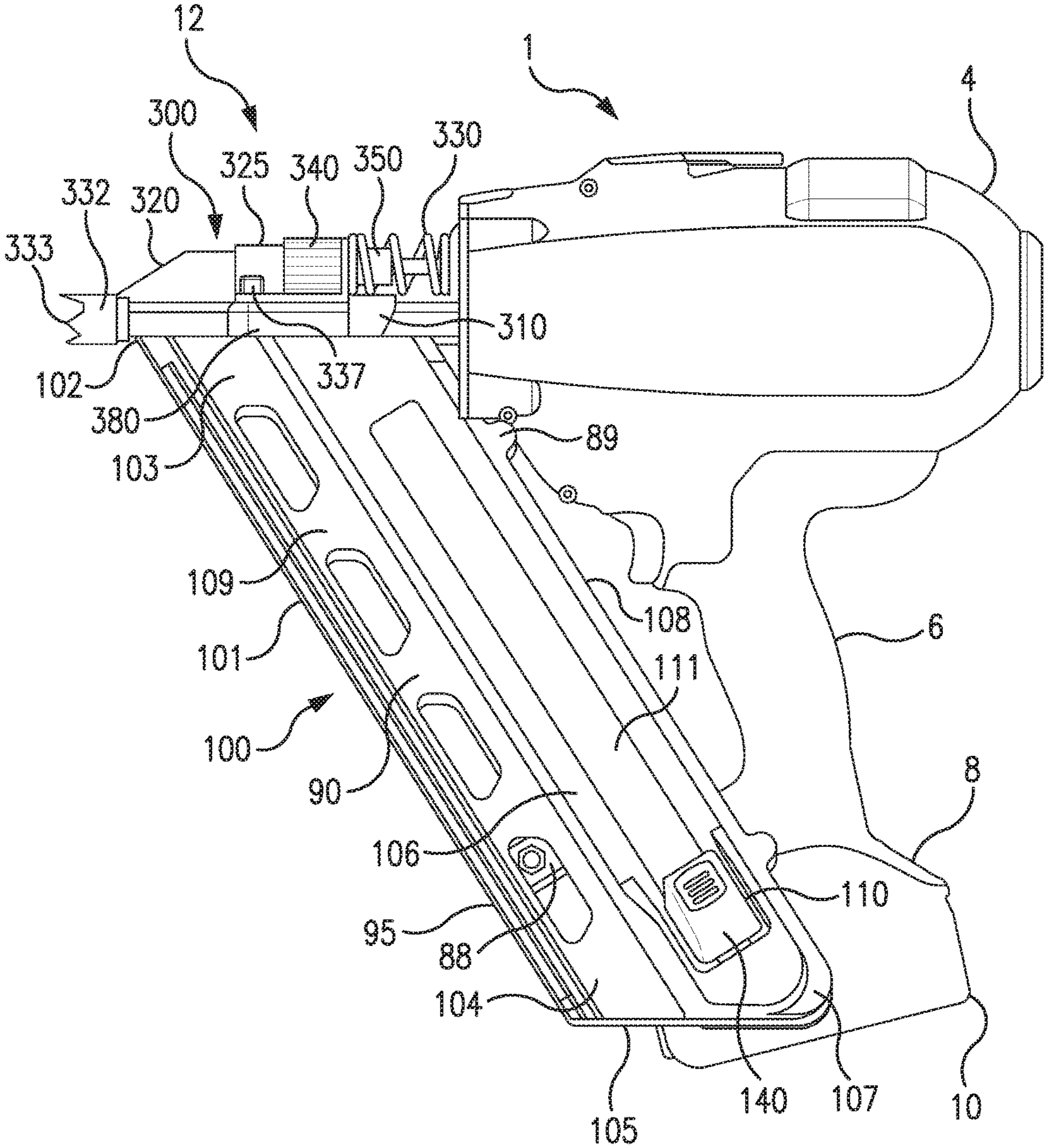
FIG. 1 is a knob-side side view of an exemplary nailer having a fixed nosepiece assembly and a magazine.

In a fastening tool such as a nailer, energy effects associated with the return of a driver blade after driving a nail can cause the driver blade to move in unpredictable and hard to control manners which can cause a misfire or mechanical damage to the fastening tool. The embodiments disclosed herein solve the problems regarding driver blade movement during the return phase. The effects of the driver blade return on a return system having one or more return springs can cause the springs to fail thereby requiring maintenance. The embodiments herein of the high inertia driver system solve the problem of return spring failure and achieve a long-life driver blade return system. The high inertia driver system can include, in an embodiment, a motor, flywheel and driver blade.

The inventive fastening tool can have of a variety of designs and can be powered by a number of power sources. For example, power sources for the fastening tool can be manual, pneumatic, electric, combustion, solar or use other (or multiple) sources of energy. In an embodiment, the fastening tool can be cordless and the driver blade stop can be used in a framing nailer, wood nailer, concrete nailer, metal nailer, steel nailer, or other type of nailer, or fastening tool. The nailer driver blade stop can be used in a broad variety of nailers whether cordless, with a power cord, gas assisted, or of another design. Herein, the embodiments of the high inertia driver system can be used to achieve a framing nailer, or other nailer, having a long-life driver return system.

The nailer driver blade stop and/or high inertia driver system disclosed herein can be used with fastening tools, including but not limited to, nailers, drivers, riveters, screw guns and staplers. Fasteners, which can be used with the driver blade stop, can be in non-limiting examples, roofing nails, finishing nails, duplex nails, brads, staples, tacks, masonry nails, screws and positive placement/metal connector nails, pins, rivets and dowels. The inventive fastening tool can be used to drive fasteners into a broad variety of work pieces, such as wood, composites, metal, steel, drywall, amorphous materials, concrete and other hard and soft building materials.

In an embodiment the nailer driver blade stop and/or high inertia driver system can be used in fastening tools for the following applications: framing (metal or wood), fencing, decking, creating basement water barriers, and installing furring strips in concrete structures (carpet tack strips). In an embodiment, the nailer driver blade stop can be used with cordless nailers having high drive energies, such as to drive fasteners into concrete, framing, metal connecting members, structural steel, composites, or for duplex stapling.

Additional areas of applicability of the present invention can become apparent from the detailed description provided herein. For example, the nailer driver blade stop and/or high inertia driver system in its several embodiments and many aspects can be employed for use with fastening tools other than nailers and can be used with fasteners other than nails, such as pins. The detailed description and specific examples herein are not intended to limit the scope of the invention.

FIG. 1 is a side view of an exemplary nailer having a magazine viewed from the pusher side 90 and showing the pusher 140. A magazine 100 which is constructed according to the principles of the present invention is shown in operative association with a nailer 1. In this FIG. 1 example, nailer 1 is a cordless nailer. However, the nailer can be of a different type and/or a different power source. Nailer 1 can have a housing 4 and a motor 5000 (FIG. 15), which can be in an inner rotor motor. The motor 5000 is disposed in the housing 4, and drives a nail driving mechanism for driving nails fed from the magazine 100. A handle 6 extends from housing 4 to a base portion 8 having a battery pack 10. Battery pack 10 is configured to engage a base portion 8 of handle 6 and provides power to the motor 5000 such that nailer 1 can drive one or a series nails fed from the magazine 100. Nailer 1 can have a nosepiece assembly 12 which is coupled to housing 4.

The magazine 100 can optionally be coupled to housing 4 by coupling member 89. The magazine 100 has a nose portion 103 which can be proximate to the fixed nosepiece assembly 300. The nose portion 103 of the magazine 100 which has a nose end 102 that engages a fixed nosepiece assembly 300. A base portion 104 of magazine 100 by base coupling member 88 can be coupled to the base portion 8 of a handle 6. The base portion 104 of magazine 100 is proximate to a base end 105 of the magazine 100. The magazine can have a magazine body 106 with an upper magazine 107 and a lower magazine 109. An upper magazine edge 108 is proximate to and can be attached to housing 4. The lower magazine 109 has a lower magazine edge 101.

The magazine includes a nail track 111 sized to accept a plurality of nails 55 therein. The upper magazine 107 can guide at least one end of a nail. In another embodiment, lower magazine 109 can guide another portion of the nail or another end of the nail. In an embodiment, the plurality of nails 55 can have nail tips which are supported by a lower liner 95. The plurality of nails 55 are loaded into the magazine 100 by inserting them into the nail track 111 through a nail feed slot which can be located at or proximate to the base end 105. The plurality of nails 55 can be moved through the magazine 100 towards the fixed nosepiece assembly 300, or generally, the nosepiece assembly 12, by a force imparted by contact from the pusher assembly 110.

FIG. 1 illustrates an example embodiment of the fixed nosepiece assembly 300 which has an upper contact trip 310 and a lower contact trip 320. The lower contact trip 320 can be guided and/or supported by a lower contact trip support 325. The fixed nosepiece assembly 300 also can have a nose 332 which can be designed to have a nose tip 333. When the nose 332 is pressed against a workpiece, the lower contact trip 320 and the upper contact trip 310 can be moved toward the housing 4 and a contact trip spring 330 is compressed. The fixed nosepiece assembly 300 is adjustable and has a depth adjust member that allows the user to adjust the driving characteristics of the fixed nosepiece assembly 300. A depth adjustment wheel 340 can be rotated to affect the position of a depth adjustment rod 350. The position of the depth adjustment rod 350 also affects the distance between nose tip 333 and insert tip 355 (e.g. FIG. 2A). In an embodiment, depth adjustment can be achieved by changing the relative distance between the upper contact trip 310 and the lower contact trip 320.

In an embodiment, one or more of a magazine screw 337 can be used to reversibly fix the nosepiece assembly 300 to the magazine 100. The fixed nosepiece assembly 300 can fit with the magazine 100 by a magazine interface 380. In an embodiment, the pusher assembly 110 can be placed in an engaged state by the movement of the pusher 140 into the nail track 111 and in the direction of loading fasteners (e.g. nails) to push the plurality of nails 55 toward the nose end 102.

Figure 2:
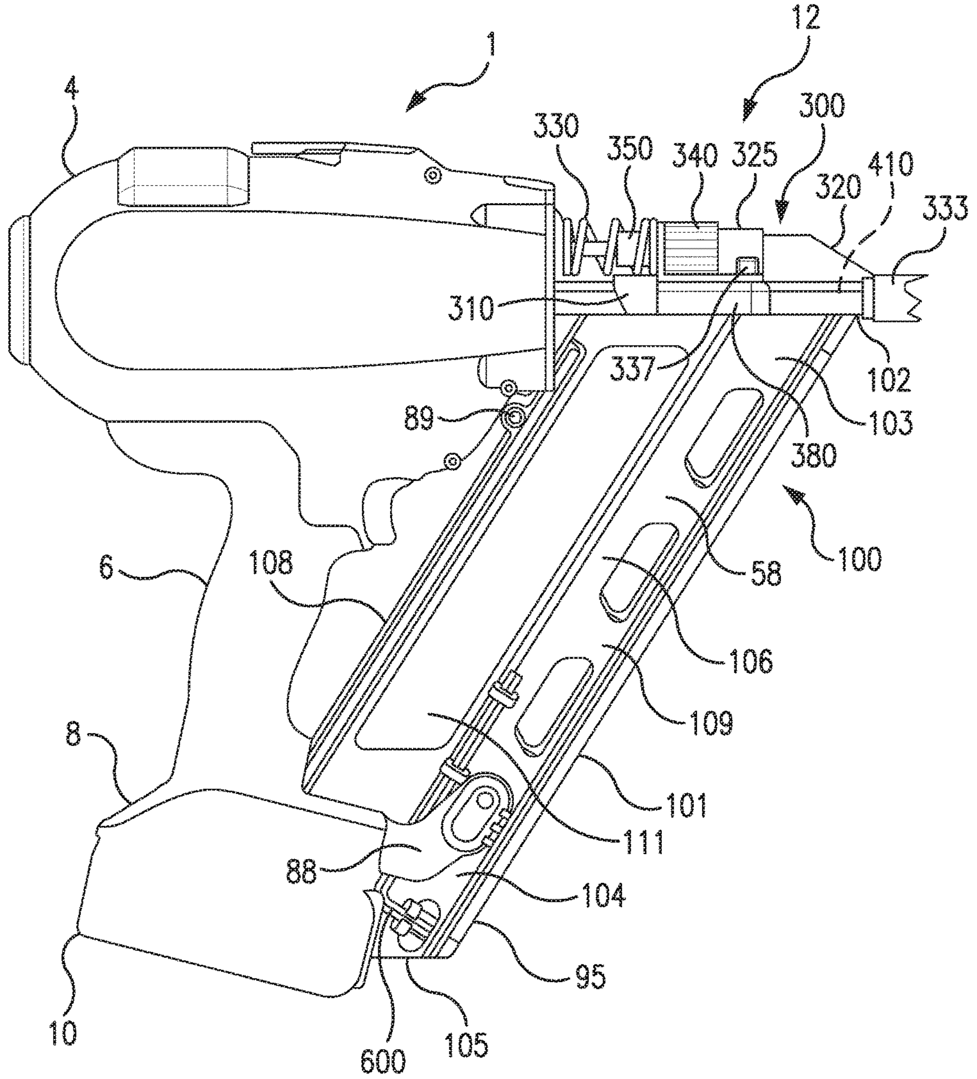
FIG. 2 is a nail-side view of an exemplary nailer having a fixed nosepiece assembly and a magazine.

FIG. 2 is a side view of exemplary nailer 1 viewed from a nail-side 58. Allen wrench 600 is illustrated as reversibly secured to the magazine 100.

Figure 2A:
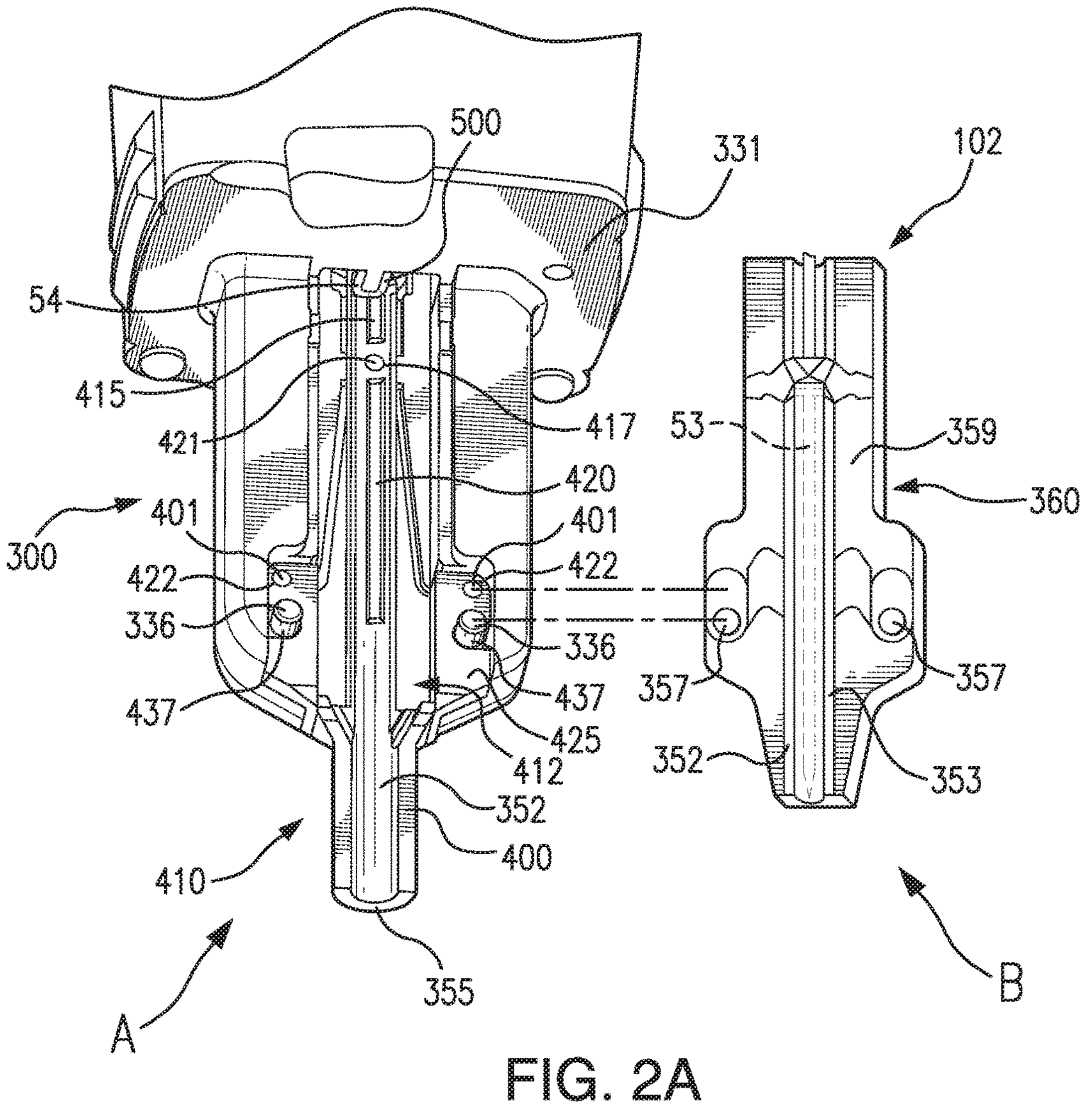
FIG. 2A is a detailed view of a fixed nosepiece with a nosepiece insert and a mating nose end of a magazine.

FIG. 2A is a detailed view of the nosepiece assembly 300 from the channel side 412 which mates with the nose end 102 of the magazine 100. A nosepiece insert 410 and the nose end 102 of the magazine 100 can be reversibly fit together by a fastening means. In an embodiment, the magazine screw 337 can be turned to reversibly fit nosepiece insert 410 and the nose end 102 together. In an embodiment, the nail channel 352 can be formed when the nosepiece insert 410 is mated with the nose end 102 of the magazine 100.

FIG. 2A, detail A, illustrates a detail of the nosepiece insert 410 from the channel side 412. As illustrated, the nosepiece insert 410 has a rear mount screw hole 417 for a nail guide insert screw 421. Nosepiece insert 410 can also have a blade guide 415 and nail stop 420. Nosepiece insert 410 can be fit to nosepiece assembly 300. Nosepiece insert 410 can also have a nosepiece insert screw hole 422 within one or more of an interface seat 425 to secure the nosepiece insert into the fixed nosepiece assembly 300. In an embodiment, the nosepiece insert 410 has a nose 400 with an insert tip 355 and is inserted into the fixed nosepiece assembly 300. In an embodiment, the nosepiece insert 410 is configured such that a driver blade 54 overlaps at least a portion of a blade guide 415 which optionally can extend under a nose plate 33 mounted on a forward face of the housing 4.

Figure 2B:
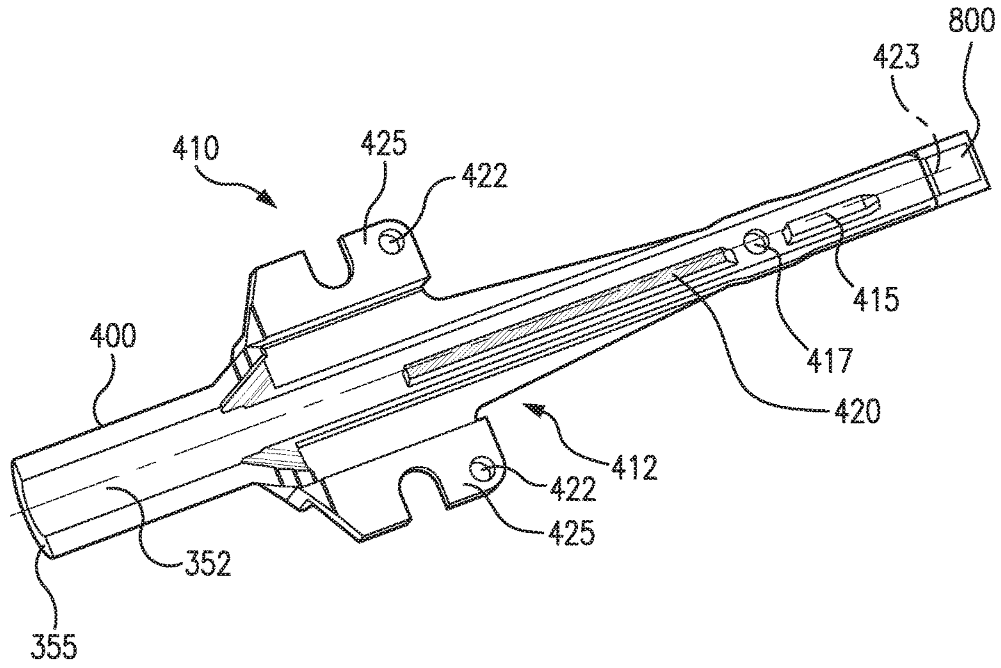
FIG. 2B is a detailed view of a nosepiece insert having a blade stop viewed from the channel side.
Figure 2C:
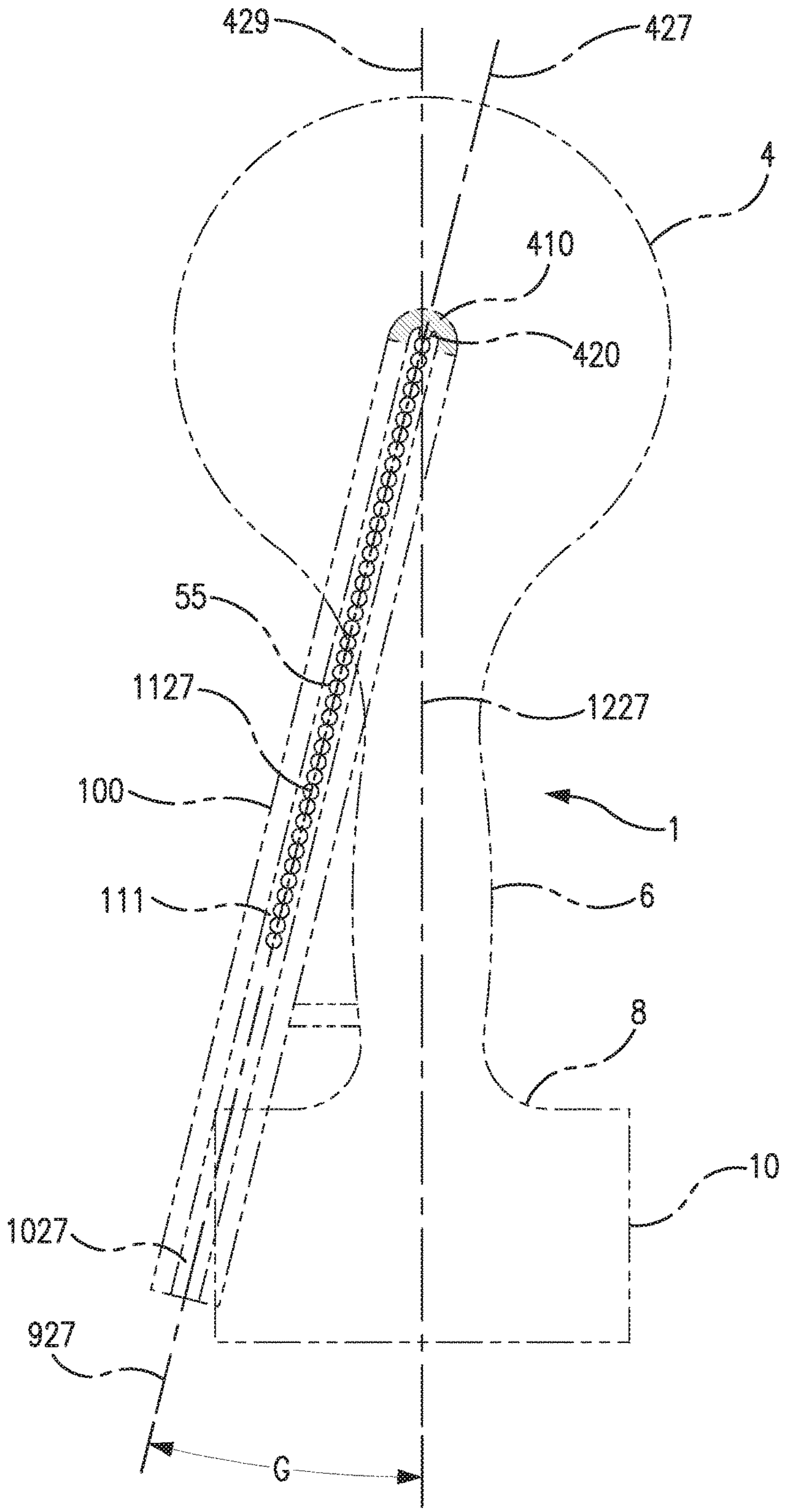
FIG. 2C is a perspective view illustrating the alignment of the nailer, magazine, nails and nail stop.
Figure 2D:
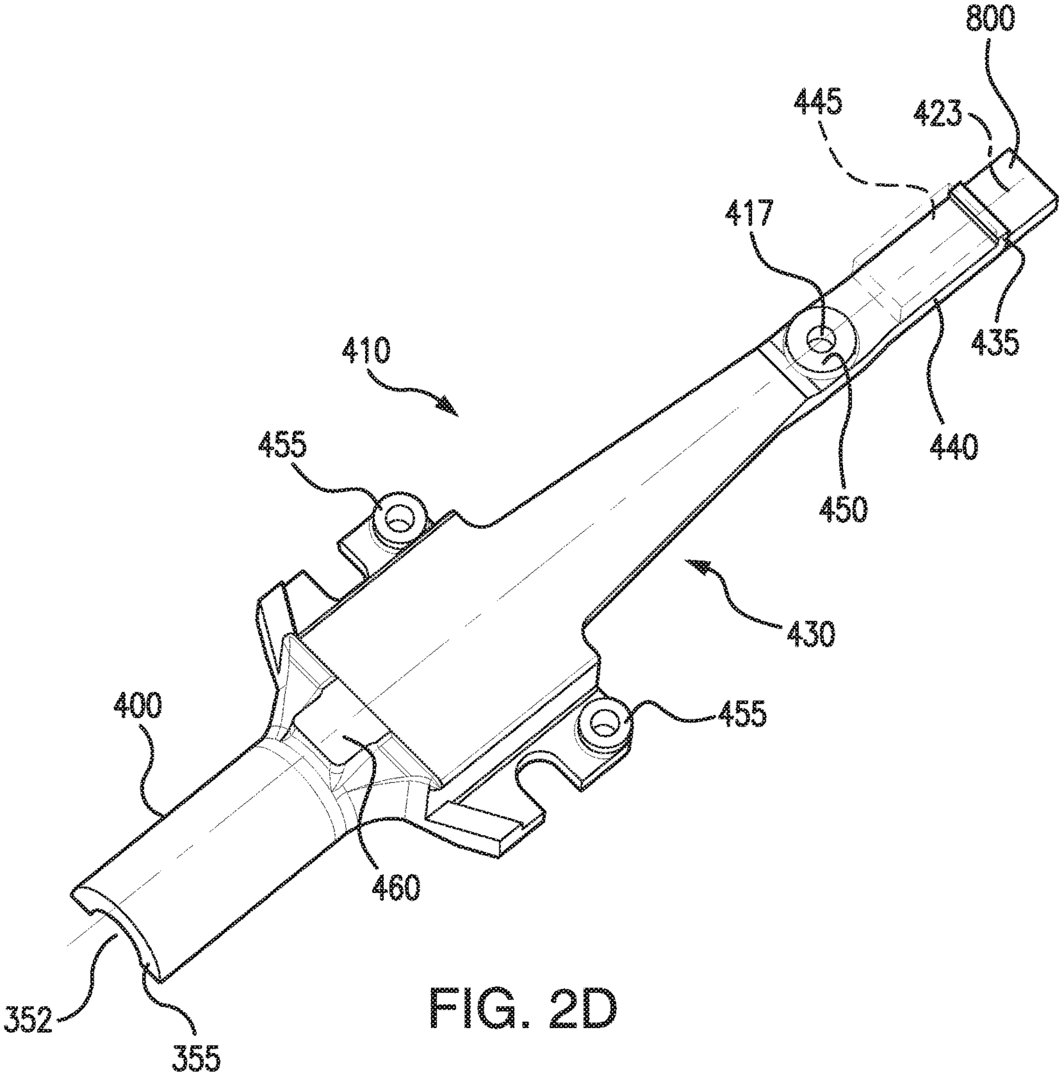
FIG. 2D is a detailed view of a nosepiece insert having a blade stop viewed from the fitting side.

Nosepiece insert 410 can be secured to the fixed nosepiece assembly 300 by one or more of a nosepiece insert screw 401 through a respective insert screw hole 422. In an embodiment, the driver blade stop 800 can be a portion of, or a piece attached to, the nosepiece insert 410 (FIGS. 2B and 2D). In an embodiment, the nosepiece insert 410 can be joined to the fixed nosepiece assembly 300 by a nail guide insert screw 421 through the rear mount screw hole 417, or can be a separate piece attached to the nosepiece insert 410 (FIGS. 2B and 2D). One or more prongs 437 on the fixed nosepiece assembly 300 can respectively have a screw hole 336 for inserting the magazine screw 337.

FIG. 2A detail B is a front detail of the face of the nose end 102 having nose end front side 360. The nose end 102 can have a nose end front face 359 which fits with channel side 412. The nose end 102 can have a nail track exit 353. For example, a loaded nail 53 is illustrated exiting nail track exit 353. A screw hole 357 for magazine screw 337 that secures the nose end 102 to the nosepiece assembly 300 is also shown.

FIG. 2B is a detailed view of a nosepiece insert 410 viewed from the channel side 412. The nosepiece insert 410 has a nose 400, an insert tip 355, and an insert centerline 423. The channel side 412 has a blade guide 415 and a nail stop 420. The nail stop 420 can be in line with said plurality of nails 55 along a nail stop centerline 427 (FIG. 2C). The nail stop centerline 420 can be offset from the insert centerline 423 which achieves the receipt of nails to the nail stop 420 in a configuration in which the longitudinal axis 1127 of the plurality of nails 55 (FIG. 2C) is collinear, or parallel in alignment, with the longitudinal centerline 1027 of the nail track 111.

FIG. 2C is a perspective view illustrating the alignment of an embodiment of the nailer 1, magazine 100, plurality of nails 55 and nail stop 420. FIG. 2C illustrates the nail stop 420, the nail stop centerline 427, a longitudinal centerline 927 of the magazine 100, a longitudinal centerline 1027 of the nail track 111, a longitudinal centerline 1127 of the plurality of nails 55 and a longitudinal centerline 1227 of the nailer 1. Offset angle G can be 14 degrees. In an embodiment, nail stop centerline 427 can be collinear with a longitudinal centerline 927 of the magazine 100, a longitudinal centerline 1027 of the nail track 111 and the longitudinal centerline 1127 of the plurality of nails 55. A wide range of angles and orientations for the nail stop 420 can be used.

FIG. 2D is a detailed view of the nosepiece insert 410 viewed from the fitting side 430. Optionally, the fitting side 430 can have a magnet stop 435 and a magnet seat 440 which are adapted for the mounting of a nosepiece magnet 445. The fitting side 430 can have a rear mount 450, and a mount 455 that receives a screw to secure nosepiece insert 410 to the fixed nosepiece assembly 300. The fitting side 430 can have lower trip seat 460 which fits into a portion of nosepiece assembly 300. In another embodiment, at least a portion of insert 410 can have magnetic properties. A magnetic portion of insert 410 can be used to guide the driver blade 54.

Figure 3:
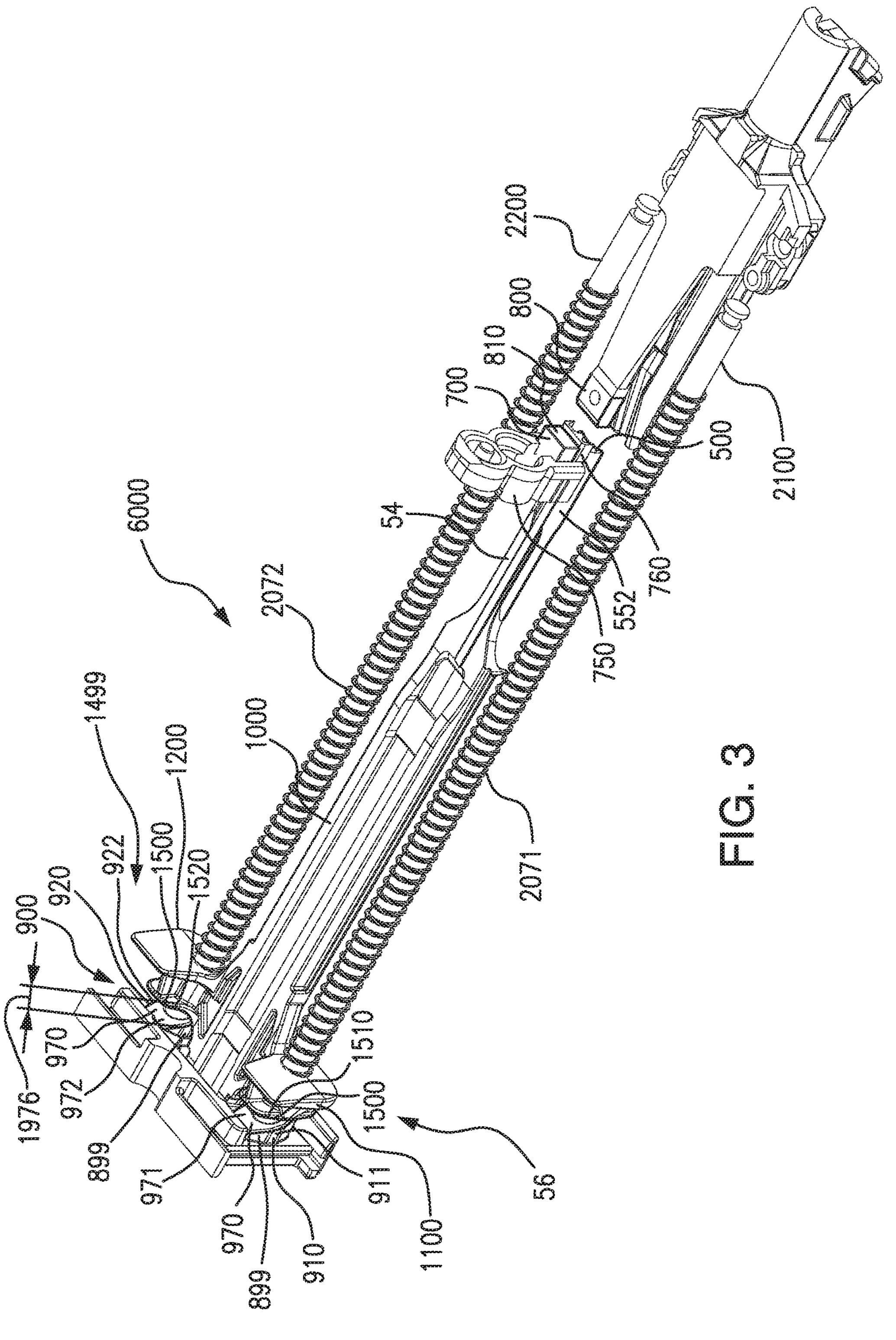
FIG. 3 is a first perspective view of a driver blade in conjunction a return bumper system.

FIG. 3 is a perspective view of a return system 6000 which can have one or more of a return spring. In non-limiting example, FIG. 3 shows first return spring 2071 and second return spring 2072.

FIG. 3 is a perspective view of the driver blade 54 in conjunction with a return bumper system 900. In an embodiment, the return bumper system 900 can control the movement of the driver blade 54 during a return phase after driving the loaded nail 53. The return bumper system 900 can have a bumper 899 having a bump surface 970 against which a pivot portion 1499 having a pivot surface 1500 of the tail portion 56 of the driver blade 54, can impact during the return phase. As shown in FIG. 3 a single of the bumper 899 having a single of the bump surface 970 can be used.

Herein, the "bumper 899" is a reference to one or more bumpers used to form the return bumper system 900. Herein, the "pivot portion 1499" is a reference to one or more portions of driver blade 54 that impact the return bumper system 900 and that are used to contribute to the pivoting of the driver blade 54 upon impact with one or more of the bumper 899. Herein, the "pivot surface 1500" is a reference to one or more pivot surfaces of the return bumper system 900.

FIG. 3 shows an example embodiment of the driver blade 54, the blade stop 800, the return bumper system 900 and a home magnet 700. The driver blade 54 has two projections, herein referred to as driver blade ears, and respectively referred to as a first driver blade ear 1100 and second driver blade ear 1200. In this example, the total surface area which constitutes the pivot surface 1500 is separated into two portions with one portion on each ear. Specifically, the first driver blade ear 1100 can have a first pivot surface 1510 and the second driver blade ear 1200 can have a second pivot surface 1520. Because the example embodiment of FIG. 3 has a first driver blade ear 1100 and second driver blade ear 1200, the return bumper system 900 has two of the bumper 899. A first bumper 910 having a first bump surface 971 is configured to receive an impact from the first driver blade ear 1100. A second bumper 920 having a second bump surface 972 is configured to receive an impact from the second driver blade ear 1200.

At the moment of impact by the driver blade 54 upon the return bumper system 900, FIG. 3 shows the first pivot surface 1510 in tangential contact with the first bumper 910, as well as the second pivot surface 1520 in tangential contact with a second bumper 920. The simultaneous interactions of the first pivot surface 1510 against the first bump surface 971 and the second pivot surface 1520 against the second bump surface 972 will cause the driver blade axis 549 to articulate away from the nail driving axis 599, such as is shown in FIG. 3I. In the example of FIG. 3, the return bumper system 900 is located distally from the nail stop 800, and is referred to as an upper bumper system having a first upper bumper 911 a second upper bumper 922. As shown in FIG. 3, the first driver blade ear 1100 can be guided by a first driver blade guide 2100 and the second driver blade ear 1200 can be guided by a second driver blade guide 2200.

FIGS. 3A-J illustrate an example of a nail driving and return cycle for an embodiment of a fastening tool having the driver blade 54 and using the driver blade stop 800. FIGS. 3A-J, specifically show an example of the movements of the driver blade 54, beginning with the driver at the home position (FIG. 3A), through driving a nail (FIGS. 3B, C and D), through the nail blade return phase (FIGS. E, F, G, H and I), and to the return of the driver blade 54 once again to its home position (FIG. J, and also FIG. A).

Figure 3A:
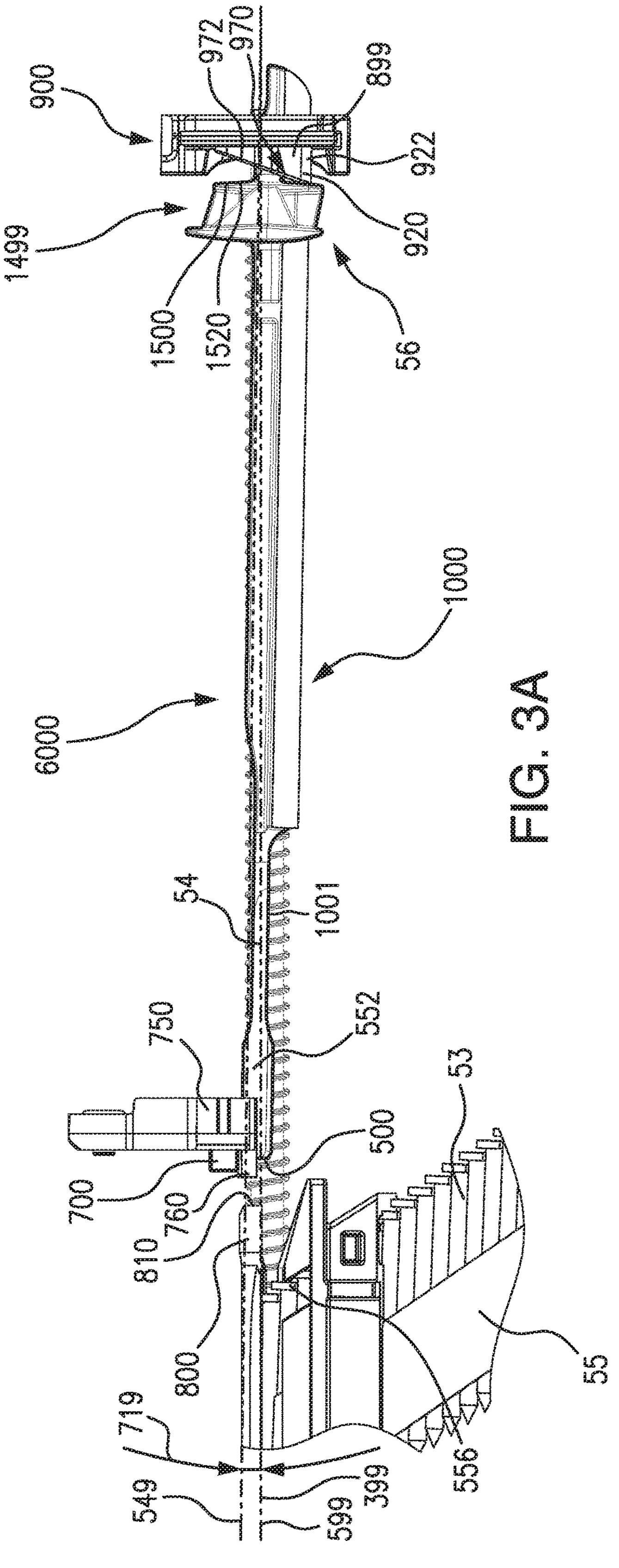
FIG. 3A shows a driver blade at a home position.

FIG. 3A illustrates a section showing the driver blade 54 at a rest position and/or home position. Herein, the terms "driver blade" and "driver profile" are used synonymously to encompass a nail driving member of the fastening tool. The terms "driver profile" and "driver blade" are used synonymously whether the driving member is made of one piece or multiple pieces. Multiple pieces of a "driver profile" and "driver blade" can be separate, integrated, move together or move separately. The driver blade 54 can be a single part made from a single material, such as a single investment cast steel part, or can be made of multiple parts and/or multiple materials.

In an embodiment, the flywheel 665 (FIG. 3C) can be a high inertia flywheel 2665 (FIGS. 15-20). Herein, disclosure regarding the use of flywheel 665 also applies to use of the high inertia flywheel 2665. As shown, the driver blade 54 can have a long slender nail contacting element 1001 integral with and/or attached to the driver blade, a driver blade tip portion 552, a driver blade tip 500, a driver blade tail portion 56 and a driver blade body 1000. Herein, references to the driver blade 54 also are intended to encompass its portions and parts, such as the driver blade 54, the tip portion 552, or the driver blade tip 500.

One or more magnets, or mechanical catch systems, can be used to limit the rebound of the driver blade 54 during its return phase which occurs after driving a fastener into a workpiece. FIG. 3A shows the driver blade 54 at a home position having the driver blade tip portion 552 arranged in contact with a home seat 760 of the home magnet holder 750. In an embodiment, the home seat 760 can reversibly hold the driver blade in the home position. In an embodiment, the driver blade stop 800 can stop the driver blade 54 without causing a concentration of wear and/or high stress on a portion of the driver blade body 1000, such as a tip portion 552, or the driver blade tip 500. In an embodiment, the driver blade tip 500 can have a 2 mm or greater overlap with a strike surface 810 of the driver blade stop 800. Mechanical elements can also be used to align the driver blade 54 to strike the driver blade stop 800. In a non-limiting example, a hinged or spring loaded member can be used with, or instead of, a magnet to reversibly position the driver blade tip and/or the driver blade tip 500 in its home position. In another embodiment, a lifter spring can be used with, or without, a magnet.

FIG. 3A shows the driver blade 54 at a home position in which it is resting between driving cycles and/or awaiting being triggered to drive a nail. The driver blade body 1000 is shown in a resting state and not moving. Herein, the term "home position" means the configuration in which the position of the driver blade is such that it is available to begin a fastener driving cycle. For example, as shown in FIG. 3A, the tip portion 552 of the driver blade 54 is proximate to the home magnet 700. In a "home position", the tip portion 552 and/or a portion of driver blade 54 is reversibly magnetically held by the home magnet 700. The home magnet 700 can magnetically attract the tip portion 552 toward a home seat 760 against which the tip portion 552 can rest. The home position can be configured such that the driver blade is affected by the magnetic force of the home magnet 700, but not held or in direct physical contact with the home magnet 700 itself, or the home magnet holder 750 home. The driver blade 54 can have a rest position which is the same position as the home position. Optionally, a portion of driver blade 54 can have contact with one or more of a bumper 899 when in the home state.

Herein, an articulation angle 719 (FIG. 3A) is the angle formed between a driver blade axis 549 and a drive path 399 and/or a nail driving axis 599 and/or the nail channel 352. The articulation angle 719 can be the angle at which the driver blade 54 and/or the driver blade axis 549 and/or the driver blade's longitudinal centerline and/or a driver blade's body articulates away from the nail driving axis 599. In an embodiment, in the home position, the driver blade 54 can strike the driver blade stop 800 at a first value of an articulation angle 719, as well as have a home position and/or rest at a different value of the articulation angle 719.

Numeric values and ranges herein, unless otherwise stated, are intended to have associated with them a tolerance and to account for variances of design and manufacturing. Thus, a number is intended to include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). Likewise, the claims are to be broadly construed in their recitations of numbers and ranges.

As shown in FIG. 3A, the driver blade can have a home position at an articulation angle 719 from the drive path 399 and/or nail driving axis 599 and/or nail channel 352. The articulation angle 719 can have a value sufficient to configure the tip portion 552 such that it is not aligned to strike any portion of the loaded nail 53. In an embodiment, the articulation angle 719 can be greater than 0.2° as measured from the driver blade axis 549 to nail driving axis 599. For example, the articulation angle 719 can be in a range of from 0.2° to 15°, or greater. In an embodiment, the driver blade axis 549 can have an articulation angle 719 of 0.80° from the nail driving axis 599 when the driver blade 54 is in an at rest position. In an embodiment, a dampening of the mechanical movement of the driver blade 54 can be achieved at least in part by articulating the driver blade out of the driving path during its return phase by impacting with an angled surface on the bumper 899. In an embodiment, the tip portion 552 can also be moved to a position out of the driving path by the home magnet 700, which magnetically attracts the driver blade 54. During the return phase, as the driver blade rebounds off the bumpers 899 and toward the next nail to be fired, the driver blade stop 800 can be used to limit the advance of the driver blade toward the nosepiece assembly 12 and/or the loaded nail 53. This can prevent the driver blade 54 from rebounding into the driving path to hit and potentially drive and/or dislodge a next nail. When the driver blade 54 for a nailer is displaced from the drive path, unintended contact and/or the duration of contact with the flywheel 665, and driving mechanism is reduced resulting in a quiet flywheel-based tool.

As shown in FIG. 3A, the tip portion 552 can rest at a distance of a blade stop gap 803 (FIG. 10) from the driver blade stop 800 and the driver blade tip 500. In an embodiment, when in the home position, a blade stop gap 803 (FIG. 10) can be present between the driver blade stop 800 and the strike surface 810 of tip portion 552. In an embodiment, the driver blade stop 800 can be in a range of from 1 mm to 25 mm, or greater. In an embodiment, a blade stop gap 803 distance of 8 mm or greater can be used and can prevent the driver blade tip 500 from wearing off, become misshaped, damaged or rounded. FIG. 3A also shows the tail portion 56 of driver blade 54. In an embodiment, the tail portion 56 can be a portion of the driver blade body 1000. The driver blade body 1000 can have portions that are used to guide and/or control the movement of the driver blade 54 while being driven, as well as portions that can be used to control the driver blade 54 during its return phase. A contact of a portion of the driver blade 54, such as the tail portion 56 with the bumper 899, such as a first bumper 910 and/or a second bumper 920, when the driver blade 54 is in a home position is optional.

FIG. 3A shows the return system 6000 having a return bumper system 900 which can have one or more of the bumper 899. The second bumper 920 is shown which is configured to be the second upper bumper 922 having the second bump surface 972. The bumper 899 can have a bumper height 1979 (FIG. 11) in a range of greater than 2 mm, such as in a range of from 2 to 25 mm. The bumper 899 can have a bumper width 1978 (FIG. 11) in a range of from 5 to 30 mm. The bumper 899 can have a bumper depth 1976 (FIG. 3) in a range of from 2 to 25 mm. The bumper can have a bumper density in a range of from 0.50 g/cm^3 to 10.0 g/cm^3.

Figure 3B:
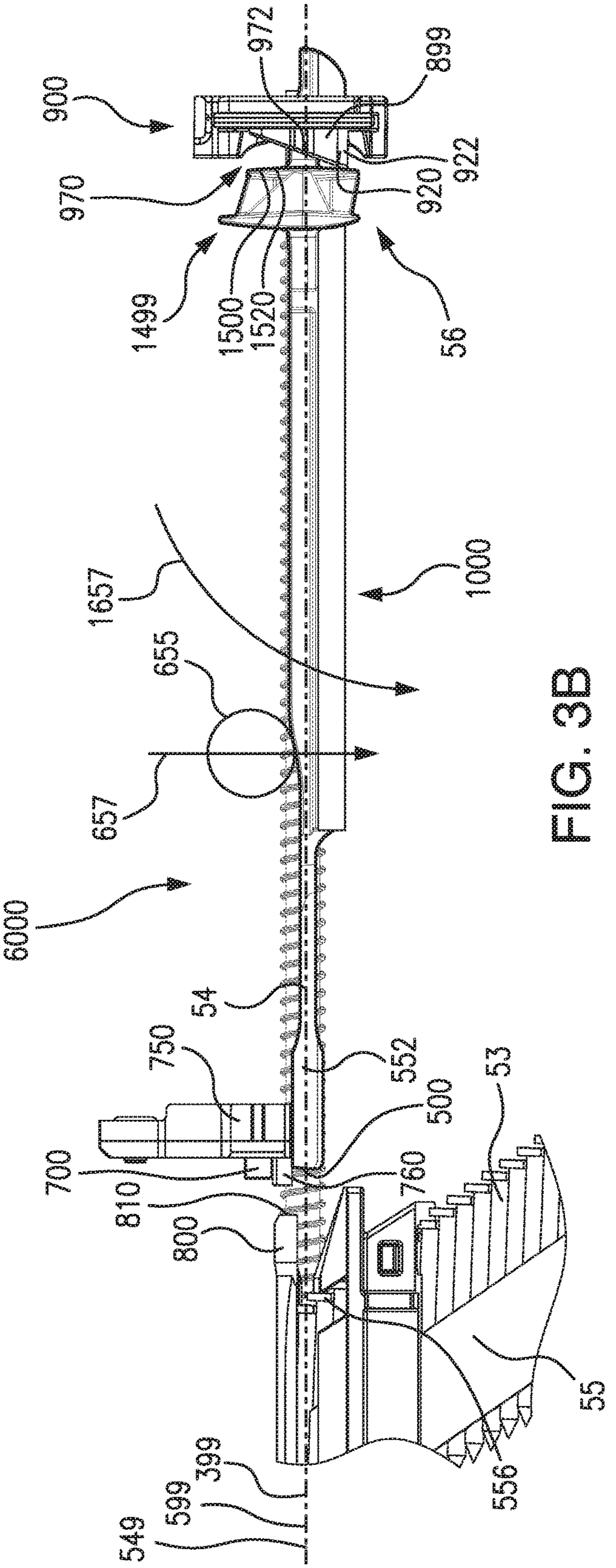
FIG. 3B shows a driver blade aligned to be driven to drive a nail.

FIG. 3B shows the driver blade 54 aligned to drive a nail. As shown in FIG. 3B, a movable member, such as a pinch roller 655, exerts a force upon at least a portion of the driver blade 54 moving the driver blade axis 549 into alignment to position driver blade 54 to drive a nail into a workpiece. The pinch roller 655 can exert an alignment force 657 against a portion of the driver blade body 1000. The alignment force 657 can overcome the attractive force of the home magnet 700 and pivot the driver blade axis 549 to align and/or be configured collinearly with the nail driving axis 599 and with the drive path 399. The example of FIG. 3B shows, by alignment arrow 1657, the pivoting of the driver blade axis 549 to be aligned and/or be configured collinearly with the nail driving axis 599.

Figure 3C:
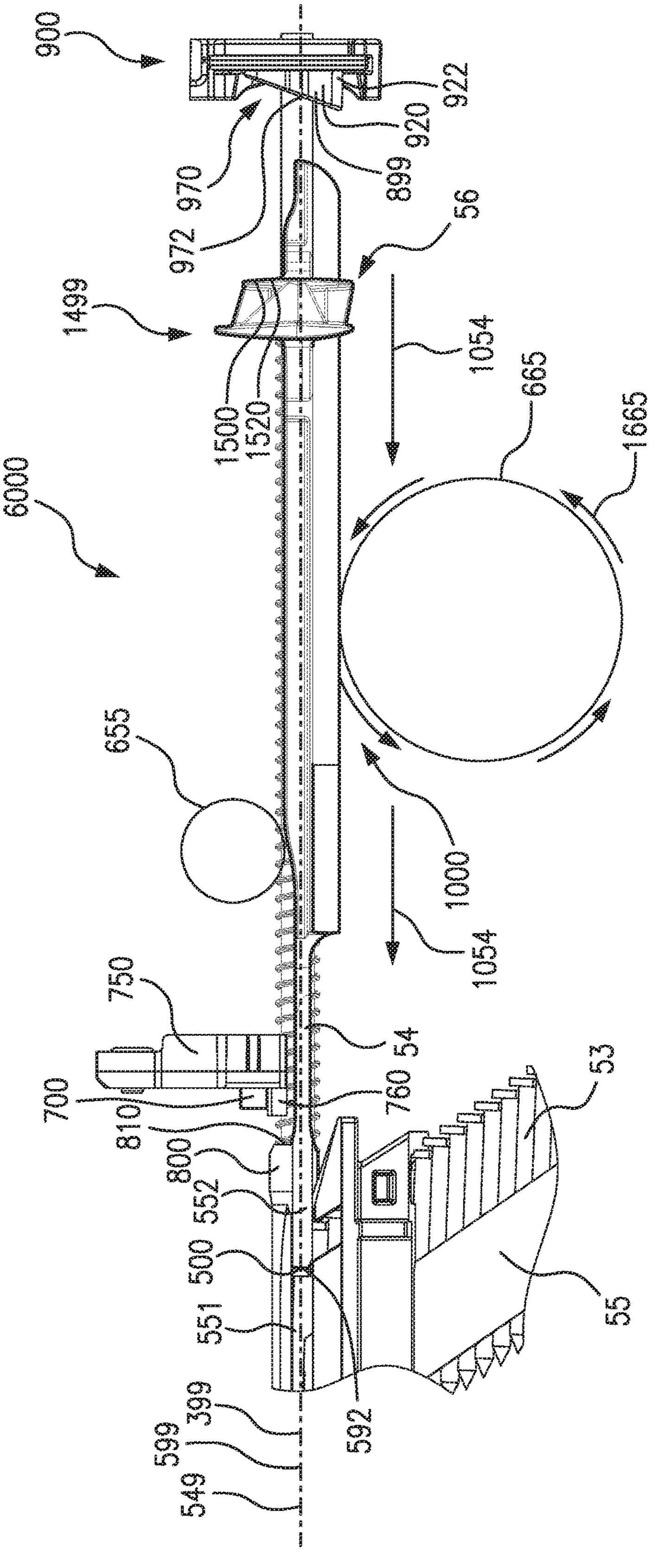
FIG. 3C shows a driver blade being driven and contacting the head of a nail.

FIG. 3C shows the driver blade 54 being driven and in contact with the head of a nail 53. In FIG. 3C, the flywheel 665, which rotates as shown by the directional arrow 1665, is shown in reversible and temporary frictional contact with and driving the driver blade 54. The temporary contact by flywheel 665, to the driver blade 54, imparts energy to the driver blade 54 to move in the direction of driving arrow 1054 and to drive a nail 53. FIG. 3C shows the driver blade tip 500 in contact with a nail head 592 of the loaded nail 53.

In an embodiment, the flywheel can be a "high mass flywheel" that can have a significant mass, such as 75 grams or greater, such as 90 grams and can have significant momentum when rotating. The momentum and/or kinetic energy present in the driver blade 54 can be significant, such as 35 Joules or greater, such as 40 Joules even after a driving of a nail has occurred. For example, residual kinetic energy present in the driver blade 54 can be high after the driving of a nail into a soft material, and/or after driving a short nail. Because the soft material does not absorb as much energy as a harder material, this can result in the driver blade 54 having a high momentum at the end of the return stroke when it can impact the bumper 899.

In an embodiment, the flywheel for a nailer 1, such as a framing nailer, when used for driving fasteners into wood can rotate at a high power, such as a value of from 10000 rpm to 15000 rpm, or 12000 rpm to 15000 rpm, or about 13000 rpm and can have an inertia in a range of from 0.000010 kg to m/s^2 to 0.000030 kg-m/s^2, such as or 0.000015 kg-m/s^2, or 0.000022 kg-m/s^2. In an embodiment, the driver blade 54 speed for a nailer for wood can be 12 m/s to 30 m/s. In an embodiment, the nailer 1 can have the depth adjustment wheel 340 set the depth adjust set for a depth for nailing of 2 inch smooth shank nails into soft wood, such as spruce, pine, and fur lumber, or plywood sheathing and/or plywood sheeting.

In another embodiment, the flywheel for the nailer when used for driving fasteners into hard and dense materials, such as concrete, steel or metal. The flywheel can rotate at a value of from 12000 rpm to 20000 rpm, or 13000 rpm to 16000 rpm. In such applications, the flywheel can have an inertia in a range 0.000020 kg-m/s^2 to 0.000040 kg-m/s^2. The driver blade 54 can have a driving speed from 21 m/s to 41 m/s for driving ½" nails into wood, into structural steel and/or concrete. In an embodiment, the driver blade 54 can have a driver speed of about 37 m/s and store 75-110 J in the driver blade 54 and/or driver assembly.

Figure 3D:
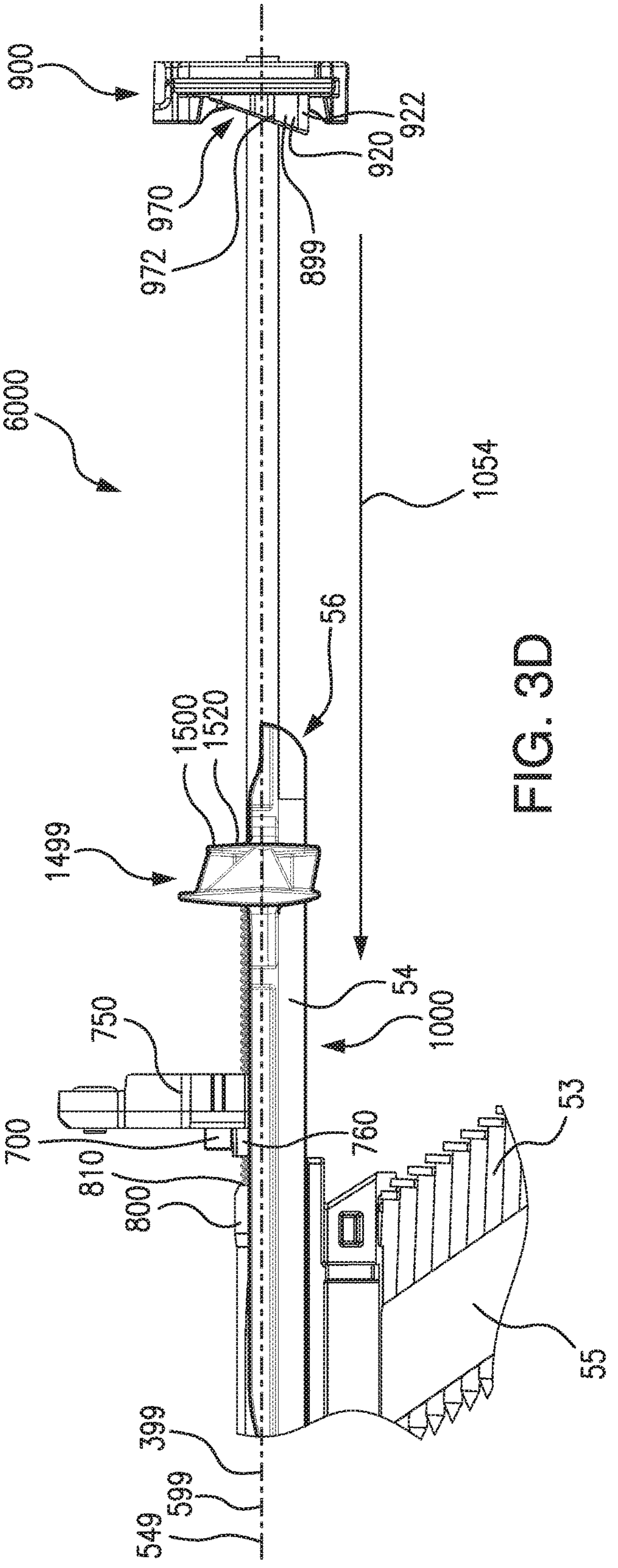
FIG. 3D shows a driver blade positioned for driving a nail into a workpiece.

FIG. 3D shows the driver blade 54 in the process of driving the loaded nail 53 into a workpiece. The driver blade 54 and the tip portion 552 (FIGS. 3F-3J) have advanced along the nail driving axis 599 and along the drive path 399 such that the tip portion 552 has passed into the nail channel 352 to drive the loaded nail 53. The direction of movement of the driver blade 54 is shown by driving arrow 1054.

Figure 3E:
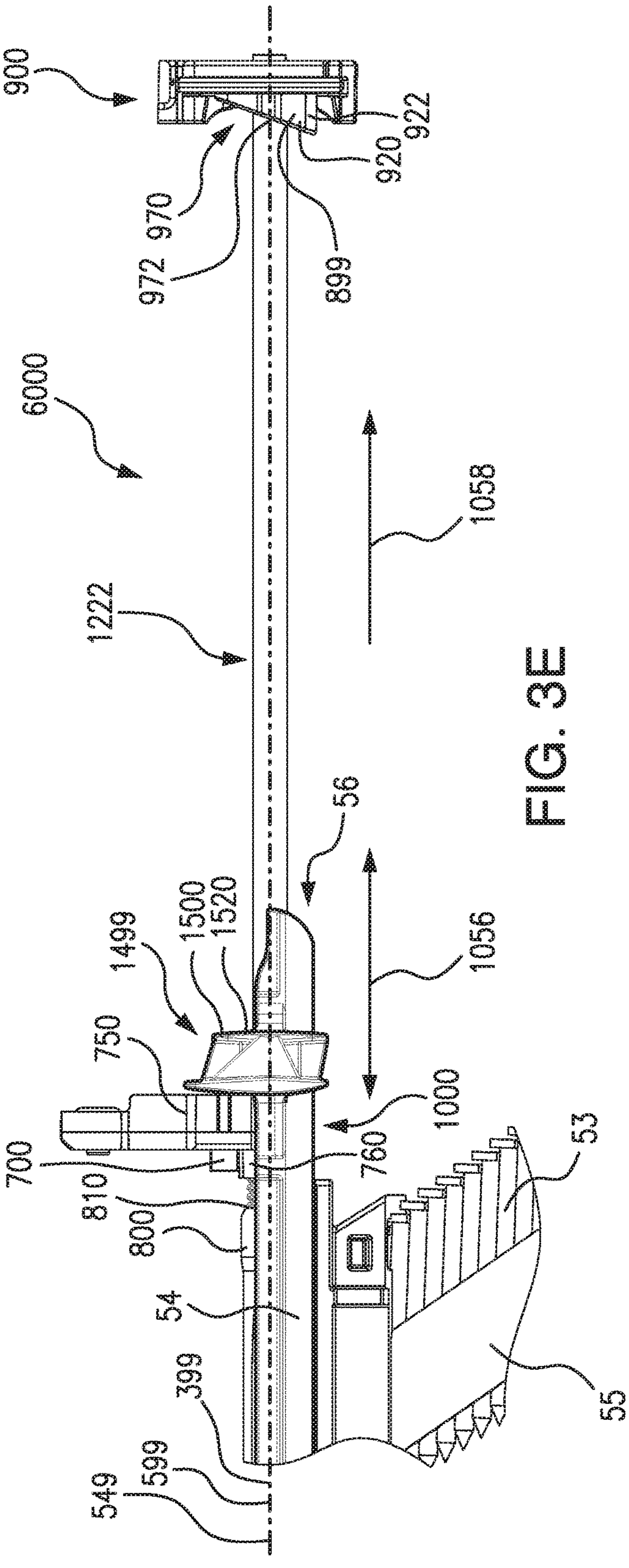
FIG. 3E shows a driver blade beginning a return phase.

FIG. 3E shows the driver blade 54 beginning the return phase, which can begin the moment a fastener has been driven. FIG. 3E depicts a moment at which, the loaded nail 53 has been driven into the workpiece, the high inertia flywheel 2665 (FIGS. 15-19), has been retracted and the return path 1222 is free of obstacles along its length to allow the return of the driver blade 54. In an embodiment, the return path 1222 can be route taken by the tail portion 56 of the driver blade 54 from the moment a drive is complete until the tail portion 56 impacts the bumper 899 and/or another return stop member. Recoil arrow 1056 shows the change in direction from when the driver blade 54 transitions from the direction indicated by driving arrow 1054 to the direction indicated by a return arrow 1058.

The driver blade stop 800 disclosed herein allows for operation of a power tool, such as the nailer 1, using higher driver speeds. The driver blade stop 800 can also be used at high return speeds of the driver blade 54, for example up to 61 m/s, while reducing or preventing bounceback. Reducing or preventing bounceback eliminates misfire or the breaking of the collation of a nail from other collated nails when no driving event is yet intended for such collated fastener. In an embodiment, driver blade speeds during a driving action can be in a range of from 7.6 m/s to 61 m/s. The driver blade stop 800 can be used in high energy fastening tools that have an elastic-type return system, such as in a concrete nailer. Additionally, the driver blade stop 800 can be used in a nailer that generates a driving pressure from 517 KPa to at least 103 MPa.

In embodiments, misfires can occur when the residual momentum or energy causes the driver blade to impact a bumper or driver blade stop 800 after driving the loaded nail 53. The residual momentum of the driver blade 54 after striking the bumper or driver blade stop 800 can cause the driver blade 54 to continue back down the nail channel 352 toward a next nail. A misfire or improper driving of the driver blade 54, can lead to jams, bent nails and damage to the fastening tool. An uncontrolled return of the driver blade 54 can cause a misalignment of nails, or a partial broken collation, or a broken collation which leave an improperly aligned nail in the nail channel 352. To reduce or prevent misfire, the driver blade 54 recoil movements can be dampened and/or controlled by using a magnetic catch, a bumper, an isolator and/or a dampener material to dissipate momentum. In an embodiment, a mechanical stop can be used to receive a driver blade impact after it returns and bounces off one or more bumpers, or other object. The driver blade stop can act as a mechanical beat piece and/or piece to receive impacts from the driver blade 54. The driver blade stop 800 can be hardened investment cast steel. In an embodiment, the home magnet 700 having an attractive force upon the driver blade 54 can be used alone, or in combination with an angled upper bumper to attract the driver blade tip 500 into the driver blade stop area and force it to impact in the driver blade stop which limits bounce-back, movement into the drive path to hit another nail and the recoil of the driver blade 54. In an embodiment, the home magnet 700 holder can limit the vertical displacement and the area of the driver blade tip 500 which impacts the mechanical stop.

The speed of the driver blade during its return to the home position is referred to herein as a return speed. The return speed can vary depending upon the driver blade 54, as well as the workpiece into which the fastener is driven. When a fastener is driven without misfire, the return speed can be in a range of 3.0 m/s to 46 m/s, such as 27 m/s. Misfire conditions can result in a return speed in a range of from 15 m/s to 61 m/s, such as 38 m/s.

Figure 3F:
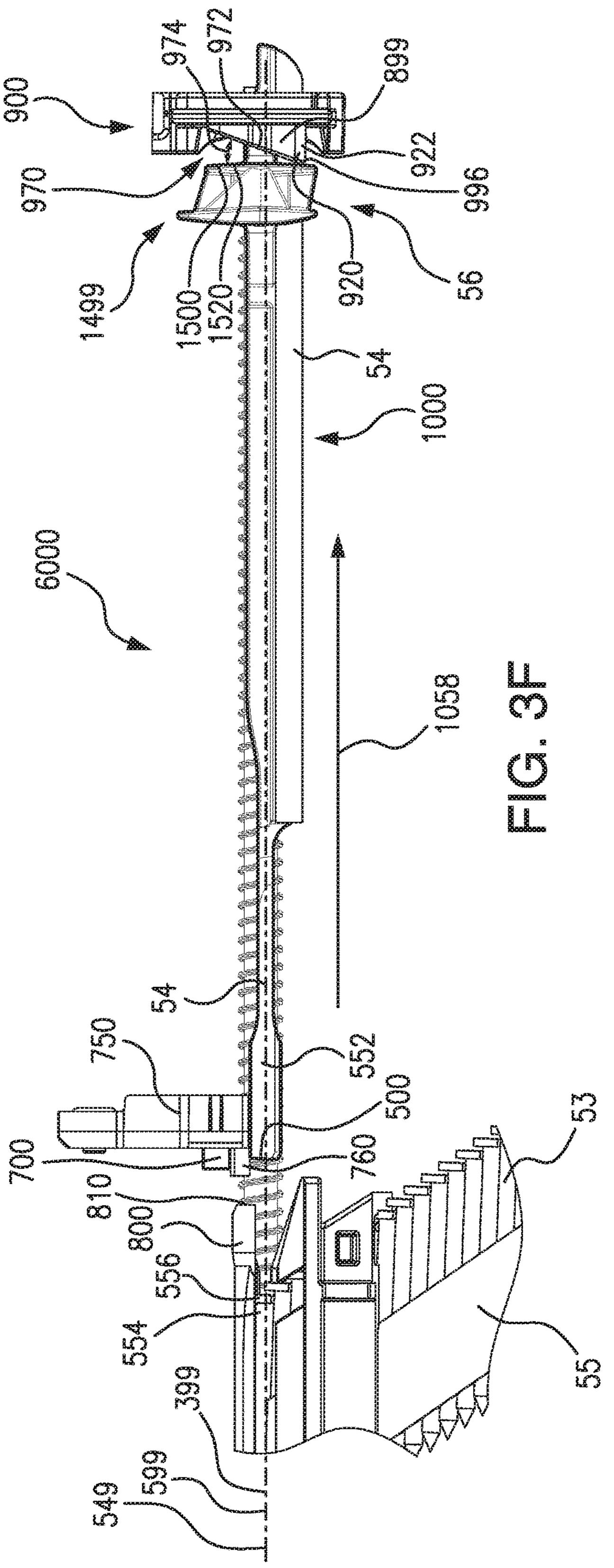
FIG. 3F shows a driver blade making contact with a bumper.

FIG. 3F shows the driver blade 54 making contact with the bumper 899. FIG. 3F shows the return of the driver blade 54 in the direction of the return arrow 1058. FIG. 3F shows the driver blade 54 return motion at the moment where the second pivot surface 1520 of pivot portion 1499 has just made a contact with a portion of the bumper 899, such as the second upper bumper 922. The second upper bumper 922 can have a second pivot point 996 (see also FIG. 11), which in the example of FIG. 3F, is the first portion of the second upper bumper 922 to be contacted by the second pivot surface 1520 of pivot portion 1499. FIG. 3F shows the driver blade axis 549 still aligned and/or still configured collinearly with the nail driving axis 599 and in alignment with the drive path 399. At this point in the return phase, after the loaded nail 53 has been driven and the return of the driver blade 54 has cleared the tip portion 552 from the nail channel 352, the next nail 554 is advanced into the nail channel 352 for driving by the driver blade 54.

Figure 3G:
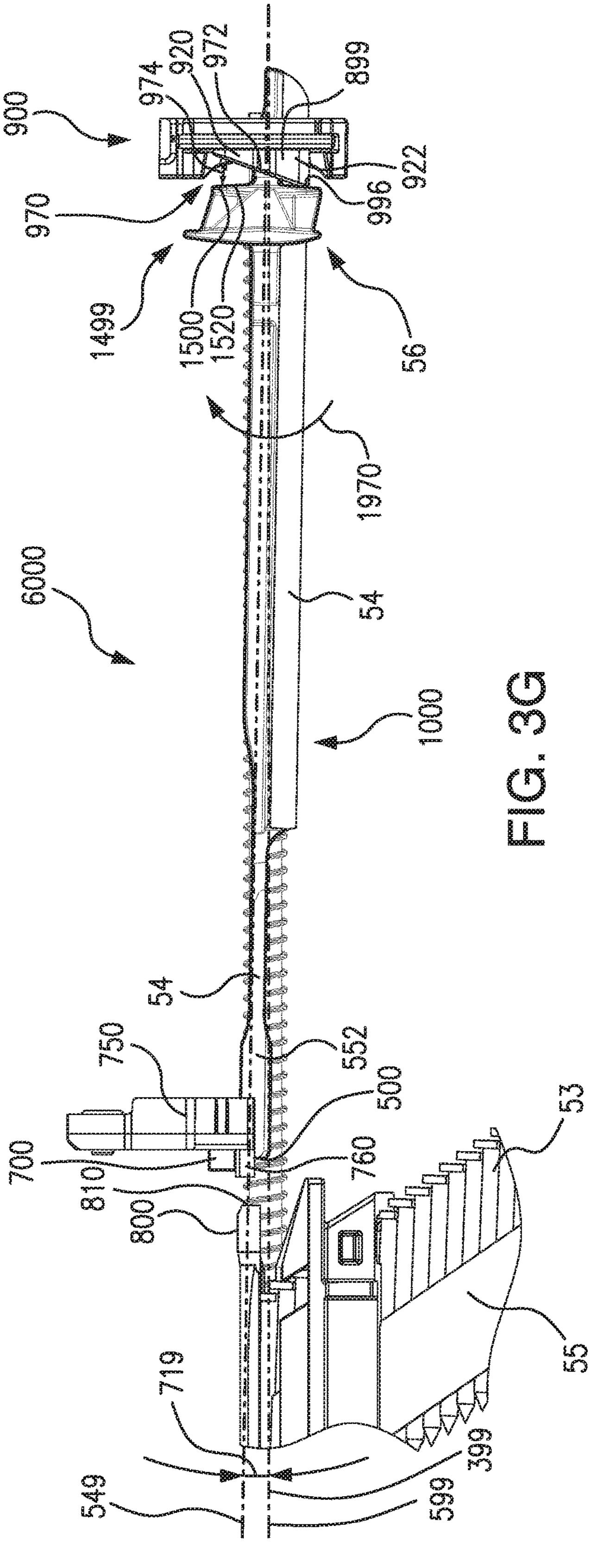
FIG. 3G shows a driver blade pivoting into alignment to strike a blade stop.

FIG. 3G shows the driver blade 54 during the return phase pivoting into alignment to strike the driver blade stop 800. The contact of the tail portion 56 with the bumper can cause a pivoting of the orientation of the driver blade 54 which prevents the driver blade 54 from rebounding to strike the next nail head 556 (FIGS. 3A-3B) and prevents the tool from misfiring. The pivoting motion is shown by pivot arrow 1970. In the example embodiment of FIG. 3G, the second pivot surface 1520 is at an angle to, not parallel to and not coplanar with, the pivot surface 1500, such as the second pivot surface 1520. The second bumper causes the driver blade 54 to pivot away from the nail driving axis 599. The action of the second pivot surface 1520 of pivot portion 1499 against the driver blade 54 moves the driver blade axis 549 out of alignment with the nail driving axis 599 and the drive path 399. The pivoting of the driver blade 54 configures the driver blade axis 549 to have an angle greater than zero (0°) with the nail driving axis 599 and the drive path 399. The pivoting of the driver blade 54 configures the driver blade axis 549 such that the driver blade 54 is not collinear, or coplanar, with the nail driving axis 599 and the drive path 399. FIG. 3G shows the measure of the displacement of the driver blade 54 from the nail driving axis 599 and/or the drive path 399 as an articulation angle 719. In an embodiment, the articulation angle 719 can be in a range of from 1° to 25°. In an embodiment, at least a portion of the driver blade 54 can contact the bumper 899 and/or the blade stop 800 a number of times. Repetitive contact of the driver blade between the bumper 899 and the driver blade stop 800 can prevent misfire under conditions in which the driver blade 54 has a high mechanical energy after a fastener, such as a concrete nail is driven.

In an embodiment, an impact of a portion of a driver blade upon the bumper 899 can cause a deformation of the bumper 899 which can be temporary and/or reversible. In an embodiment, the bumper 899 can be resilient and can maintain its mass after repeated impact of a portion of the driver blade 54. Herein, the term deformation period is the period of time during which a resilient embodiment or memory embodiment of the bumper 899 is deformed prior to return to its shape prior to impact, or approximately to its shape prior to impact, or near to its shape prior to impact. In an embodiment, the bumper 899 can have a deformation time in a range of from 0.5 ms (0.0005 s) to 1000 ms (10 s). In an embodiment, the deformation period can be equal to or near zero (0) seconds and the impact can be elastic or near elastic. In an embodiment, the bumper 899 can have an operating life of 50,000 to 150,000 return phases and/or impacts from the driver blade, such as 50,000 or greater return phases, 65,000 or greater return phases, or 75,000 or greater return phases, or 100,000 or greater return phases.

Figure 3H:
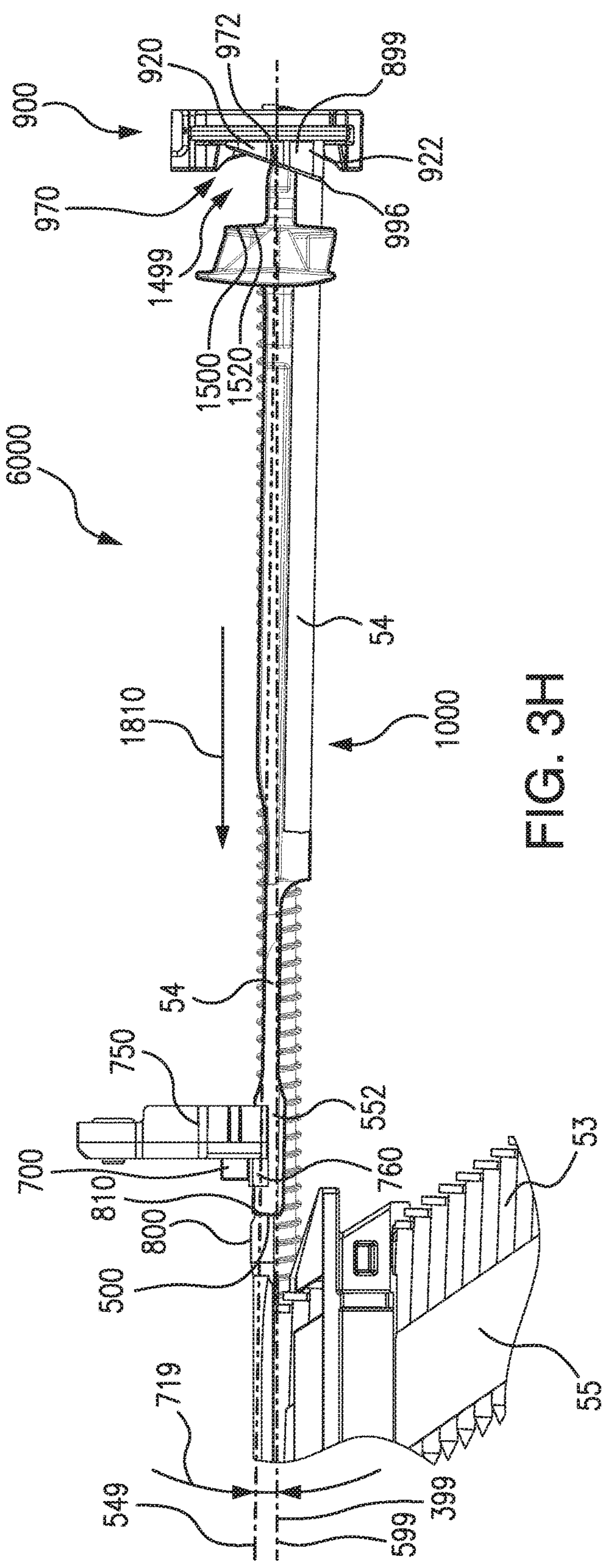
FIG. 3H shows a driver blade tip striking the driver blade stop.
Figure 3I:
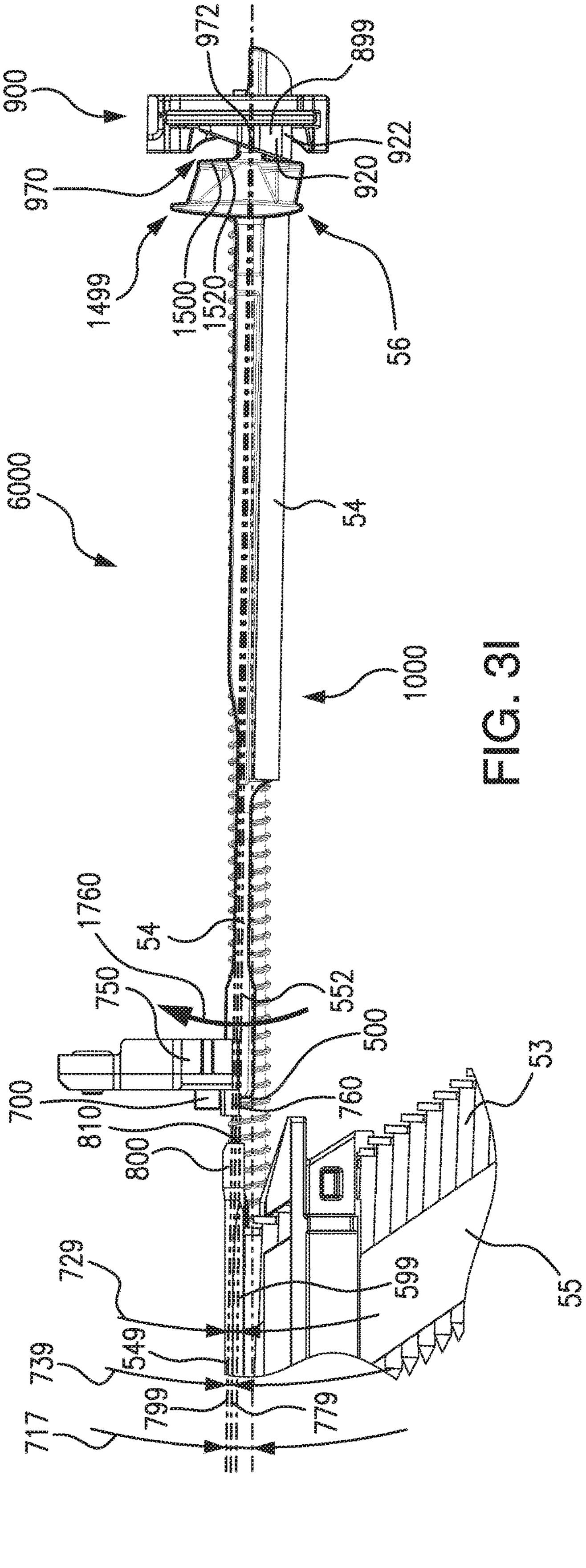
FIG. 3I shows a driver blade being drawn into the home position.

FIG. 3H shows the moment in the return phase when the driver blade tip 500 is striking the driver blade stop 800 and the driver blade tip 500 of the tip portion 552 is striking the strike surface 810 of the driver blade stop 800. FIG. 3H shows the driver blade 54 configured to have the driver blade axis 549 positioned at the articulation angle 719 from the nail driving axis 599 and/or the drive path 399. In FIG. 3H, the articulation angle 719 aligns and/or configures the driver blade axis 549 such that at least a portion of the driver blade 54, such as the tip portion 552, will strike the driver blade stop 800 when moving in a strike direction shown by strike arrow 1810.

FIG. 3I shows the driver blade 54 seated in its home position against the home seat 760 after having struck the strike surface 810 of the driver blade stop 800 and at least a portion of driver blade 54 being magnetically attracted by home magnet 700. In an embodiment, after striking the driver blade tip 500 against the strike surface 810, the driver blade 54 can still have a kinetic energy and have a motion away from the strike surface 810. While the driver blade 54 moves away from the strike surface 810, the magnetic attraction from home magnet 700 of at least a portion of the driver blade 54, can dampen and/or stop further motion of the tip portion 552 away from the strike surface 810. In an embodiment, the magnetic attraction of the tip portion 552 by the home magnet 700 can dampen and overcome the kinetic energy retained by the driver blade 54, can pull the tip portion 552 toward and frictionally against the home seat 760 and can stop further axial movement of the driver blade 54. The magnetic influence pulling the tip portion 552 toward and frictionally against the home seat 760 can dampen and/or stop the movement of the driver blade 54 and bringing the driver blade 54 to a rest state in a home position. As shown in FIG. 3I, the driver blade axis 549 can be displaced by the articulation angle 719 by a pivot resulting from a portion of the driver blade 54 with the bumper 899.

The articulation angle 719 can cause the driver blade axis 549 to be oriented such that the tip portion 522 can strike the driver blade stop 800. After the driver blade 54 strikes the driver blade stop 800, the driver blade axis 549 can remain oriented along the displacement axis 779, or can vary from being collinear with that axis. FIG. 3I also shows the direction of movement of the driver blade axis 549 from the displacement axis 779 toward the home axis 799 by home arrow 1760. The home magnet 700 can have a strong enough attraction to pull the tip portion 552 into a home position under a broad variety of operation conditions. In the embodiment of FIG. 3I, a home angle 717 is shown as an instance of the articulation angle 719 when the driver blade 54 is at a home position. In this example, the home angle 717 can result from a first articulation of the driver blade 54 which aligns the driver blade axis 549 to strike the driver blade stop 800 and forms a strike angle 729, and a second articulation happens after the driver blade tip 500 strikes the driver blade stop 800. The second articulation is the articulation which aligns the driver blade axis 549 in a home position forming a dampening angle 739. In the example of FIG. 31, home angle 717 results from the sum of the strike angle 729 and the dampening angle 739.

Figure 3J:
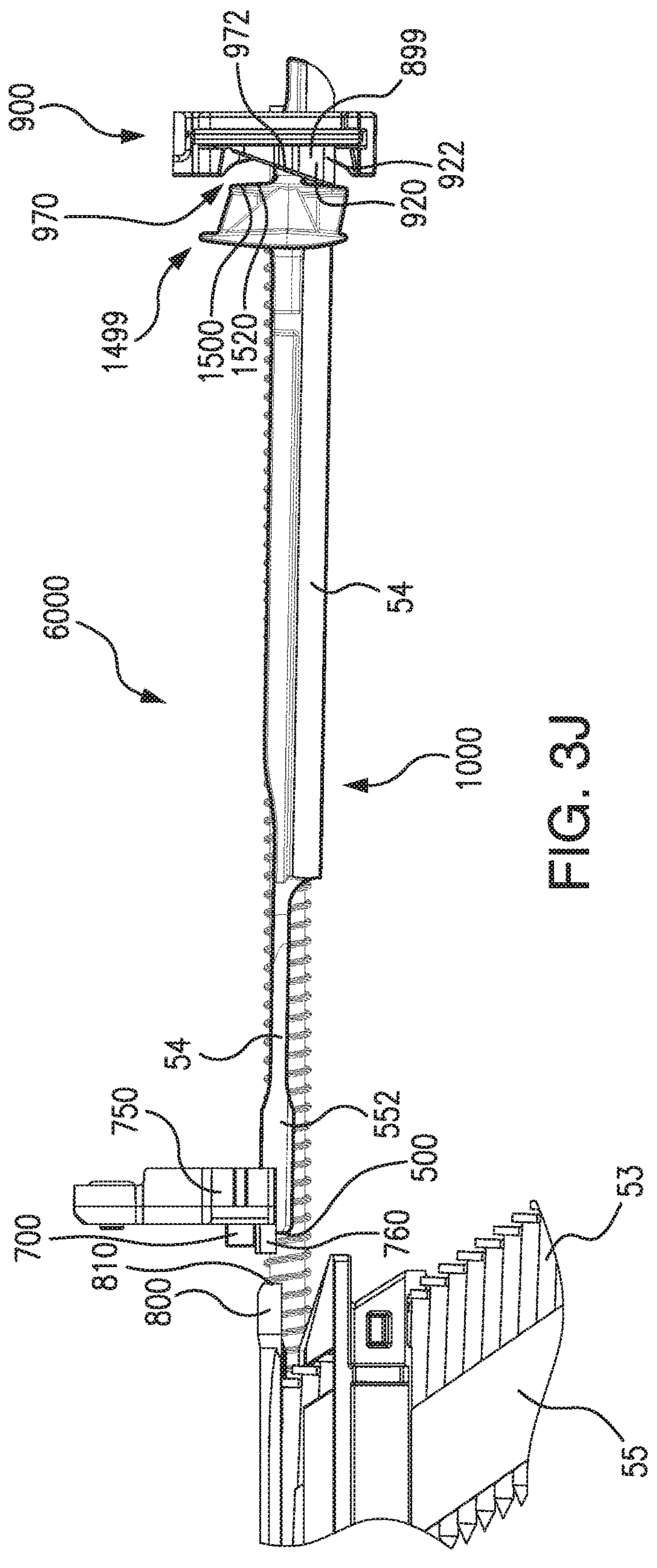
FIG. 3J shows a driver blade at rest in its home position.

As depicted in FIG. 3A, FIG. 3J shows the driver blade 54 at rest in its home position waiting for the triggering of another nail driving cycle.

Figure 4:
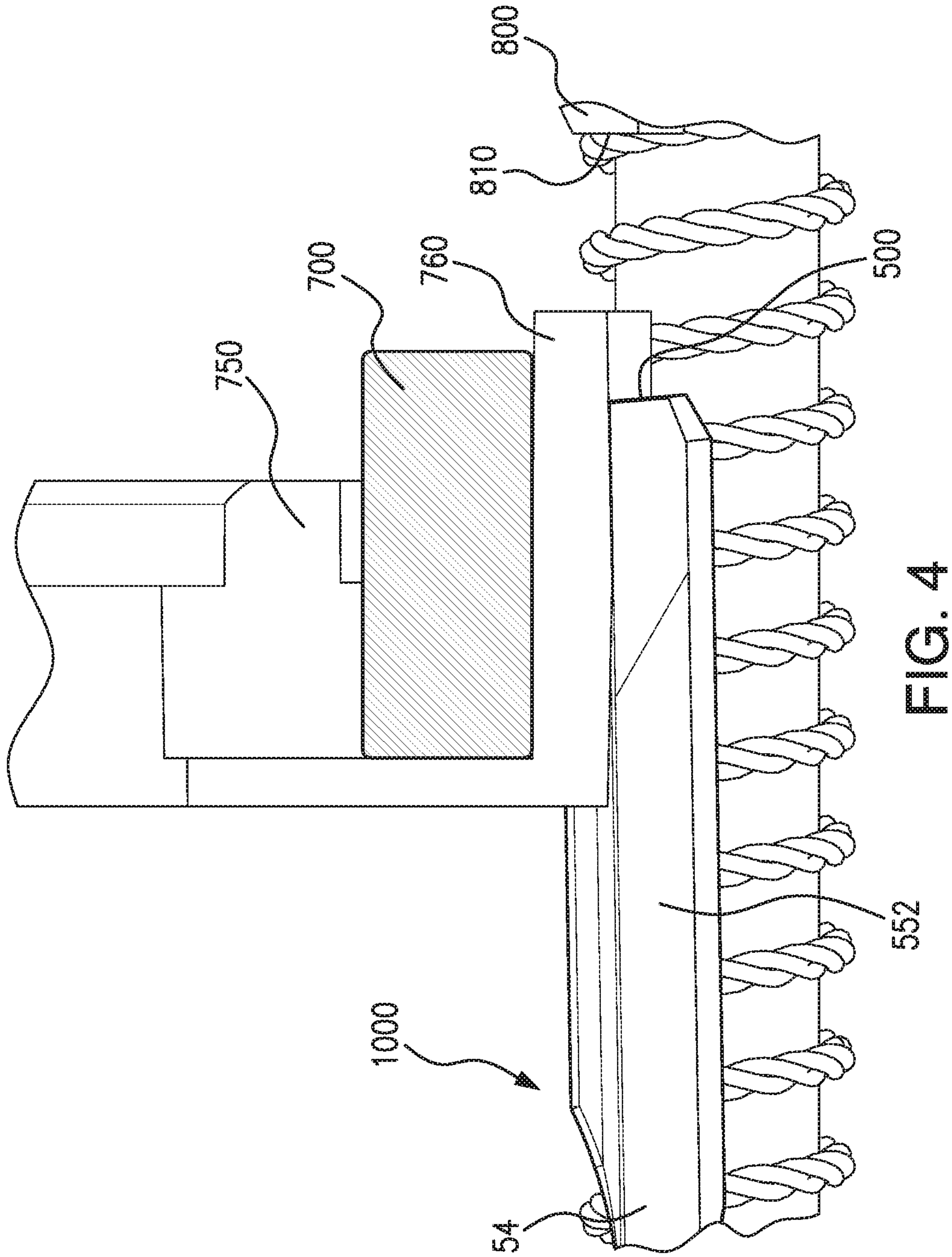
FIG. 4 is a cross-sectional view of a rebound control mechanism.

FIG. 4 is a cross-sectional view of a rebound control mechanism. FIG. 4 shows a close up view of the driver blade tip 500 contacting the strike surface 810. Overlap of the driver strike surface 810 by a portion of the driver blade tip 500 is illustrated. In the embodiment of FIG. 4, the home magnet holder 750 can be used to separate the home magnet 700 from the driver blade tip 500.

Figure 5:
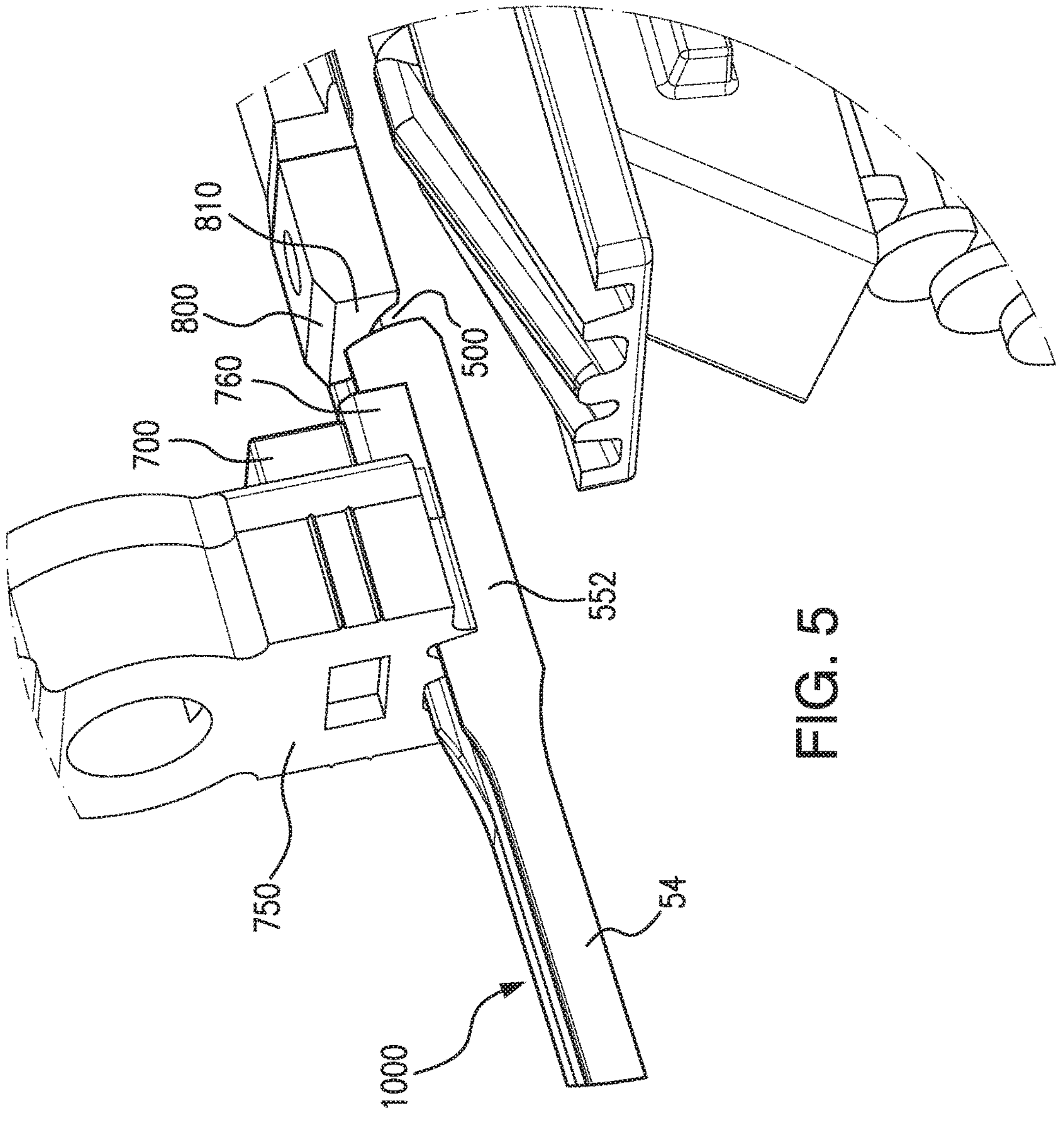
FIG. 5 is a detailed view of the home magnet which can interact with the driver blade tip.

FIG. 5 is a detailed view of the home magnet 700 which can magnetically attract the tip portion 552.

Figure 6:
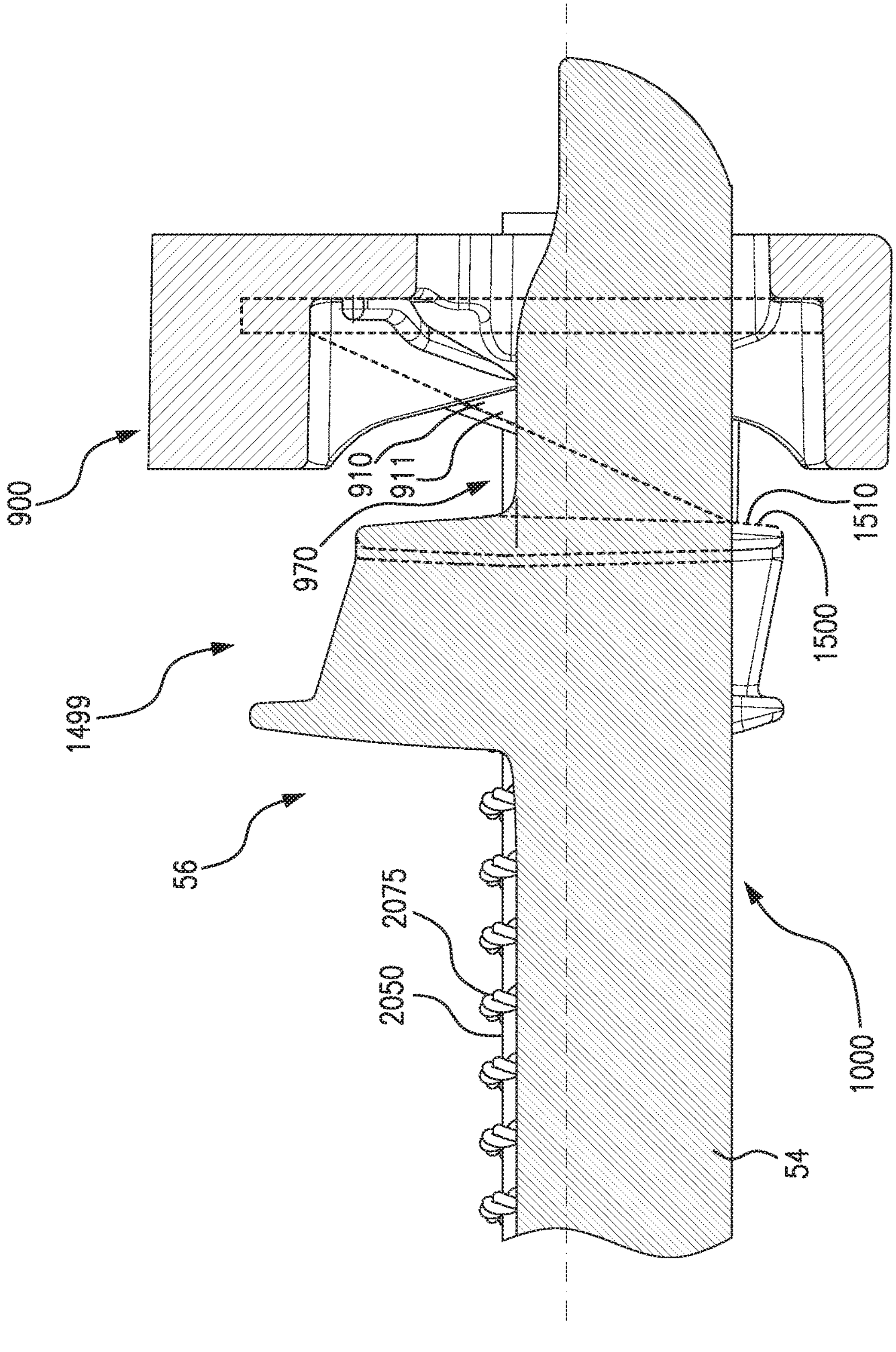
FIG. 6 is a close up view of an angled upper bumper.

FIG. 6 is a close up view of an embodiment having one or more angled bumper 899. In the embodiment of FIG. 6, one or more of the bumper 899 having an angled shape can be used for impact by a driver blade ear 1100 and 1200 (FIG. 3) and the bumper 899 with an angled shape can absorb energy and articulate the driver blade tip 500. In the embodiment of FIG. 6, during the return stroke of the driver blade 54 after driving a nail 53, a blade guide 2050 can guide the driver blade into the one or more of the bumper 899 on the return stroke. In an embodiment, a blade guide 2050 can be used in conjunction with a return spring 2075 which can optionally be coaxial to the blade guide 2050 or otherwise located to dampen the energy of the return stroke. Optionally, the driver blade can have one or more projecting portions (respectively referred to as an "ear"). The driver blade can have one or more ears which can impact one or more of the upper bumper and can upon contact with the one or more of the bumper 899 and can move the driver blade axis 549 such that the driver blade axis 549 is not collinear with the driving axis 599.

Figure 7:
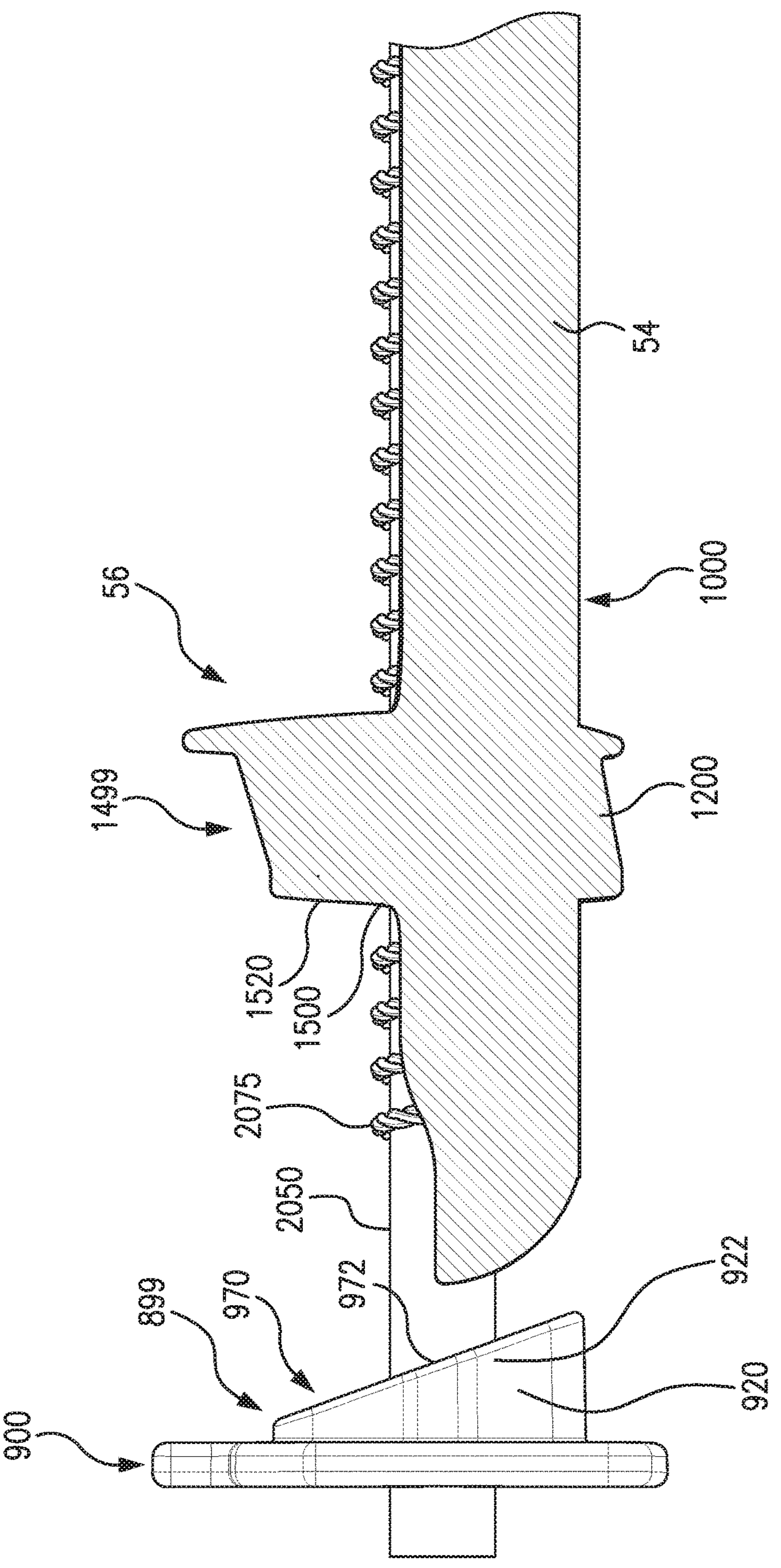
FIG. 7 is a detailed view of a driver blade ear which can impact an angled surface of an upper bumper.

FIG. 7 is a detailed view of a section of driver blade 54 having the second driver blade ear 1200 which can impact the second bump surface 972 of the second bumper 920 which is at an angle from the second pivot surface 1520. The bumper 899 and/or the driver blade 54 can have one or a number of angled contact surfaces. In an embodiment, a bumper angle 973 (FIG. 11) of the bumper 899 can cause the tip 500 of the driver blade to radially move away from the driving axis to contact the nail stop. Herein, this motion is also referred to as articulation. The bumper angle 973 of an upper bumper can cause the tip of the driver blade to radially move away or articulate away from the nail driving axis 599 toward the driver blade stop 800 and/or a position proximate to and/or in contact with a magnet, such as the home magnet 700. The articulation angle can vary widely and can be in a range of from greater than zero to greater than 30°, or in a range of from 0.05° to 25°.

Figure 8:
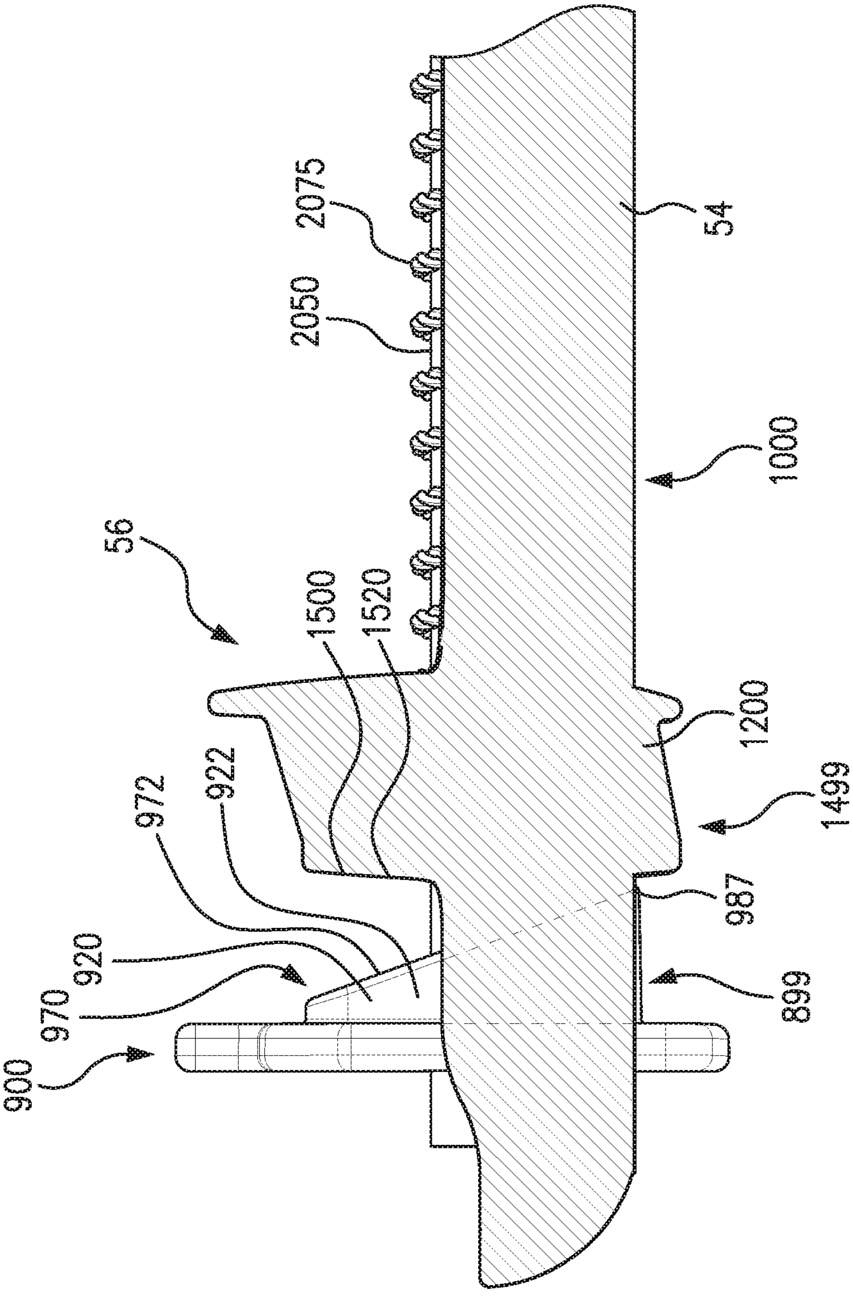
FIG. 8 is a close up view of a driver blade in a return configuration showing a driver blade ear proximate to an impact point.

FIG. 8 is a close-up view of the driver blade in a return configuration showing the second driver blade ear 1200 proximate to a pivot point 987 of the bumper 899. In an embodiment, the driver blade 54 and driver blade tip 500 can be articulated from the nail driving axis 599 at an articulation angle 719 of about 1°, or 2°, or 3°, or 4°, or 5°.

Figure 9:
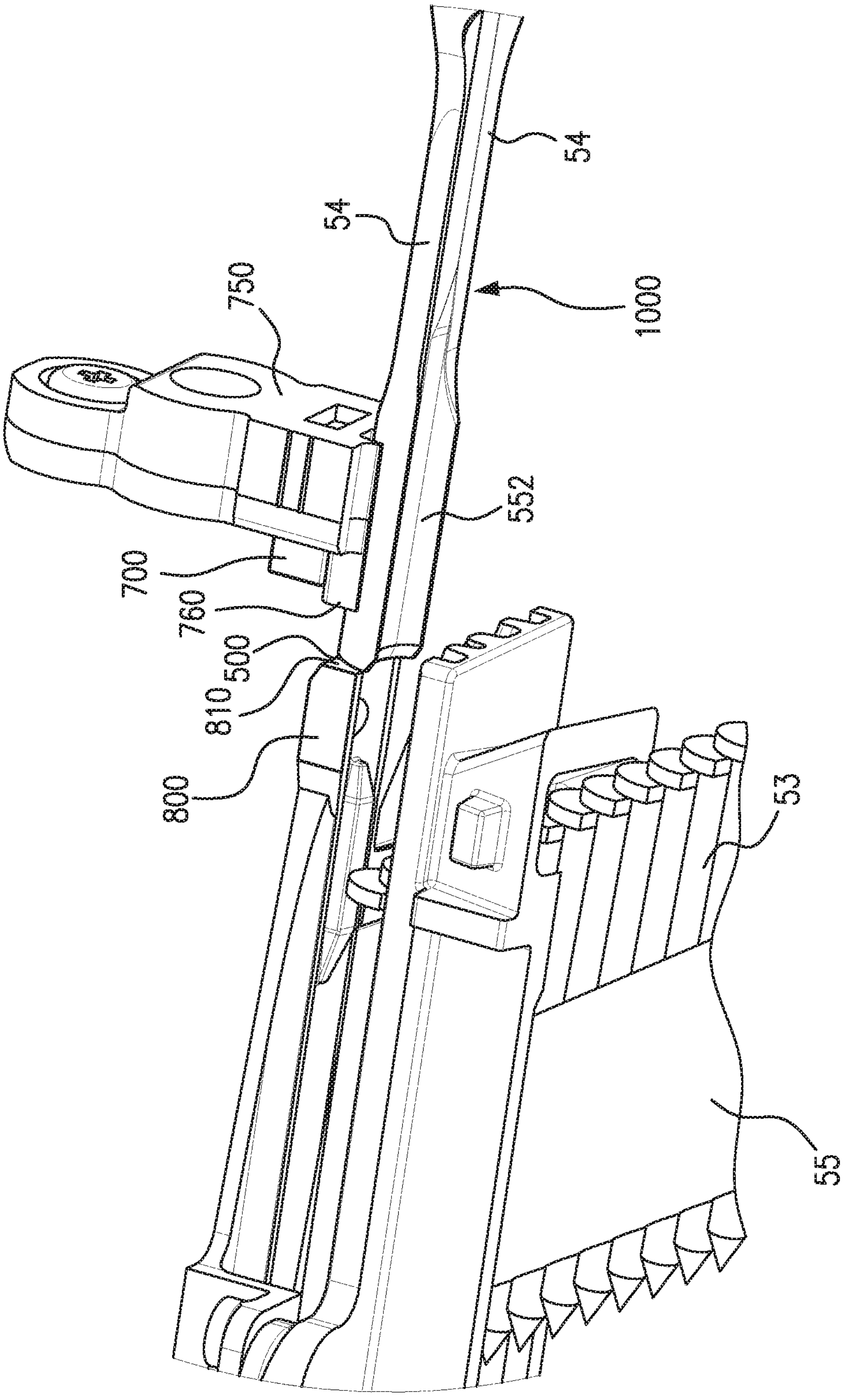
FIG. 9 is a driver blade stop close up view in which the driver blade tip is in contact with the driver blade stop.

FIG. 9 is a close-up view in which the driver blade tip 500 is in contact with the driver blade stop 800.

Figure 10:
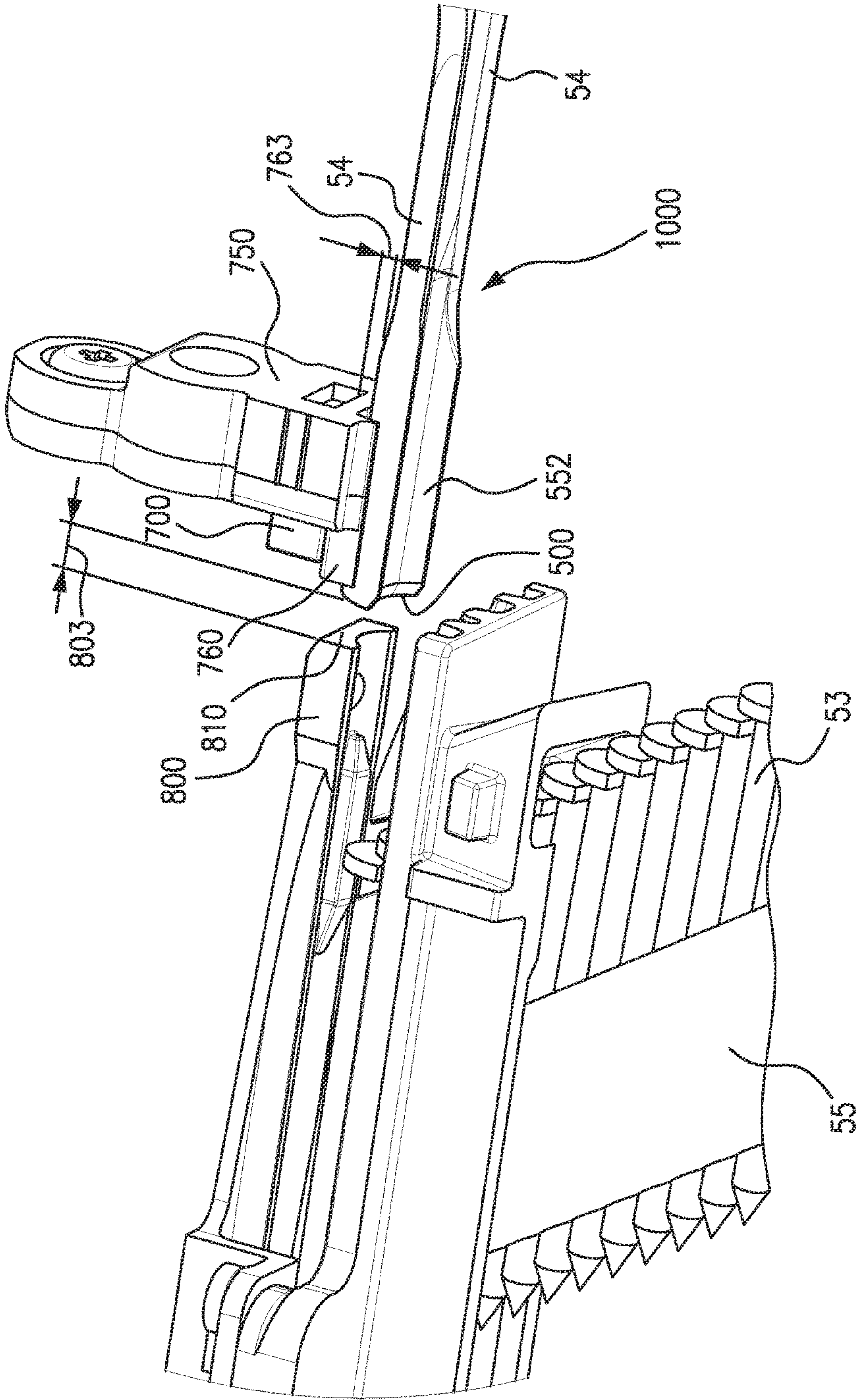
FIG. 10 is a driver blade stop close up view in which the driver blade tip is not in contact with the driver blade stop.

FIG. 10 is a close-up view in which the driver blade tip 500 is in contact with the driver blade stop 800. FIG. 10 shows the driver blade 54 at rest in a home position in which the tip portion 552 can have the driver blade tip 500 that is seated in a home seat 760. The home seat can have a home seat thickness 763. The home magnet holder 750 can provide support for at least a part of home magnet 700. The home seat 760 can be a portion of the home magnet holder 750 or can optionally be a separate piece. The home seat thickness can be used to limit the magnetic force attracting the driver blade 54.

Figure 11:
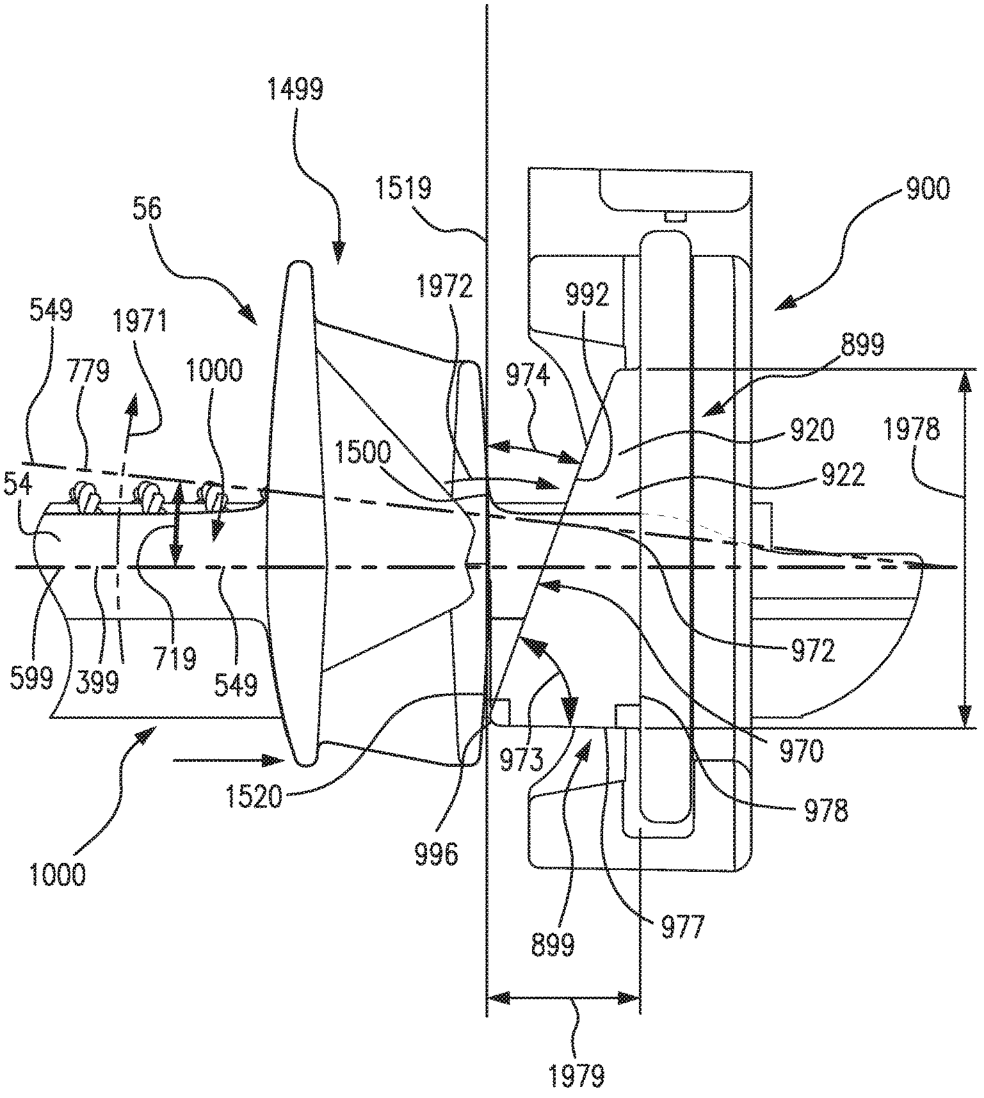
FIG. 11 is a close up view of the tail portion of the driver blade at the moment of contact with a bumper.

FIG. 11 is a close up view of the tail portion 56 of the driver blade 54 at the moment of contact with the bumper 899. In the example of FIG. 11, the driver blade 54 has returned after striking a nail 53 along the nail driving axis 599 and in alignment with the drive path 399. This return path is only one of many variations of return paths which can cause a portion of the driver blade 54 to impact upon the bumper 899. In the example of FIG. 11, the driver blade axis 549 is collinear and/or along the nail driving axis 599. FIG. 11 shows the precise moment when at least a portion of a pivot surface 1500 of a pivot portion 1499 of a tail portion 56 contacts a second pivot point 996 of a second bumper 920. A second bumper 920 is shown having a second bump surface 972. The second bumper 920 has a bumper angle 973 between the second bump surface 972 and the second bumper side 977. In this embodiment, the second bumper side 977 is perpendicular to the second bumper base line 978 of the second bumper base 979. At the depicted moment of contact in FIG. 11, the second pivot surface 1520 of pivot surface 1500 is coplanar with pivot plane 1519. Pivot plane 1519, pivot surface 1520 and pivot plane 1519 are shown to be coplanar in FIG. 11 and are also shown as perpendicular to the second bumper side 977. Thus, the pivot surface 1500 is parallel to the second bumper base line 978. FIG. 11 shows a pivot angle 974 which is formed between the pivot surface 1500 and the second bump surface 972. The displacement of the driver blade axis 549 can occur as shown by a displacement arrow 1972. The contact of the pivot surface 1500 to the second pivot point 996 causes the driver blade 54 to pivot such that the driver blade axis 549 moves out of alignment with the nail driving axis 599 and shown by articulation arrow 1971. As the pivoting and/or tilting increases the articulation angle 719 increases.

FIGS. 12A-12F show a variety of types of the bumper 899. The bumper 899 can be a single bumper or multiple bumpers. The bumpers can be made from any material which can absorb and/or withstand a shock and/or impact from a portion of the driver blade 54.

Figure 12A:
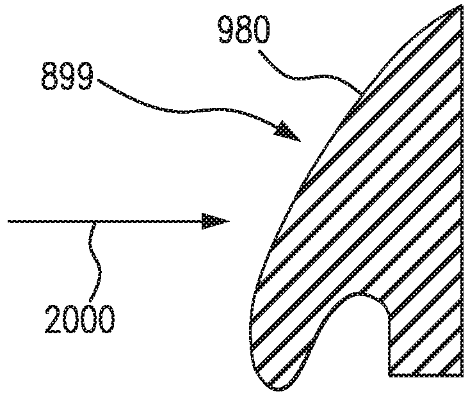
FIG. 12A shows a curving bumper.

FIG. 12A shows a curving bumper. A bumper 899 can be of any shape which can impart a moment resulting in an articulation and/or pivot of the driver blade 54 upon impact. FIG. 12A shows an crescent shaped bumper made from a bumper material 980 which can reversibly deform when impacted by a portion of the driver blade 54 from the impact direction shown by impact direction arrow 2000.

Figure 12B:
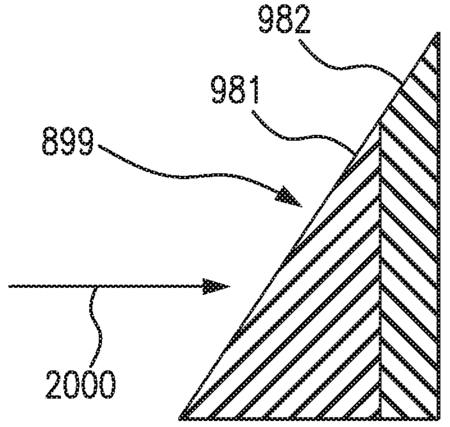
FIG. 12B shows a bumper having two bumper materials.
Figure 12C:
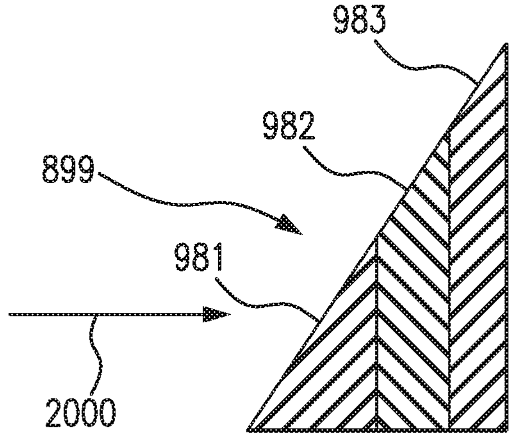
FIG. 12C shows a bumper having three bumper materials.
Figure 12D:
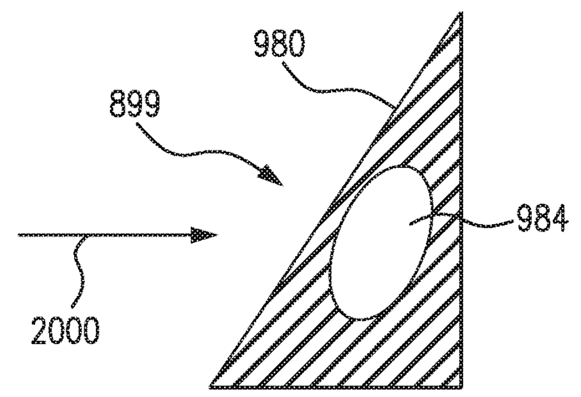
FIG. 12D shows a bumper having a shock absorber cell.
Figure 12E:
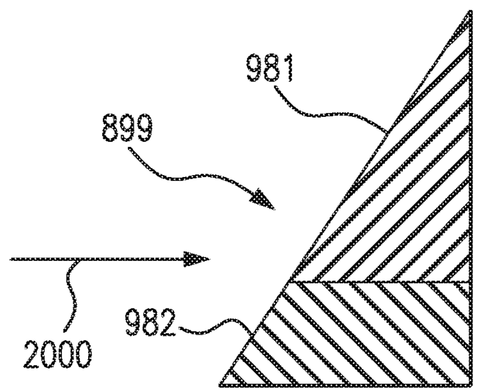
FIG. 12E shows a bumper having two axial layers.
Figure 12F:
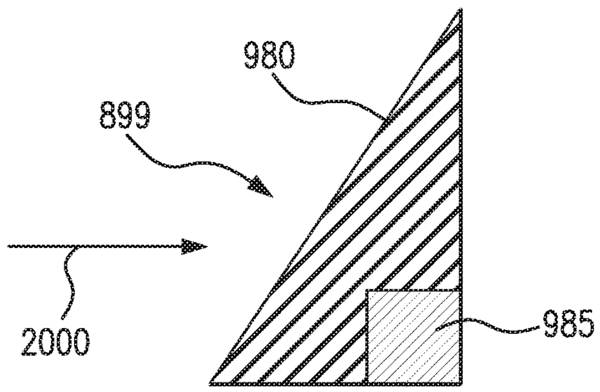
FIG. 12F shows a bumper having a bumper backstop.

FIG. 12B shows a bumper having two bumper materials which are layered perpendicularly to impact direction arrow 2000, such as the first bumper material 981 and a second bumper material 981 which can be different. FIG. 12C shows the bumper 899 having three bumper materials, such as first bumper material 981, the second bumper material 982 and a third bumper material 983. FIG. 12D shows the bumper 899 made from a first bumper material 981 and having a shock absorber cell 984. FIG. 12E shows a bumper 899 having two axial layers, and having a first bumper material 981 and a second bumper material 982. FIG. 12F shows the bumper 899 having a bumper backstop 985.

Figure 13:
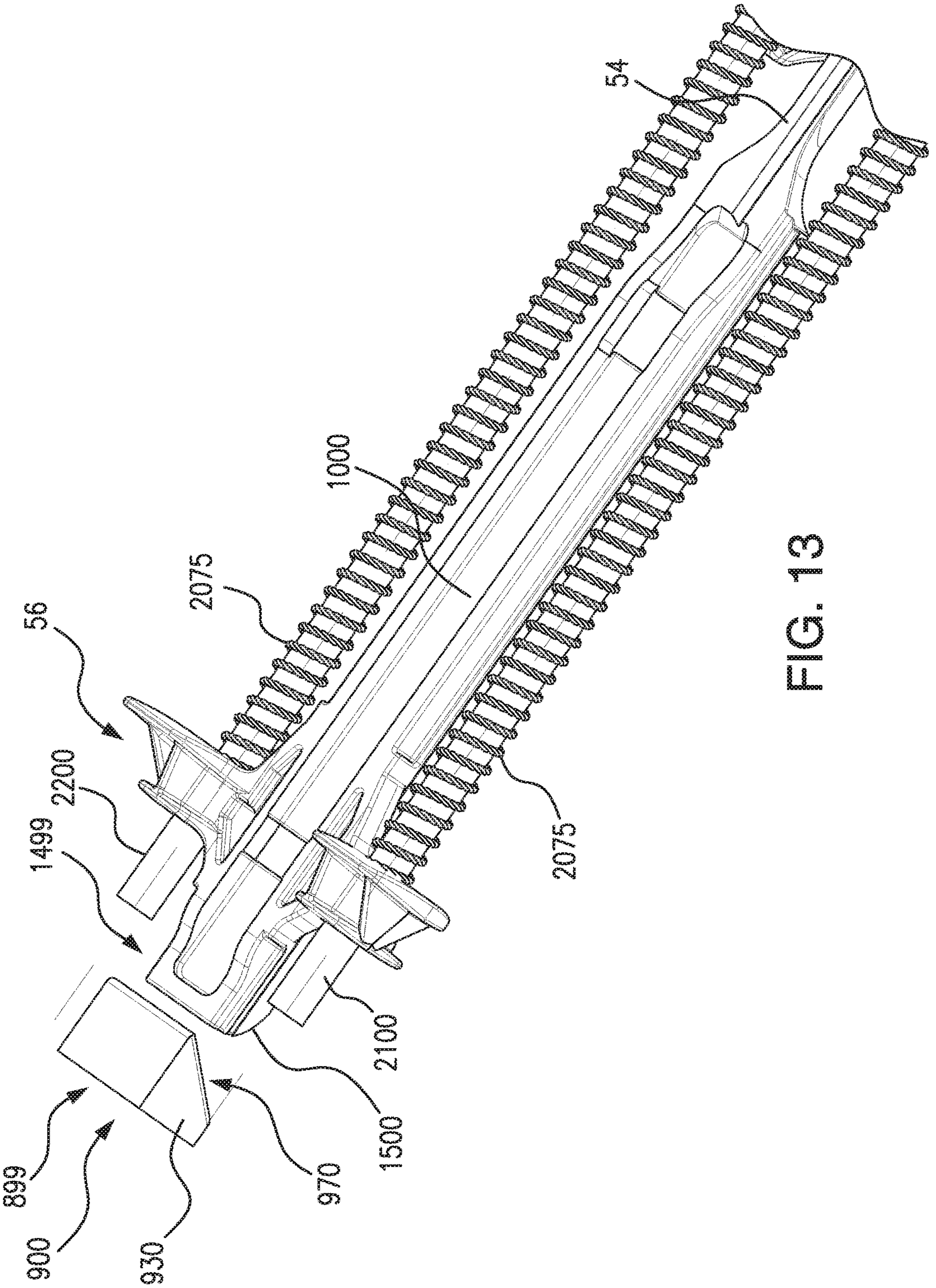
FIG. 13 is a perspective view of a driver blade and a center bumper.

FIG. 13 is a perspective view of the driver blade 54 and the bumper 899, which is a center bumper 930. The return bumper system 900 can have the center bumper 930 to receive an impact from a portion of a driver blade body 1000. The center bumper 930 can have bump surface 970 that causes the driver blade 54 to articulate upon impact with the center bumper 930.

Figure 14:
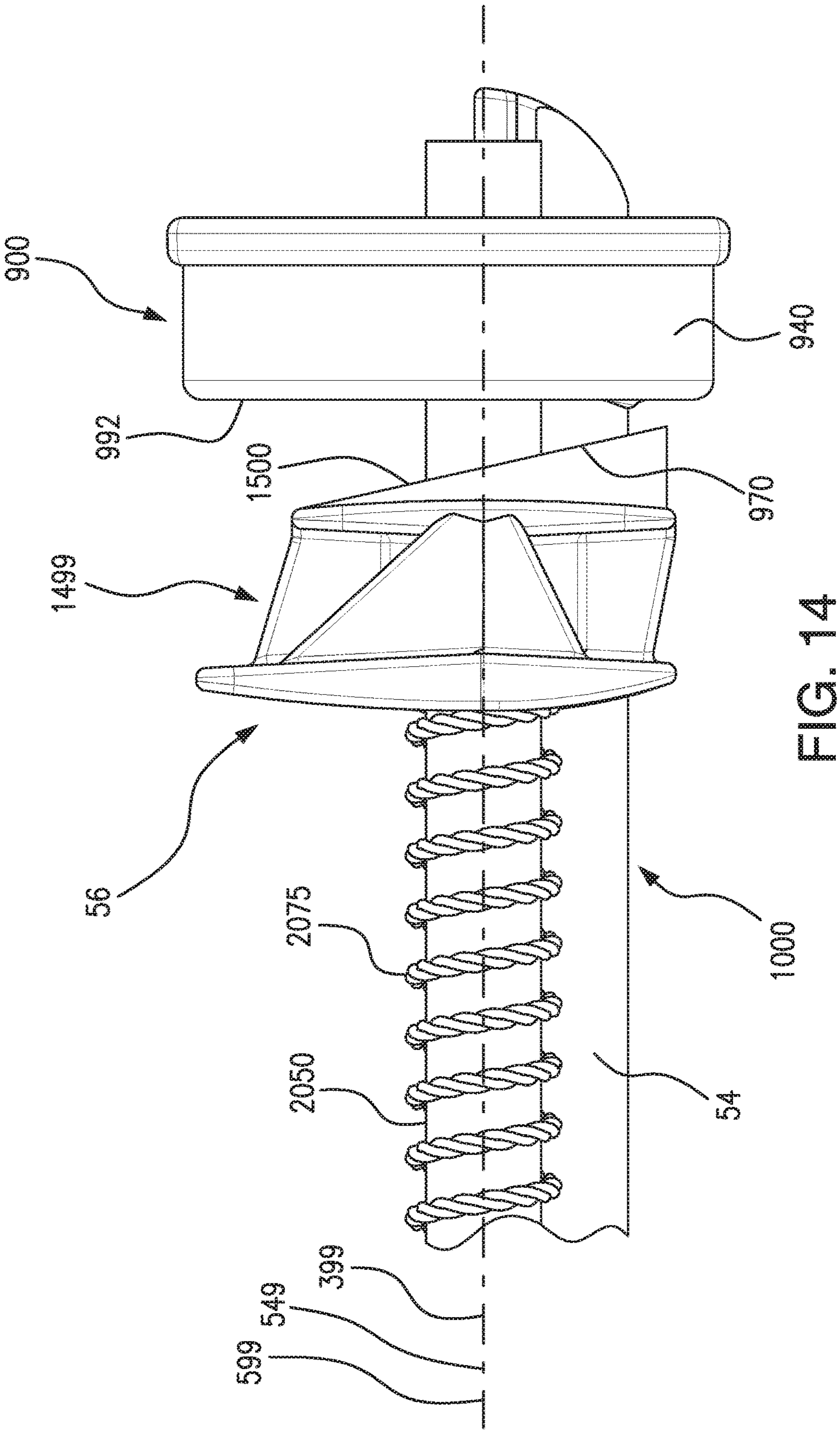
FIG. 14 is a perspective view of a driver blade and a flat bumper.

FIG. 14 is a perspective view of the driver blade 54 and a flat bumper 940. The bumper 899 can have an impact surface 992 which is perpendicular to the driver blade axis 549. The tail portion 56 has a bump surface 970 which is not parallel to the impact surface 992 and will cause the driver blade 54 to articulate such that the driver blade axis 549 will move out of alignment with the nail driving axis 599 and/or the drive path 399 and form an articulation angle 719.

Figure 15:
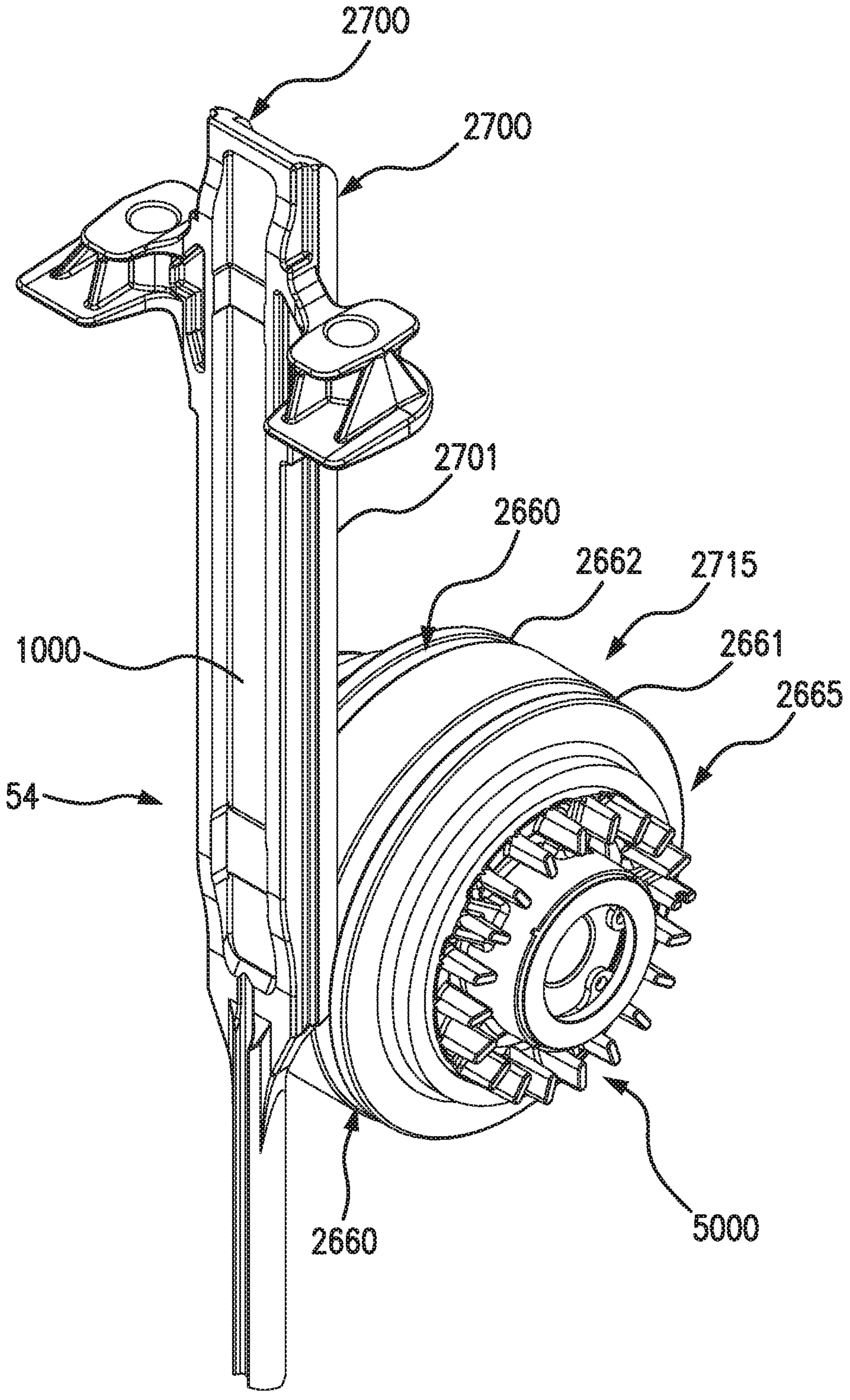
FIG. 15 is a perspective view of a high inertia flywheel.
Figure 19:
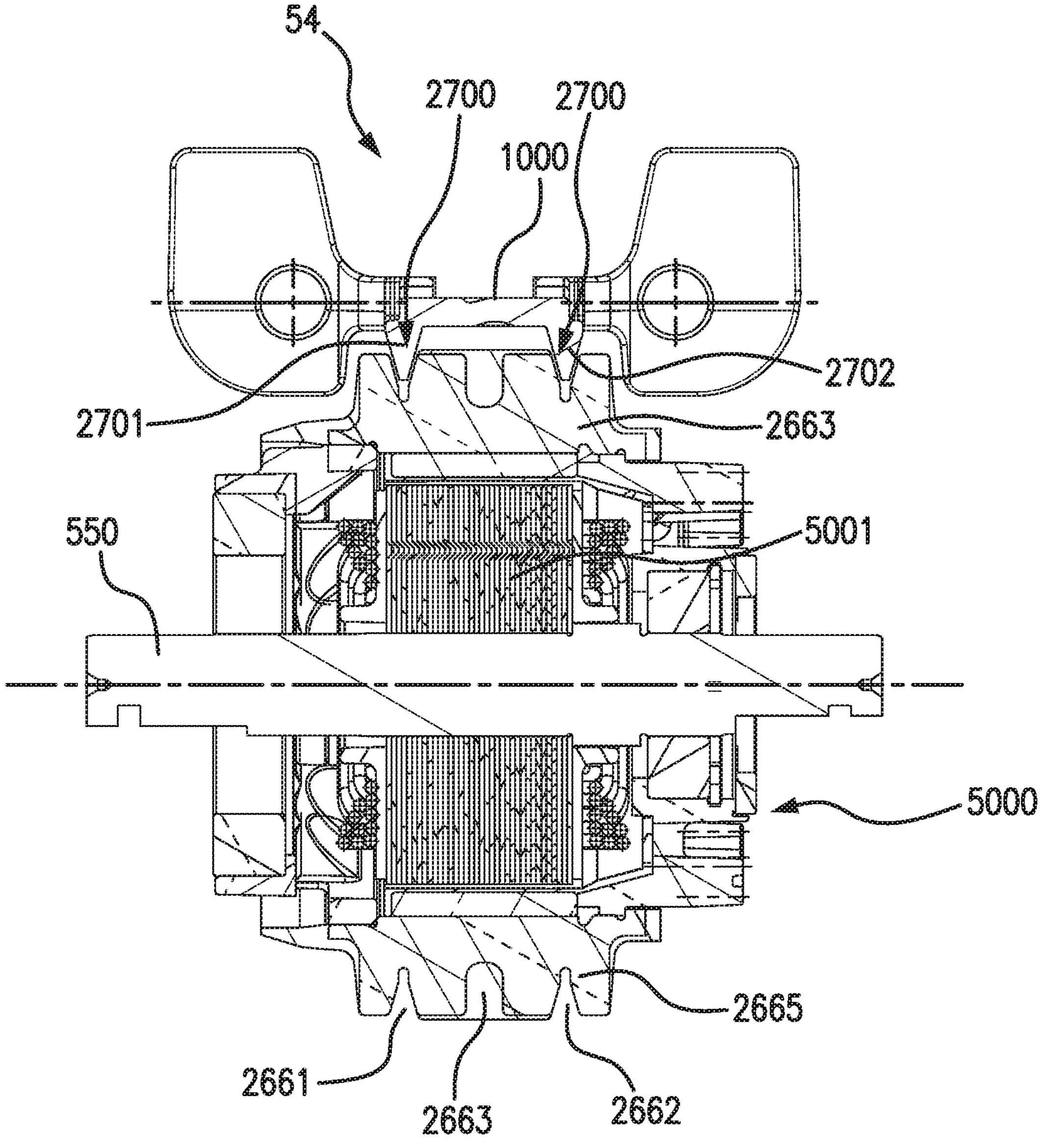
FIG. 19 is a cross-section of a high inertia flywheel.

FIG. 15 is a perspective view of the high inertia flywheel 2665. The flywheel 2665, which is rotated by a motor 5000 can be of a variety that is cantilevered over at least a portion of the motor and/or motor housing (FIGS. 20-25), or not cantilevered. Both non-cantilevered and cantilevered flywheels can be high inertia flywheels which can drive the driver blade 54. Motor 5000 can have a motor windings 5001 (FIG. 19) that impart rotation to the rotor shaft 550 (FIG. 19).

FIG. 15 also shows a driver blade 54 having the driver blade body 1000. The high inertia flywheel 2665 can impart a pinch force on the driver blade body 1000 being driven by the high inertia flywheel 2665. The high inertia flywheel 2665 can have one or more flywheel grooves 2660, such as a first flywheel groove 2661 and a second flywheel groove 2662. The driver blade 54 can have a plurality of blade fins 2700, such as first blade fin 2701 which can be frictionally engaged by the first flywheel groove 2661, and a second blade fin 2702 (FIG. 17) which can be friction ally engaged by the second flywheel groove 2662.

In an embodiment, the high inertia flywheel 2665 can have a mass in a range of 50 g to 1000 g. In an embodiment, the high inertia flywheel 2665 can have a mass ranging from 100 g to 500 g depending on the kind of nailer used.

In other examples, the high inertia flywheel 2665 disclosed herein can have a mass in a range of from less than 28.4 g to greater than 1418 g.

The high inertia flywheel 2665 can have an outer diameter from small, such as from less than 0.02 m to quite large, such as greater than 0.6 m. For example a high inertia flywheel 2665 can have a portion, such as a flywheel body portion and/or a flywheel outer diameter having a diameter which can be 0.001 m to 0.6 m.

In an embodiment, the mass of the driver blade 54 is 80 g or greater, such as in a range of from 80 g to 200 g. For example, the driver blade 54 can have a mass in a range of from 85 g to 170 g.

In an embodiment, the high inertia driver system can rotate a flywheel at a rotational speed of 15000 rpm or less. Optionally a high inertia flywheel 2665 of the high inertia driver system can have a speed in a range of 7000 rpm-15000 rpm. Optionally, the high inertia flywheel 2665, can be a cantilevered flywheel. In an embodiment, the high inertia flywheel 2665, can be operated at a rotational speed of from less than 2500 rpm to 15000 rpm, such as, 7500 rpm, or 12500 rpm.

The high inertia driver system, the high inertia flywheel 2665 can have a rotational speed in a range of 700 rad/s-1600 rad/s. For example, any of the flywheels disclosed herein can be operated at any rotational speed in the range of from 700 rads/s to 1600 rads/s.

In an embodiment of the high inertia driver system, the high inertia flywheel 2665, can be operated such that the speed of a flywheel portion and/or a portion of contact surface 2715 can be in a range of from less than less than 10 m/s to 30 m/s, or greater. Optionally, the high inertia flywheel 2665, can be a cantilevered flywheel. For example the cupped flywheel 702 can be operated such that speed of a flywheel portion and/or a portion of contact surface 2715 is 1.5 m/s to 30 m/s.

In an embodiment of the high inertia driver system, the high inertia flywheel 2665 can have an inertia in a range of 0.10 g*m^2 or greater, such as in a range of 0.10 g*m^2-0.40 g*m^2 when a portion of the flywheel is contacted with a portion of a driver blade 54.

In an embodiment of the high inertia driver system, the high inertia flywheel 2665 can impart a pinch force from a portion of the flywheel to a portion of the driver blade when the flywheel 2665 contacts the driver blade of 222 N or greater, such as in a range of 222 N to 2669 N. For example, the high inertia driver system can produce a pinch force in the range of 222 N to 2669 N.

In an embodiment, the pinch force imparted by a portion of the flywheel 2665 to a driver blade when in contact with a portion of the driver blade can be in a range of 222 N-2669 N. The mass of the driver blade can be in a range of 80 g to 200 g.

In an embodiment, when a portion of the high inertia flywheel 2665 is contacted with a portion of the driver blade 54, the driver blade can be driven at a speed in a range of from 30 m/s to less than 10 m/s. For example, the driver blade 54 can have a speed of 0.8 m/s to 30 m/s, when the flywheel can have a speed 15000 rpm, or less.

Figure 16:
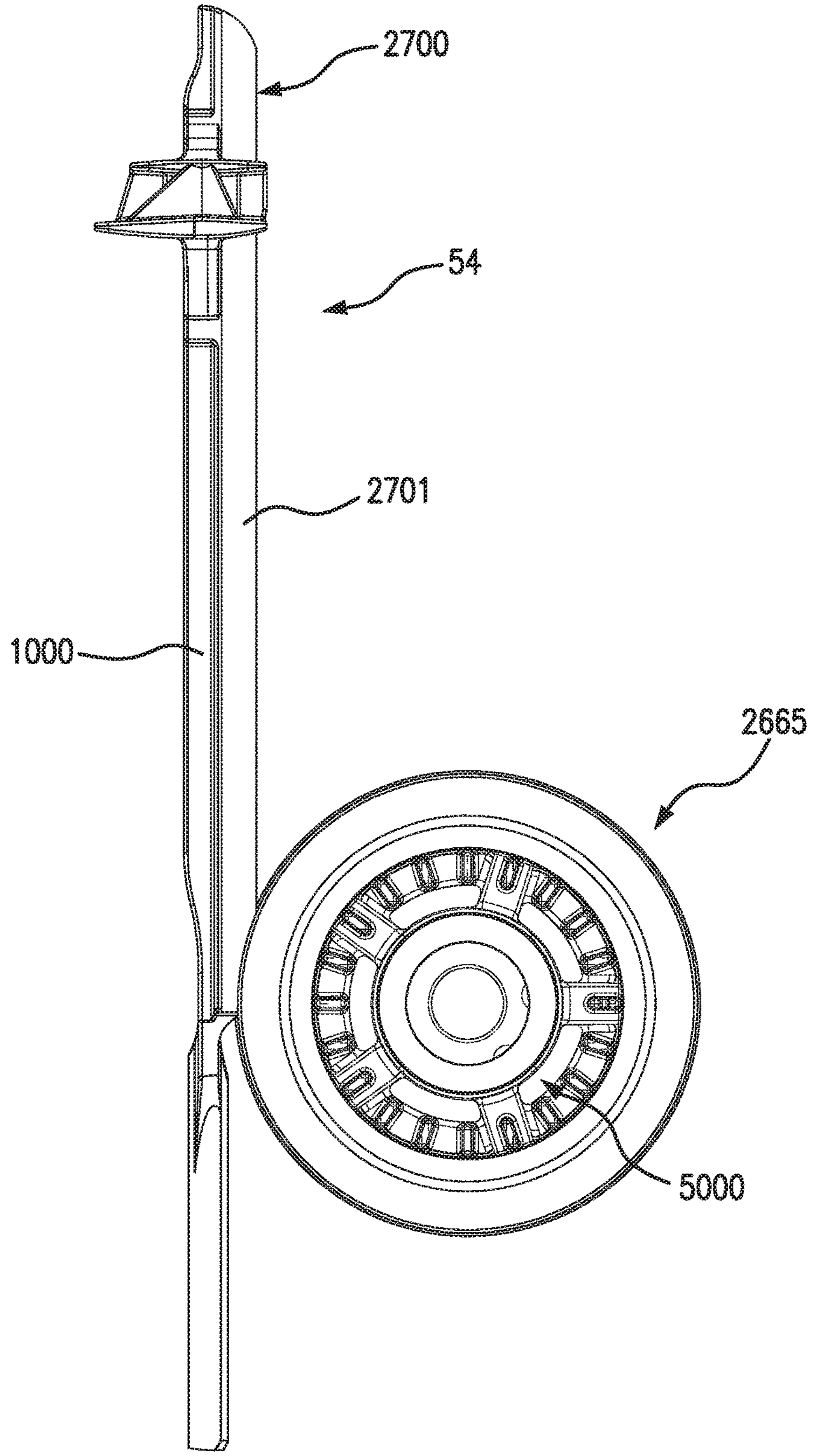
FIG. 16 is side view of the high inertia flywheel proximate to a driver blade.

FIG. 16 is a side view of the configuration shown in FIGS. 15 and 16 in which the high inertia flywheel 2655 is proximate to a driver blade 54. The high inertia flywheel 2665 is shown engaged with driver blade 54 and imparting a driving force, which can be a pinch force, to the driver blade body 1000.

Figure 17:
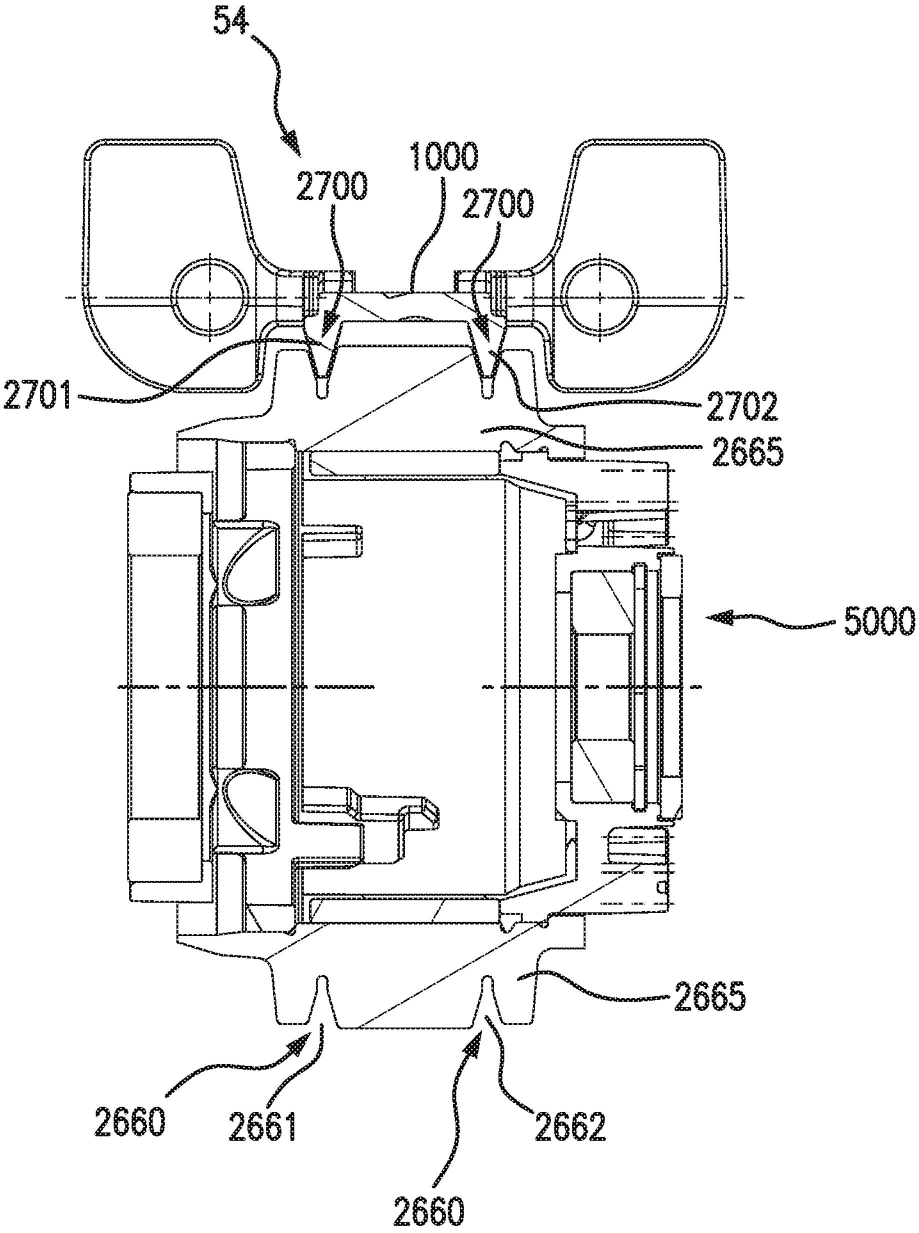
FIG. 17 is a top view of the high inertia flywheel proximate to a driver blade.

FIG. 17 shows a top view of the configuration of FIG. 15 and shows the motor 5000 and a partial cross-section of the high inertia flywheel 2665. The first flywheel groove is shown frictionally engaged with the first blade fin 2701 and the second flywheel groove 2662 is shown frictionally engaged with the second blade fin 2702.

Figure 18A:
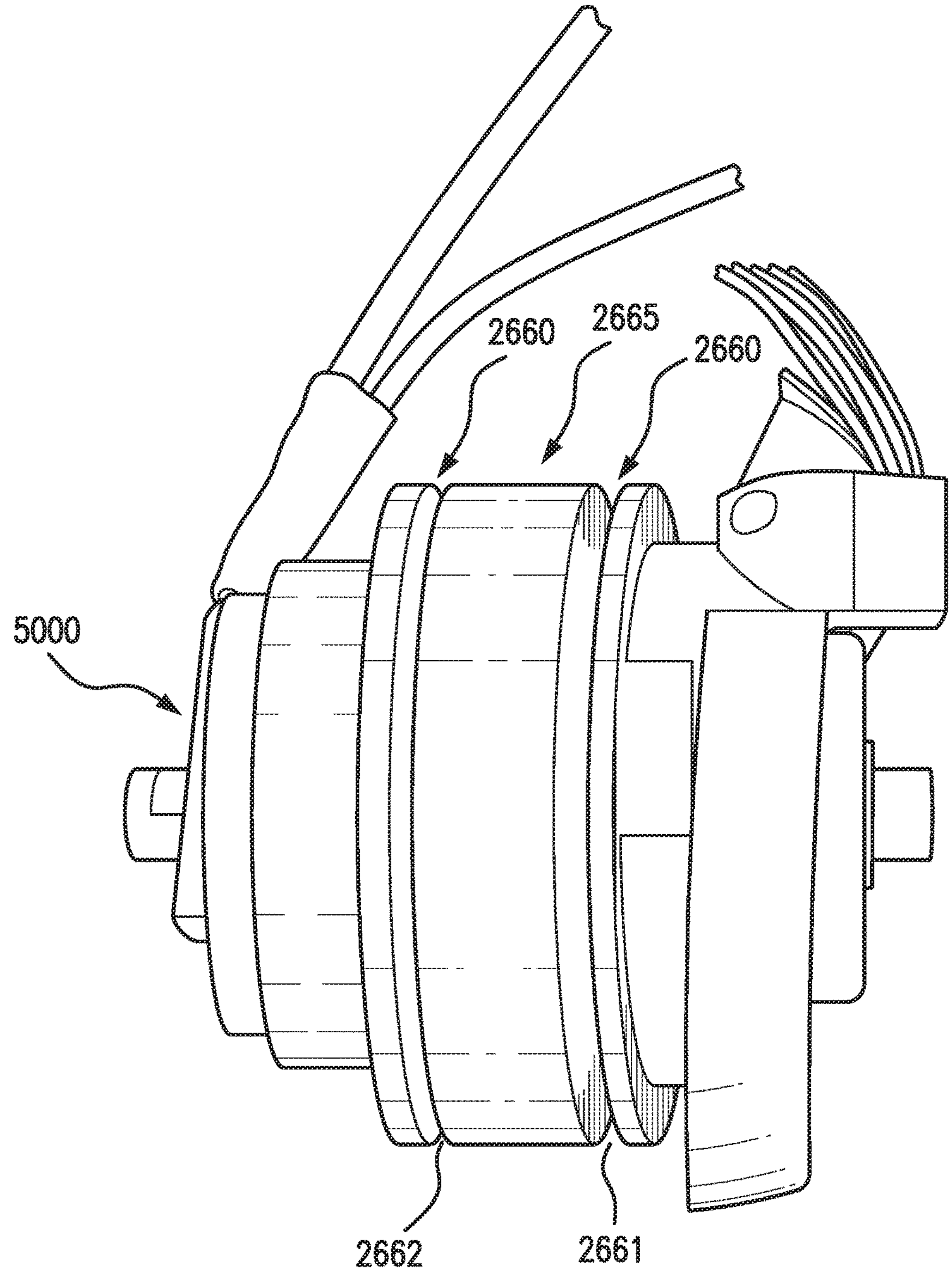
FIG. 18A is a first embodiment of a high inertia flywheel.

FIG. 18A is a first embodiment of the high inertia flywheel 2665. The high inertia flywheel 2665 has the first flywheel groove 2661 and the second flywheel groove 2662.

Figure 18B:
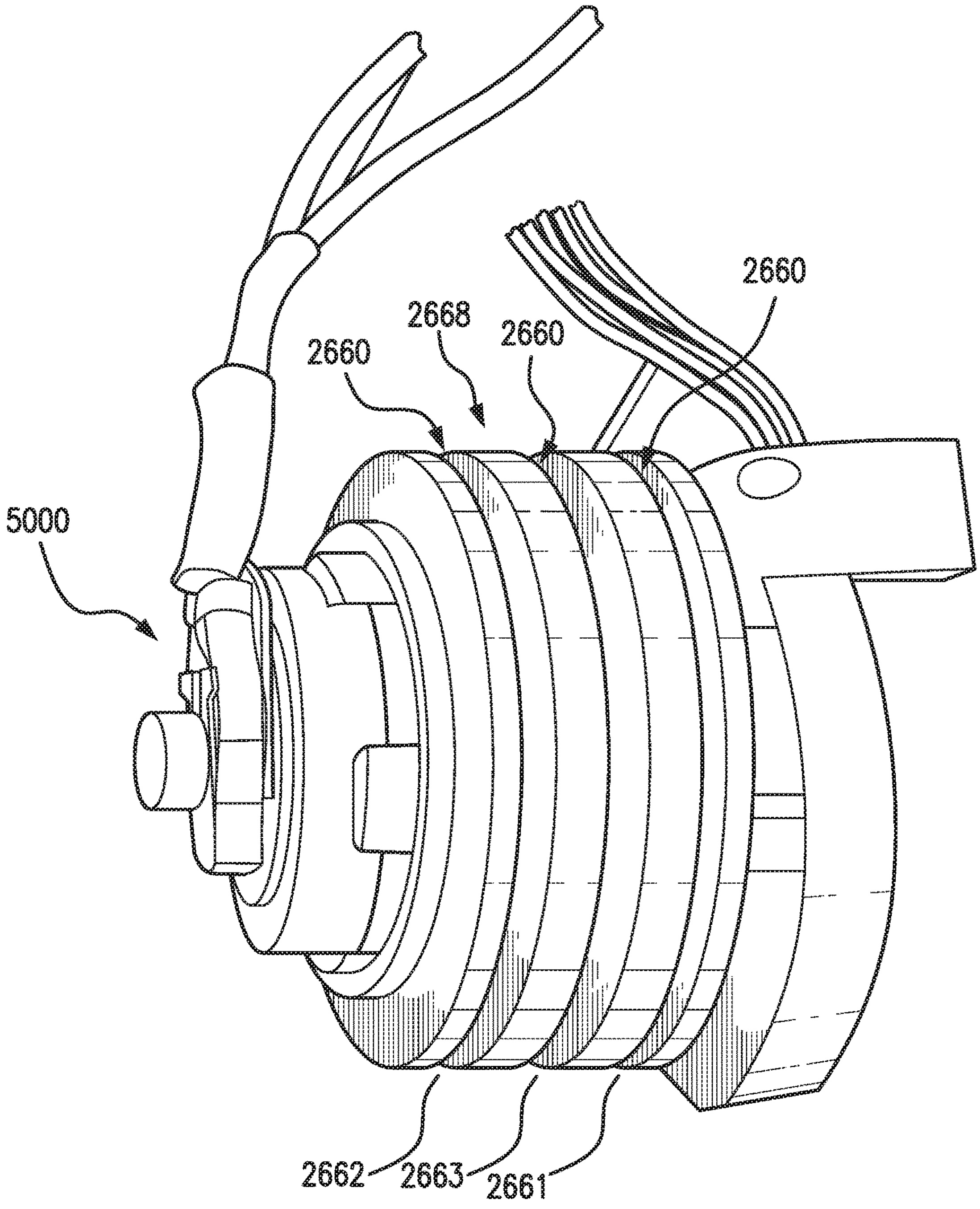
FIG. 18B is a second embodiment of a high inertia flywheel.

FIG. 18B is a second embodiment of a high inertia flywheel 2668. The high inertia flywheel 2668 has the first flywheel groove 2661, the second flywheel groove 2662 and a third flywheel groove 2663.

FIG. 19 is a cross-sectional view of the high inertia flywheel 2665 shown in FIGS. 15 and 16 showing the motor windings 5001 of motor 5000 which drives and/or rotates the high inertia flywheel 2665. The high inertia flywheel 2665 is shown cantilevered over at least a part of the motor 5000 and can have any of the characteristics of mass, speed, rotation, geometry, and engagement with the driver blade 54 or other characteristics disclosed herein.

In an embodiment, the high inertia driver system can have a number of operational modes which operate the flywheel 2655, under different operating conditions.

For example in one embodiment, in a first operating mode of the high inertia flywheel 2665, the speed is in a range of from 12000 rpm to 15000 rpm, such as 13000 rpm; and in the second operating mode of the high inertia flywheel 2665, speed is in a range of from 7000 rpm to 12000 rpm, such as 11000 rpm.

In an embodiment, the high inertia driver system can be used in a framing nailer having a low speed driver blade 54 in which the speed, can be 25 m/s, or less. Low speed driver blades can result in lower impact speed on the bumper 899, or to be controlled by bumper system 900.

Example 1

In an example a framing nailer having a flywheel inertia of 2.25 10^-4 kg m^2 and a flywheel speed of 13000 rpm experienced a 23 percent lower return spring life than a framing nailer using a high inertia driver system having a flywheel inertia of 2.77 10^-4 kg m^2 and a flywheel speed of 11000 rpm. The increase in flywheel inertia and reduction of flywheel speed in this example was found to not materially affect tool weight, readiness to fire, tool reliability, and nail penetration (power). This example found a reduction in flywheel speed and driver speed prolonged the useful life of elastic return elements connected to the driver, such as stranded wire return springs.

Example 2

In an embodiment, the kinetic energy transferred to the return springs when using the high inertia driver system is reduced by 23 percent in a comparative test.

Figure 20:
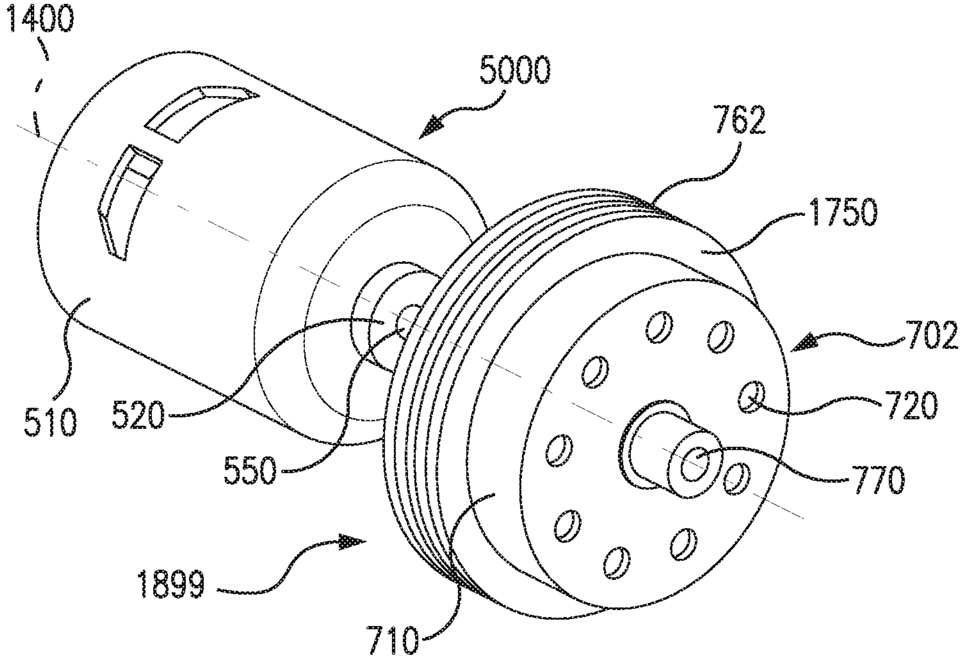
FIG. 20 is a perspective view of a cupped flywheel positioned for assembly onto an inner rotor motor.
Figure 23A:
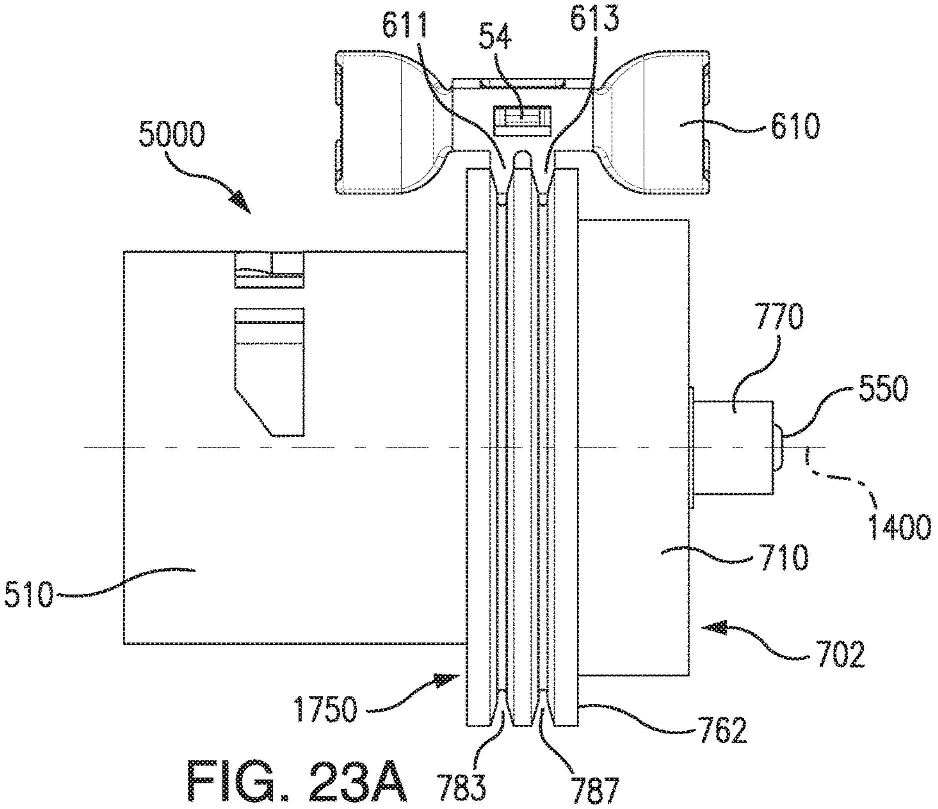
FIG. 23A a side view of a drive mechanism having the cupped flywheel which is frictionally engaged with a driver profile.

FIG. 20 is a perspective view of a third embodiment of a high inertia flywheel in the form of the cupped flywheel 702 shown as positioned for assembly onto a motor 5000. FIG. 20 illustrates the motor 5000 having a motor housing 510 and a first housing bearing 520 which bears a rotor shaft 550 driven by an inner rotor 540 (FIG. 23A). The motor can alternatively be a frameless motor which does not include a motor housing, or which can have only a partial motor housing which covers part of a longitudinal length of the motor. FIG. 20 also illustrates the cupped flywheel 702 as a cantilevered flywheel. For example the cupped flywheel 702 can have a mass of less than 14 g to 1418 g, or greater. In another example, the cupped flywheel 702 can have a mass of from less than 10 g to 1000 g, or greater. In an embodiment, the cupped flywheel 702 can have an inertia from less than 5 J(kg*m^2), 7.5 J(kg*m^2) to 600 J(kg*m^2), or greater.

FIG. 20 shows the cupped flywheel 702 in a disassembled state and in coaxial alignment with a rotor centerline 1400. In an embodiment, the cupped flywheel 702 can have a flywheel body 710 and at least one of a flywheel opening and/or a plurality of flywheel openings 720. In an embodiment, the cupped flywheel 702 can have a geared flywheel ring 762. Optionally, the cupped flywheel 702 can have a flywheel bearing 770 which can interface with the rotor shaft 550.

Figure 21:
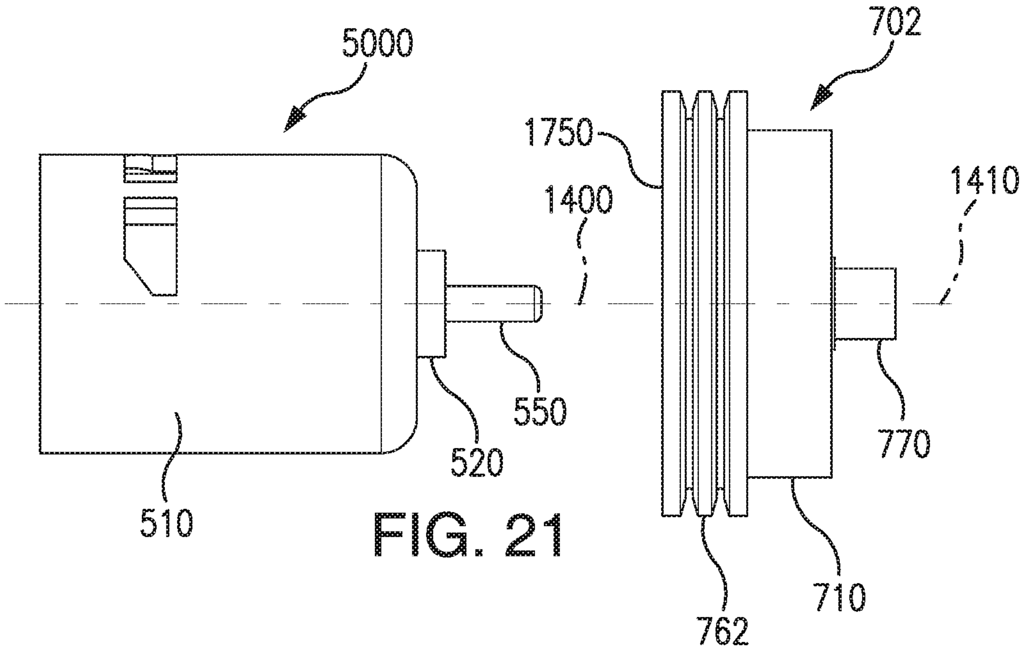
FIG. 21 is a side view of the cupped flywheel positioned for assembly onto the inner rotor motor.

FIG. 21 is a side view of the cupped flywheel 702, positioned for assembly onto the motor 5000. The cupped flywheel can be positioned such that a flywheel axial centerline 1410 is collinear with a rotor centerline 1400. In an embodiment, the cupped flywheel 702 can be frictionally attached to the rotor shaft 550 by means of fitting the flywheel bearing 770 onto a portion of the rotor shaft 550. In other embodiments, the cupped flywheel 702 can be attached to the rotor shaft 550 by other means, such as using a lock and key configuration, using a "D" shaped shaft portion mated with a "D" shaped portion of the flywheel bearing 770, using fasteners such a screw, a linchpin, a bolt, a wed, or any other means. In an embodiment, the inner rotor 540 (FIG. 23B) and/or the rotor shaft 550 and the cupped flywheel 702 and/or the flywheel bearing 770 can be manufactured as one piece, or multiple pieces.

Figure 22:
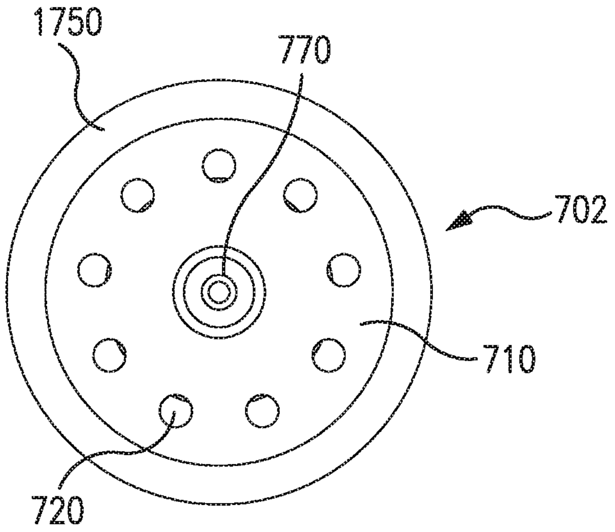
FIG. 22 is a front view of the cupped flywheel.

FIG. 22 is a front view of the cupped flywheel 702 having a number of the flywheel openings 720 in the flywheel body 710. The flywheel ring 1750 is shown extending radially away from the center of the cupped flywheel 702 and the flywheel bearing 770. There is no limitation to the number of flywheel rings which can be used. Optionally, one or more flywheel rings can be located along the length of the cupped flywheel 702. Each flywheel ring can have a contact surface to impart energy to a moveable member. Multiple flywheel rings can power multiple members, or the same member.

Figure 23B:
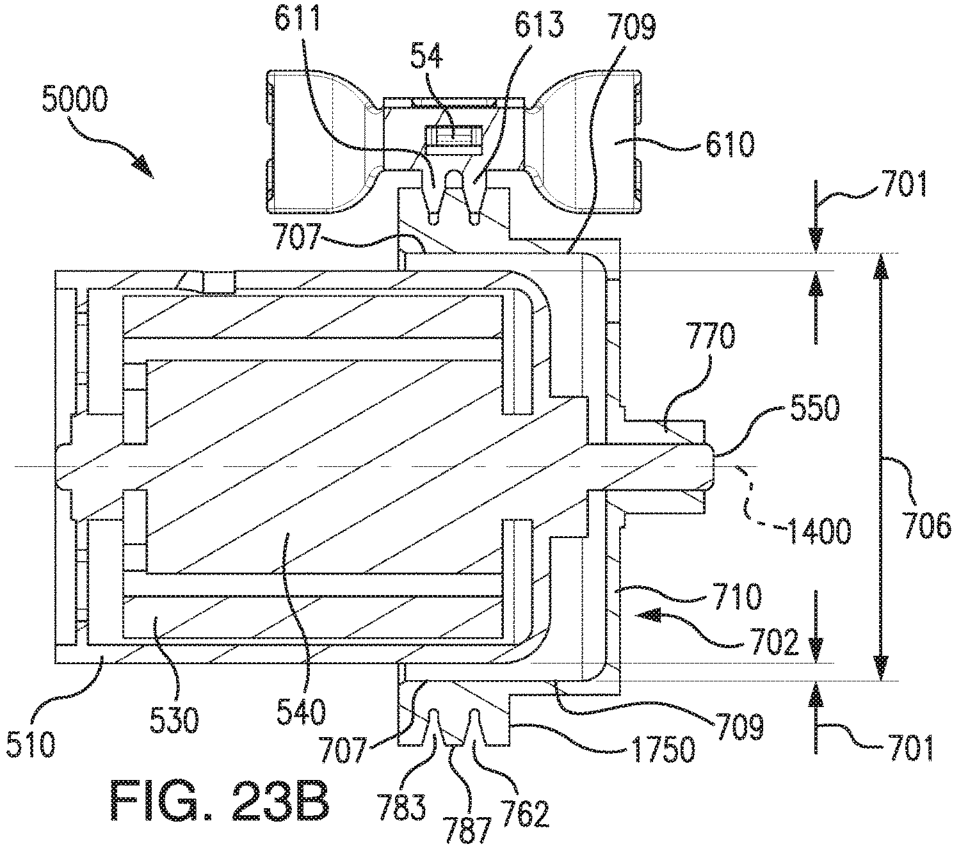
FIG. 23B is a cross-sectional view of the drive mechanism having the cupped flywheel which is frictionally engaged with the driver profile.

FIGS. 23A and 23B shown the cupped flywheel 702 is shown in an assembled state. FIG. 23A is a side view of a drive mechanism having the cupped flywheel 702, which is frictionally engaged with a driver profile 610 and/or the driver blade 54. In FIG. 23A, the mating of the flywheel ring 1750 with the driver profile 610 is shown. There is no limitation as to the means by which the flywheel 702 imparts energy to the driver profile 610 and/or the driver blade 54. In the example of FIG. 23A, the flywheel ring 1750 is a geared flywheel ring 762 having a first gear groove 783 and a second gear groove 787 which is shown in frictional contact with driver profile 610 and, more specifically, a first profile tooth 611 and a second profile tooth 613. By this frictional contact, at least a portion of the rotational energy developed in the cupped flywheel 702 is imparted to the driver profile 610 propelling the driver profile through a driving action to cause the driver blade 54 to drive a nail 53.

FIG. 23B is a cross-sectional view of a drive mechanism having the cupped flywheel 702, which is frictionally engaged with the driver profile 610. As shown, the flywheel ring 1750 is cantilevered over at least a portion of the motor 5000. In an embodiment, the flywheel ring 1750 can be cantilevered over the entirety of the inner rotor motor, or any portion of the motor 5000. The cup shape of the cupped flywheel 702, when coupled to the rotor shaft 550, configures the flywheel ring 1750 radially and in a cantilevered configuration about at least a portion of inner rotor motor and/or motor housing 510 and/or inner rotor 540. The flywheel ring 1750 can be positioned along the rotor centerline 1400 at a position at which the flywheel ring 1750 is positioned such that a portion of each of the motor housing 510, the stator 530, the inner rotor 540 and the rotor shaft 550 is radially within a flywheel ring inner circumference 707. The flywheel ring inner circumference 707 can have a diameter which optionally is the same or different from the flywheel inner diameter 706. The flywheel ring inner circumference 707 can be separated from the motor housing 510 by a flywheel motor clearance 701. There is no limitation as to the dimension of the flywheel motor clearance 701. The flywheel motor clearance 701 can be in a range of from less than a millimeter to one third of a meter, or more.

In the example embodiment of FIG. 23B, the flywheel ring inner circumference 707 can be the same as a flywheel inner circumference 709. The flywheel inner circumference 709 can be the same or different from the flywheel ring inner circumference 707. The flywheel inner circumference 709 can have any dimension which is separated from the motor housing 510 by a clearance. The flywheel inner circumference 709 can be at least in part overlap at least a portion of the inner rotor motor and/or the motor housing 510. The flywheel inner circumference 709 can at least, in part, radially encompass at least a part of inner rotor motor and/or the motor housing 510.

Figure 24:
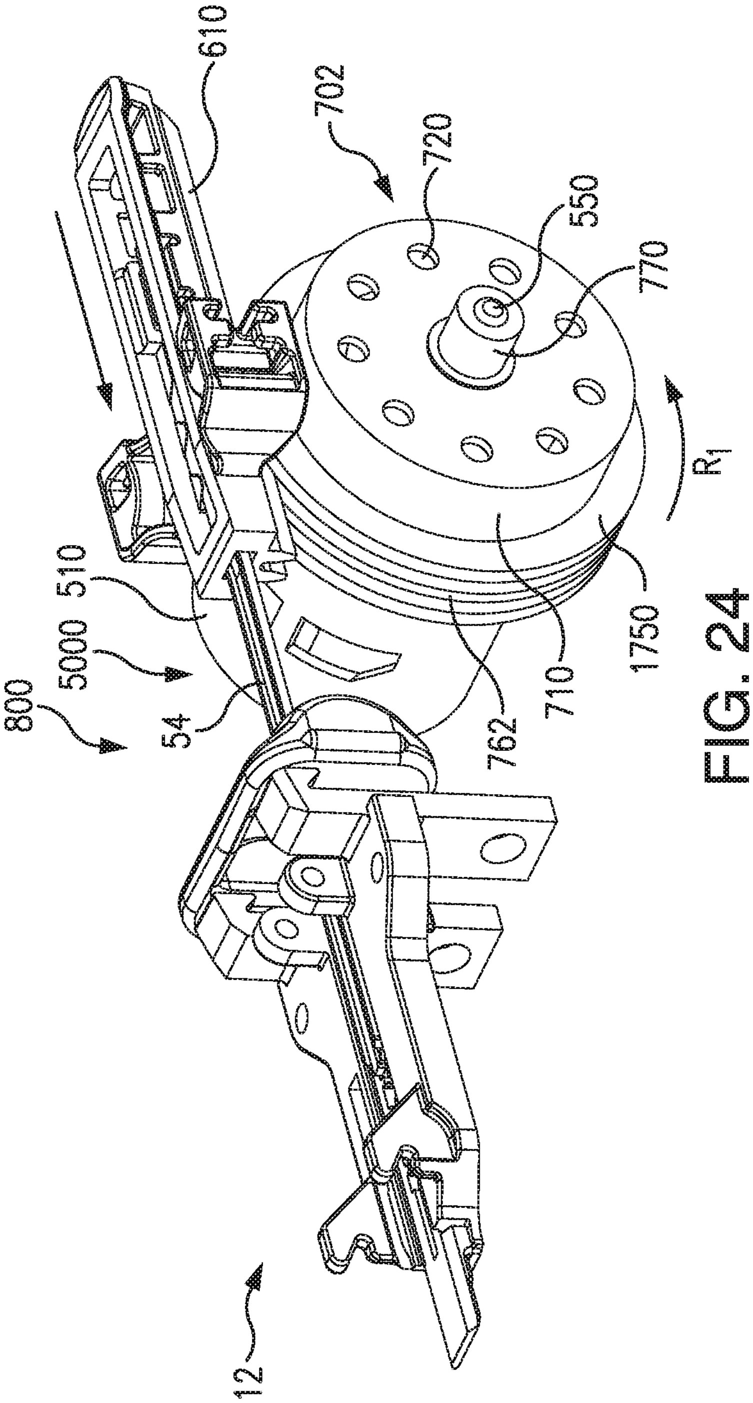
FIG. 24 is a perspective view of the drive mechanism having the cupped flywheel and the driver which is in an engaged state.

FIG. 24 is a perspective view of the drive mechanism having the cupped flywheel 702 as a high inertia flywheel and the driver profile 610 is in an engaged or contact state. The flywheel can be the cupped flywheel 702, such as the high inertia flywheel. The driving action of the driver blade 54 can be used to drive a fastener, such as a nail 53, into a workpiece. The driver profile 610 and/or the driver blade 54 can be moved into frictional contact with the flywheel 702 when the cupped flywheel is in a cantilevered state. The driver blade 54 is propelled to physically contact the fastener such that the fastener is driven into a workpiece. The driving action of the driver blade 54 can begin when the driver profile 610 makes contact with the flywheel 702. Upon contact by the driver profile 610 with the flywheel 702, the driver profile 610 is propelled toward the fastener positioned in the nosepiece 12. The driver blade 54 can physically contact the fastener such that the fastener is driven into a workpiece. After the fastener is driven into the workpiece, the driver blade 54 returns to its resting position. In an embodiment, the driver profile 610 can be driven by being in frictional contact with the rotating flywheel ring 1750 of the cupped flywheel 702.

There is no limitation regarding the diameter or dimensions of any of the various embodiments of the flywheel disclosed herein, such as the cantilevered flywheel, the cupped flywheel, or the high inertia flywheel, or other type of cantilevered flywheel having at least a portion projecting over at least a portion of the motor 5000. In other example embodiments, the cupped flywheel 702 can have a number of flywheel struts, or cupped flywheel 702 can have a flywheel mesh structure, or other structure.

In FIG. 24, the driving process is shown at a point of the driving sequence in which the driver profile 610 is frictionally engaged the cupped flywheel 702. At this stage the flywheel, will impart energy to the driver profile 610 and/or the driver blade 54. This energy will propel the driver blade 54 toward the nosepiece 12. There is no limitation to the driving force which can be imparted to the driver blade 54. For example, any of the flywheels disclosed herein can impart a driving force in a range of from less than 2 J to 1000 J, or greater. For example the cupped flywheel 702 can impart a driving force to the driver blade 54 of less than 1 J to 1000 J, or greater.

There is no limitation to the torque generated by the inner rotor motor, such as motor 5000. For example, any of the flywheels disclosed herein can be driven by the motor 5000 which can generate a torque in the range of from less than 0.005 Nm to 10 Nm, or greater. For example, the motor 5000 can generate any torque in the range of from less than 0.005 Nm to 10 Nm, or greater.

There is no limitation to the speed of the driver blade 54 at which any of the many types and variations of flywheels operate. For example, any of the driver blades 54 disclosed herein can be operated at any speed in the range of from less than 3.0 m/s to 122 m/s, or greater. In a power tool and/or fastening tool having a flywheel, such as the cupped flywheel 702, the driver blade 54 which can have a speed of for example, 0.8 m/s to 122 m/s, or greater.

Figure 25:
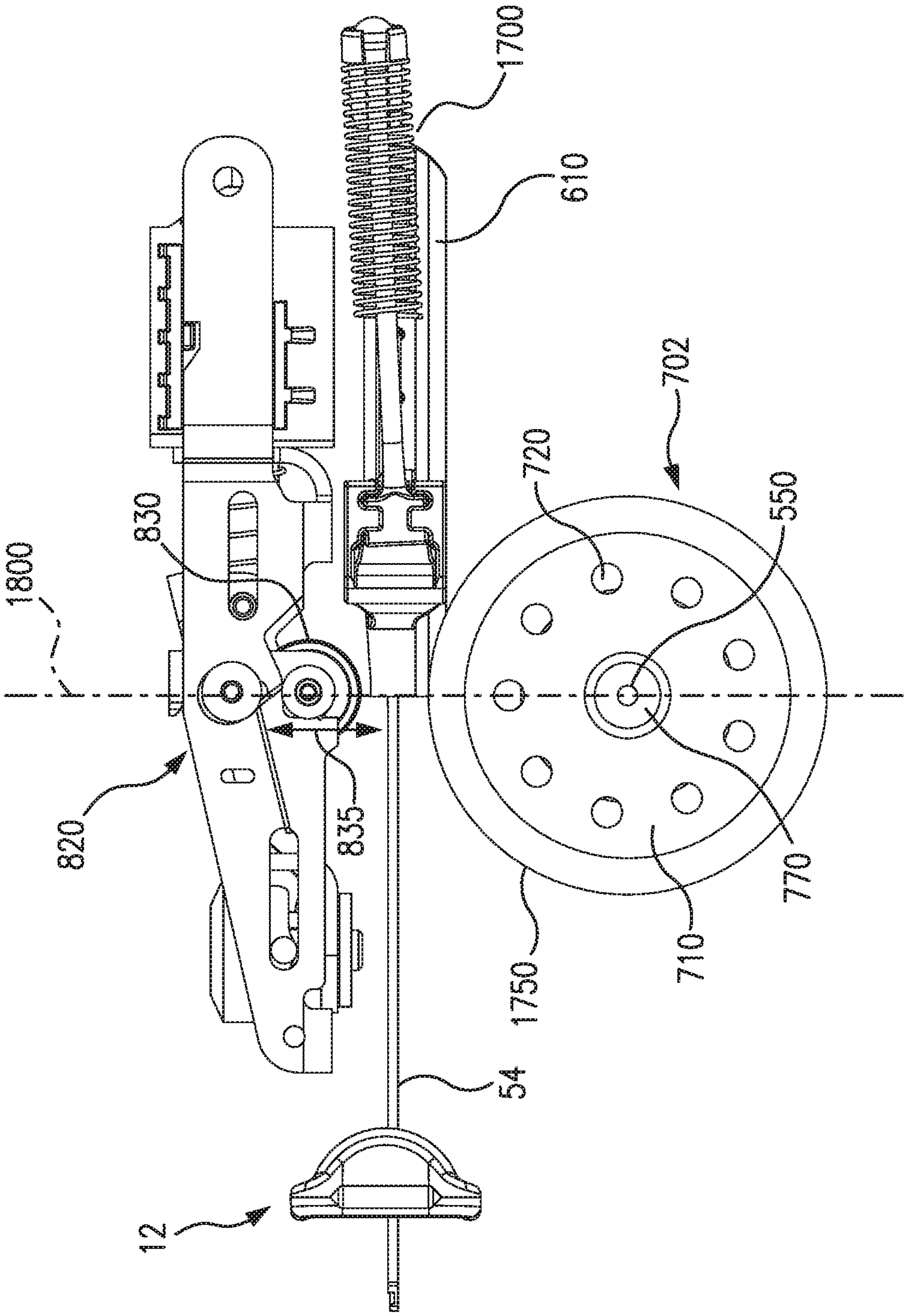
FIG. 25 is a side view of a partial driver assembly having the cupped flywheel.

FIG. 25 is a side view of a driver assembly having the cupped flywheel 702. FIG. 25 shows an example embodiment of a nailer drive mechanism at the state in which the driver profile 610 has initially and tangentially made frictional contact with the flywheel ring 1750. This is a position analogous to that depicted in FIG. 24. In the moment of the activation, the driver assembly includes an activation mechanism 820, having an activation member 830. The activation member 830 imparts a force along an engagement axis 1800 which causes the driver profile 610 to come into frictional contact with flywheel 702 to effect a driving motion of driver blade 54. The movement of the activation member 830 is reversible and illustrated by a double pointed engagement movement arrow 835. FIG. 25 also illustrates an embodiment of a driver blade return mechanism 1700 which absorbs recoil energy and guides the driver blade 54 back to its resting state, prior to another driving action.

Figure 26:
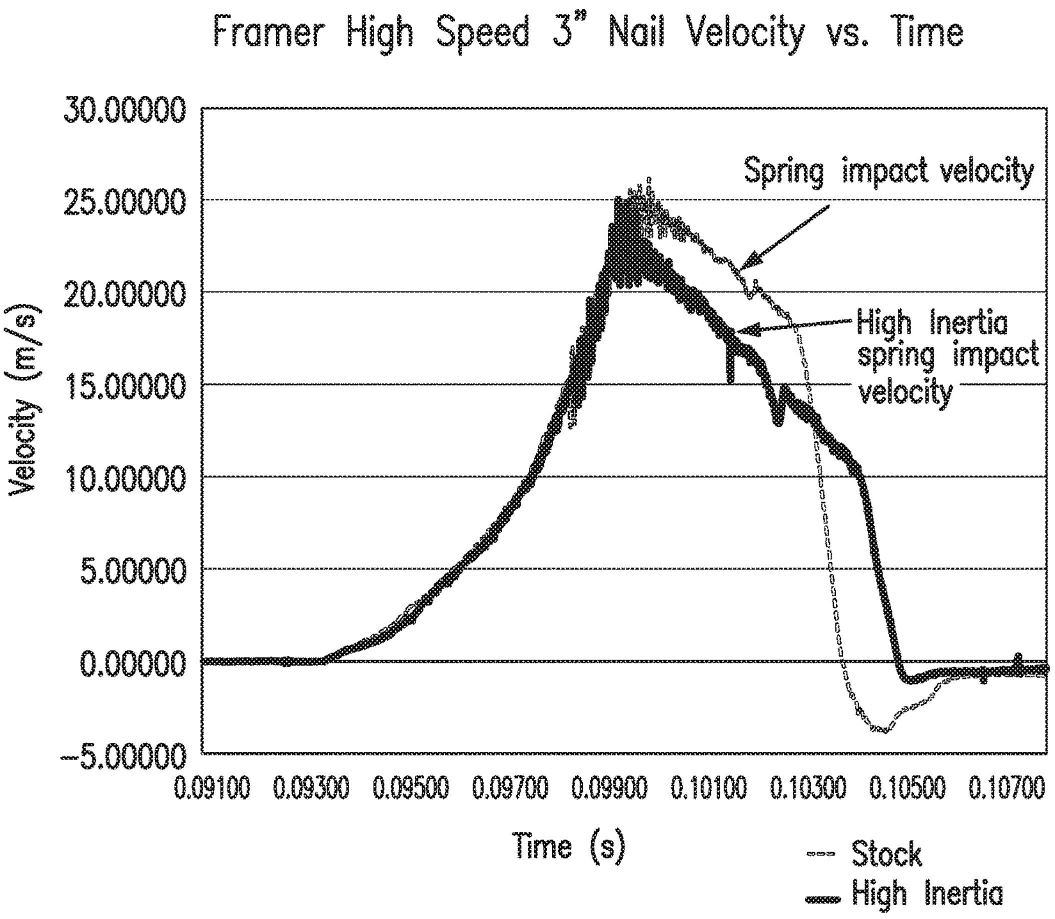
FIG. 26 is a sample of exemplary driver blade speed data using a high inertia driver system.

FIG. 26 is a sample of exemplary driver blade speed data using a high inertia driver system. FIG. 26 shows a comparison between the speed profile of a driver blade driven by the high inertia driver system compared to the speed profile of a stock, not having the high inertia driver system.

Figure 27:
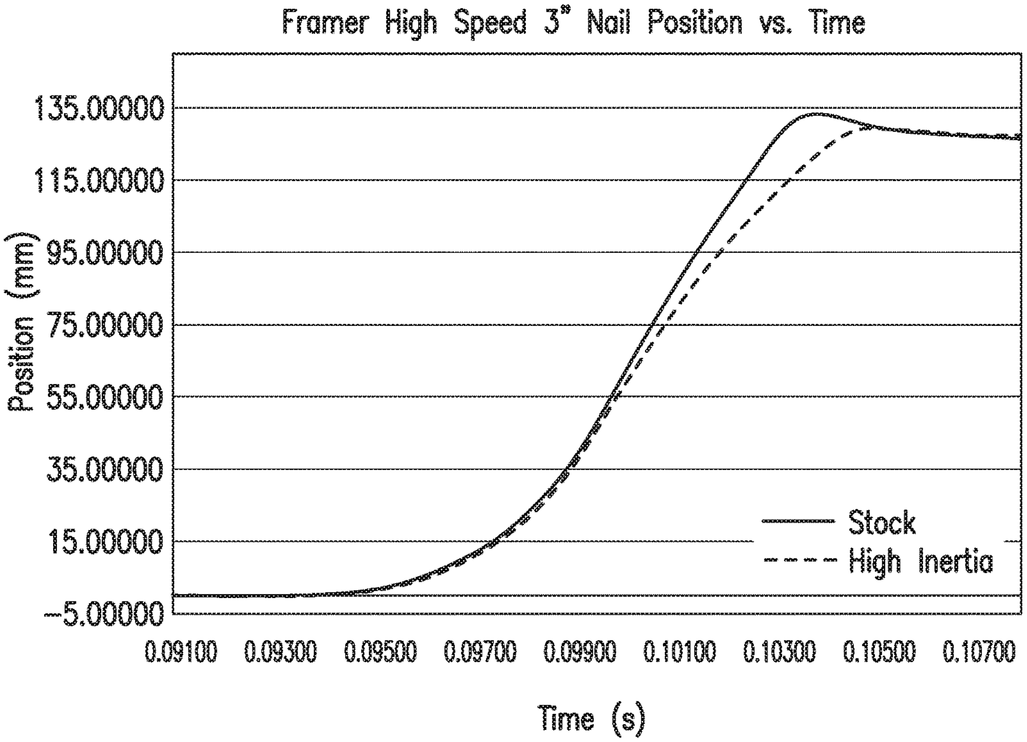
FIG. 27 is a graph of an example of driver blade position data using a high inertia driver system.

FIG. 27 is a graph of an example of driver blade position data using a high inertia driver system.

Figure 28A:
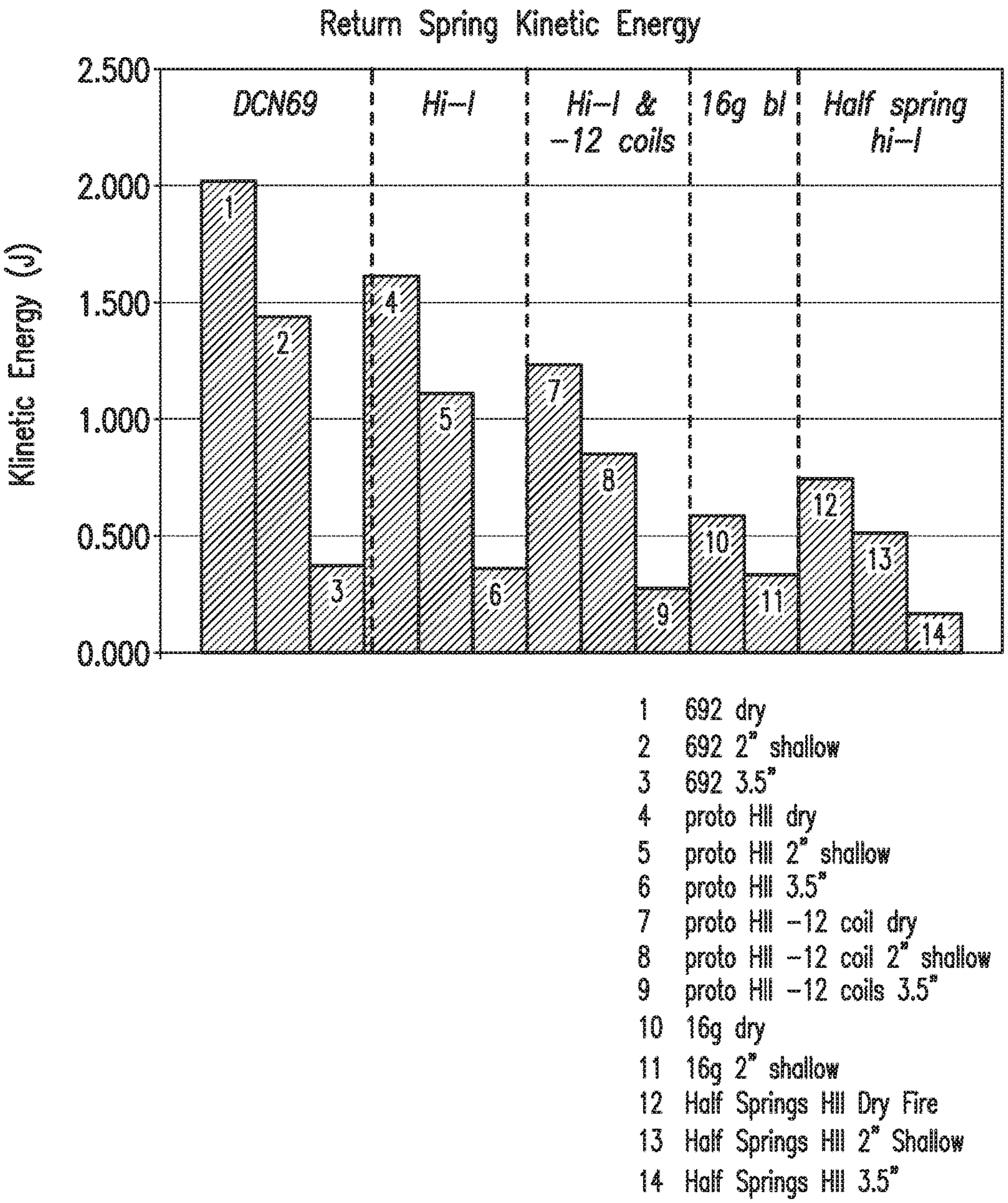
FIG. 28A is a graph of return spring kinetic energy.

FIG. 28A is a graph showing return spring kinetic energy.

FIG. 28B is a data table for an exemplary high inertia driver system showing dry fire data.

Figure 29:
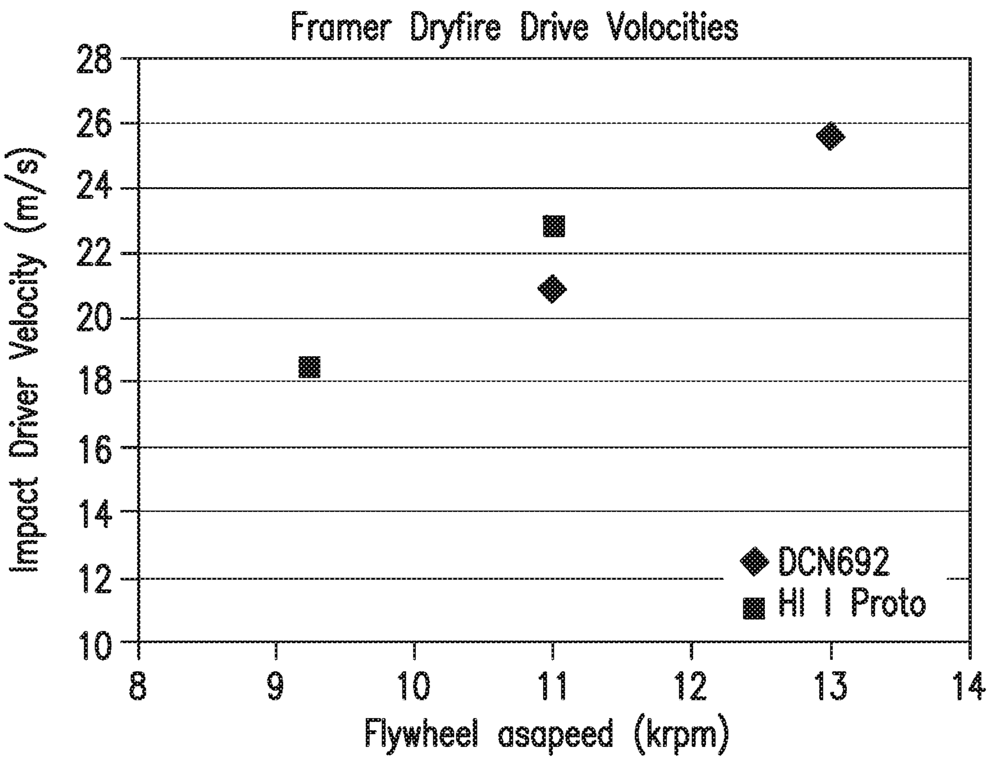
FIG. 29 is a graph of framer dryfire drive velocities.

FIG. 29 is a graph showing framer dryfire drive velocities.

Figure 30A:
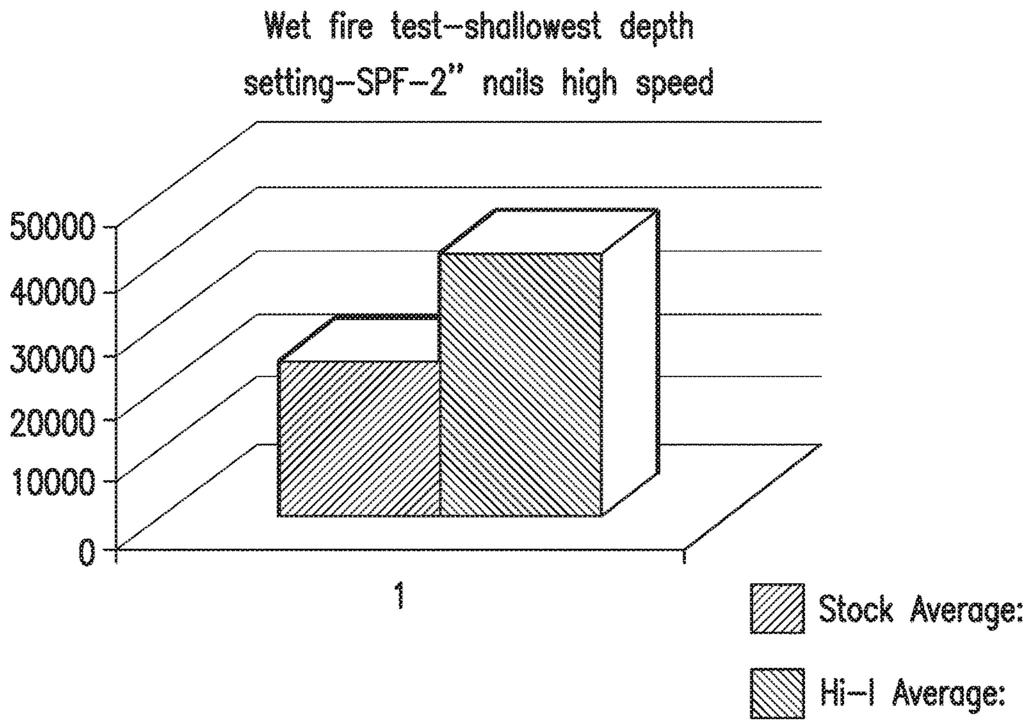
FIG. 30A shows an exemplary shallow depth wet fire test chart.

FIG. 30A shows an exemplary shallow depth wet fire test chart.

Figure 30B:
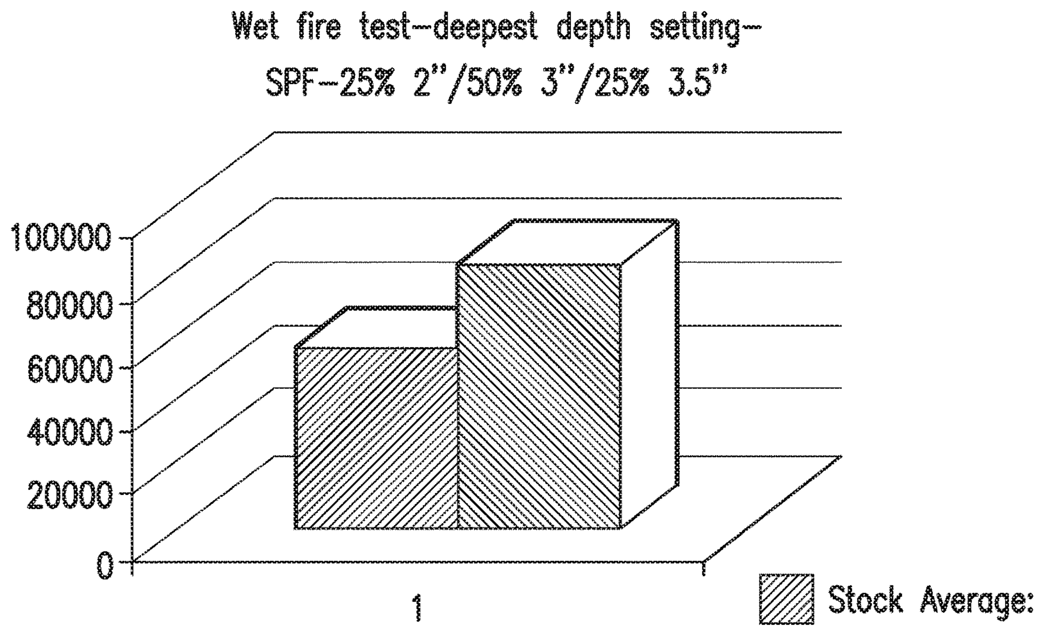
FIG. 30B shows an exemplary deep depth wet fire test chart.

FIG. 30B shows an exemplary deepest depth wet fire test chart.

The scope of this disclosure is to be broadly construed. It is intended that this disclosure disclose equivalents, means, systems and methods to achieve the devices, activities and mechanical actions disclosed herein. For each mechanical element or mechanism disclosed, it is intended that this disclosure also encompass in its disclosure and teaches equivalents, means, systems and methods for practicing the many aspects, mechanisms and devices disclosed herein. Additionally, this disclosure regards a fastening tool and its many aspects, features and elements. Such a tool can be dynamic in its use an operation, this disclosure is intended to encompass the equivalents, means, systems and methods of the use of the tool and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A power tool, comprising:

an electric motor having a stator and a rotor that drives a rotor shaft;

a flywheel coupled to the rotor shaft;

a motor housing that houses at least a portion of the stator and the rotor; and a driver blade adapted to drive a fastener into a workpiece, wherein the flywheel has a flywheel body having a cup shape, a flywheel inner circumference and an open end, wherein a portion of the flywheel body overlaps a portion of the motor housing, a portion of the stator and a portion of the rotor such that the portion of the motor housing, the portion of the stator and the portion of the rotor are surrounded by and radially within the flywheel inner circumference, wherein the flywheel is adapted to impart a force upon the driver blade when a portion of the flywheel contacts a portion of the driver blade, wherein the flywheel is free of contact with the motor housing, and wherein the flywheel has an inertia of 0.10 g*m^2 or greater when the flywheel contacts the portion of the driver blade.

2. The power tool according to claim 1, wherein the speed of the driver blade is 30 m/s or less.

3. The power tool according to claim 1, wherein the speed of the driver blade is in a range of 10 m/s to 30 m/s.

4. The power tool according to claim 1, wherein the mass of the driver blade is 80 g or greater.

5. The power tool according to claim 1, wherein the mass of the driver blade is in a range of 80 g to 200 g.

6. The power tool according to claim 1, wherein the flywheel has an inertia of 0.20 g*m^2 or greater.

7. The power tool according to claim 1, wherein the flywheel has an inertia in a range of 0.10 g*m^2to 0.40 g*m^2.

8. The power tool according to claim 1, wherein the flywheel has a speed of 15000 rpm, or less.

9. The power tool according to claim 1, wherein the flywheel has a speed in a range of 7000 rpm to 15000 rpm.

10. The power tool according to claim 1, wherein a pinch force of a portion of the flywheel when in contact with a portion of the driver blade is 222 N, or greater.

11. The power tool according to claim 1, wherein a pinch force of a portion of the flywheel when in contact with a portion of the driver blade is in a range of 222 N to 2669 N.

12. A high inertia driver system for a nailer, comprising:

a flywheel having a flywheel body having a cup shape and an open end;

an electric motor having a stator and a rotor that drives a rotor shaft, a motor housing covering at least a portion of the electric motor, wherein the flywheel is coupled to the rotor shaft, wherein at least a portion of the flywheel body has a flywheel inner circumference and a portion of the flywheel body overlaps a portion of the motor housing, a portion of the stator and a portion of the rotor such that the portion of the motor housing, the portion of the stator and the portion of the rotor are surrounded by and radially within the flywheel inner circumference, wherein the flywheel is free of contact with the motor housing, wherein the flywheel is adapted to impart a force upon a driver blade when a portion of the flywheel contacts a portion of the driver blade, and wherein when a portion of the flywheel contacts a portion of the driver blade, the driver blade is driven at a speed of 30 m/s, or less.

13. The high inertia driver system for a nailer according to claim 12, wherein the flywheel has an inertia in a range of 0.10 g*m^2to 0.40 g*m^2.

14. The high inertia driver system for a nailer according to claim 12, wherein the flywheel has a speed of 15000 rpm, or less.

15. The high inertia driver system for a nailer according to claim 12, wherein a pinch force of a portion of the flywheel when in contact with a portion of the driver blade is in a range of 222 N to 2669 N.

16. A power tool, comprising:

an electric motor having a stator and a rotor that drives a rotor shaft;

a flywheel coupled to the rotor shaft;

a driver blade adapted to drive a fastener into a workpiece, wherein the flywheel has a flywheel body having a cup shape, a flywheel inner circumference and an open end;

wherein a portion of the flywheel body overlaps a portion of the stator and a portion of the rotor such that the portion of the stator and the portion of the rotor are surrounded by and radially within the flywheel inner circumference, wherein the open end is free of contact with the electric motor, wherein the flywheel is adapted to impart a force upon the driver blade when a portion of the flywheel contacts a portion of the driver blade, and wherein the flywheel has an inertia of 0.10 g*m^2or greater when the flywheel contacts the portion of the driver blade.

17. The power tool according to claim 16, wherein the flywheel has a speed of 15000 rpm, or less.

18. The power tool according to claim 16, wherein the flywheel has a speed in a range of 7000 rpm to 15000 rpm.

19. The power tool according to claim 16, wherein a pinch force of a portion of the flywheel when in contact with a portion of the driver blade is 222 N, or greater.

20. The power tool according to claim 16, wherein a pinch force of a portion of the flywheel when in contact with a portion of the driver blade is in a range of 222 N to 2669 N.

* * * * *